Sept. 23, 1958 T. A. WETZEL 2,853,626
AUTOMATIC COPYING MACHINE WITH ANTICIPATOR CONTROL
Filed Sept. 17, 1951 15 Sheets-Sheet 1

INVENTOR.
Theodore A. Wetzel
BY
Elroy J. Wutschel
Attorney

Sept. 23, 1958 T. A. WETZEL 2,853,626
AUTOMATIC COPYING MACHINE WITH ANTICIPATOR CONTROL
Filed Sept. 17, 1951 15 Sheets-Sheet 2
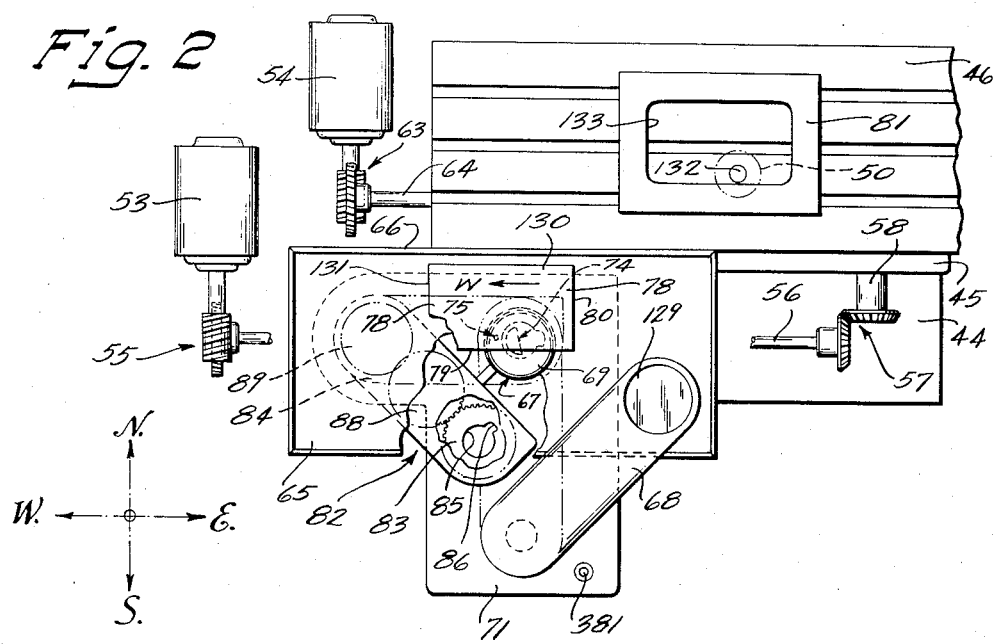
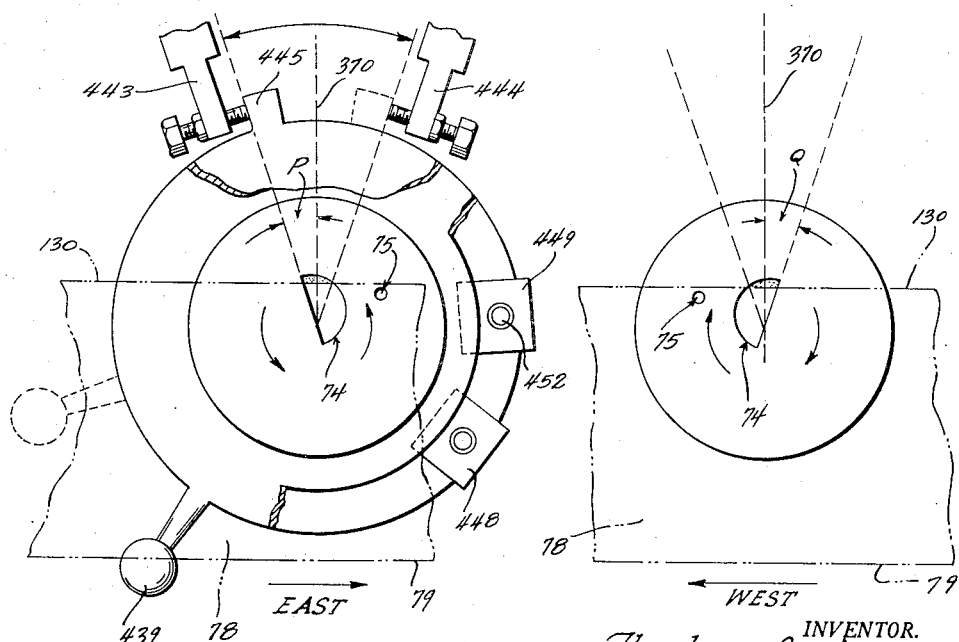
INVENTOR.
Theodore A. Wetzel
BY
Elroy J. Wutschel
Attorney

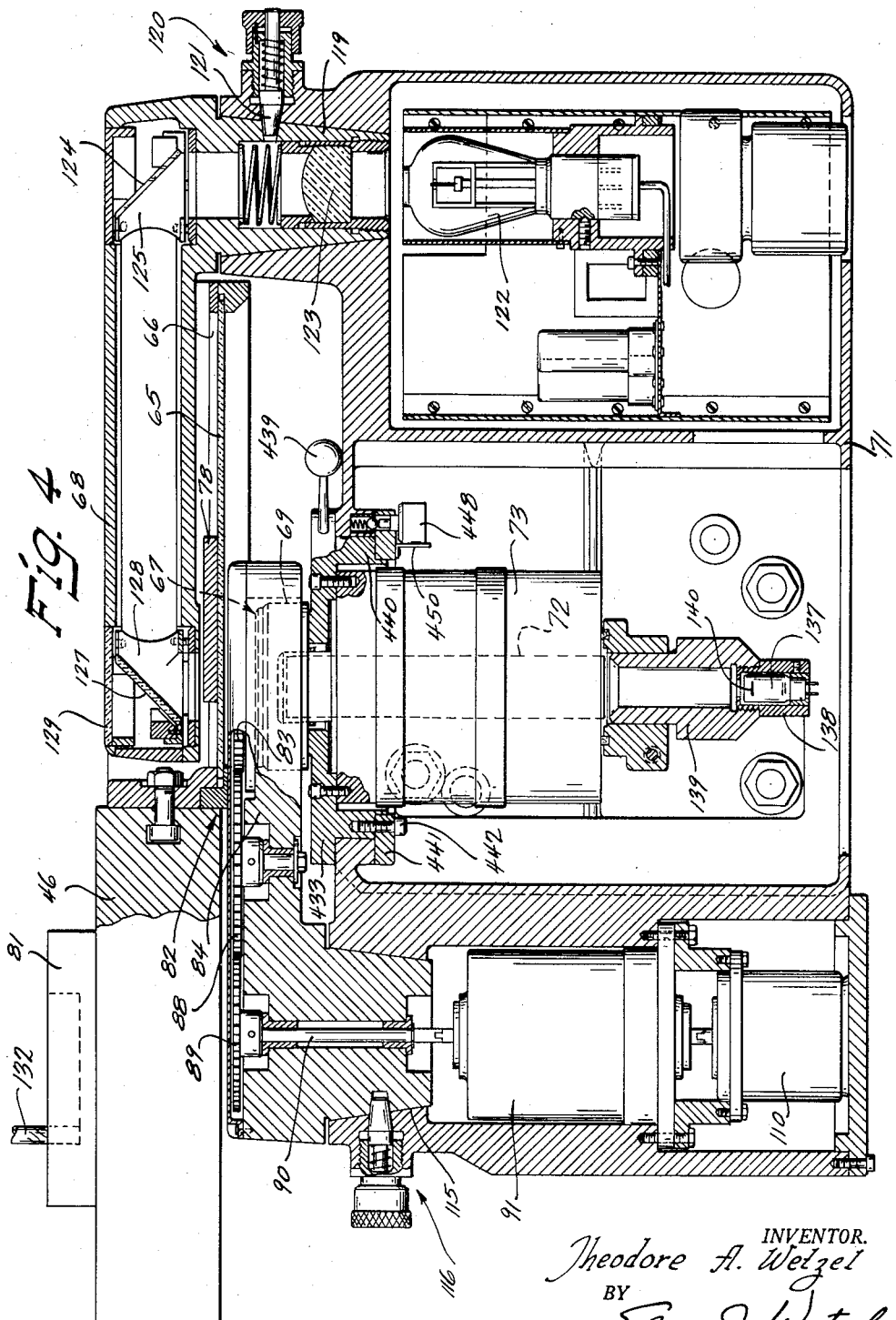

INVENTOR.
Theodore A. Wetzel
BY
Elroy J. Wutschel
Attorney

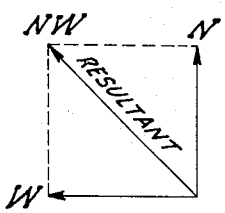
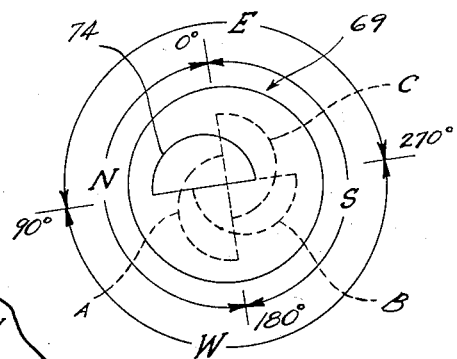
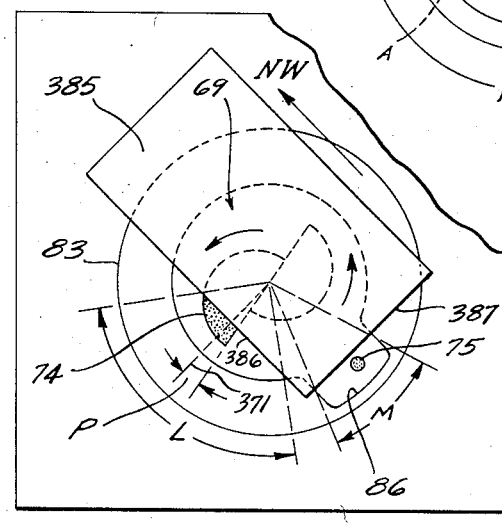
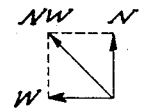
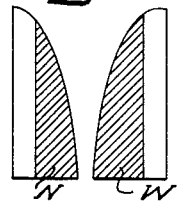
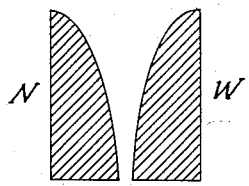
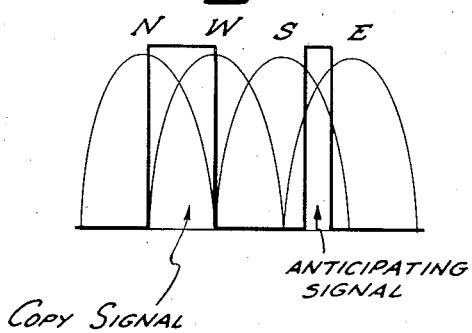
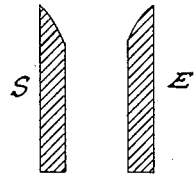

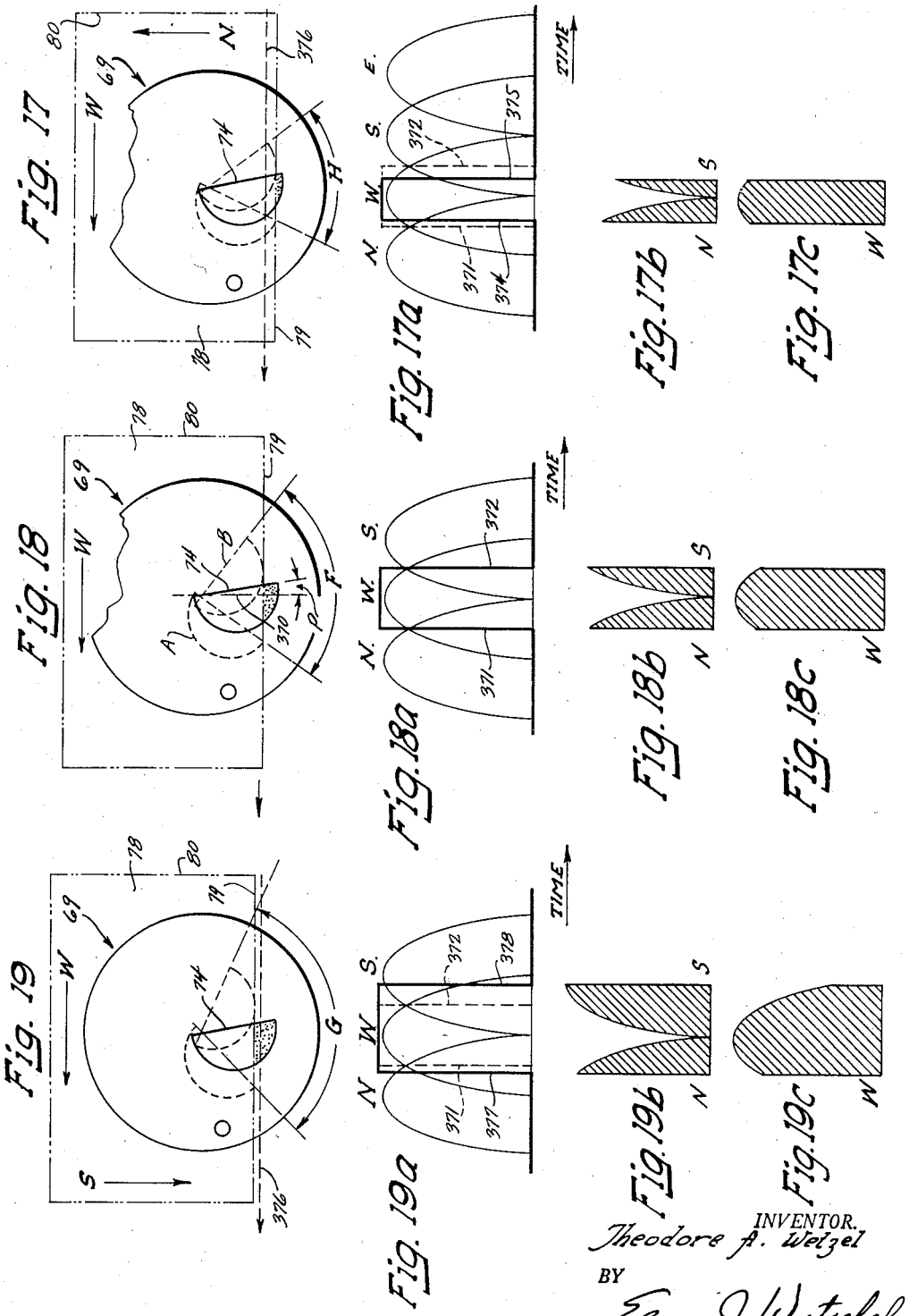

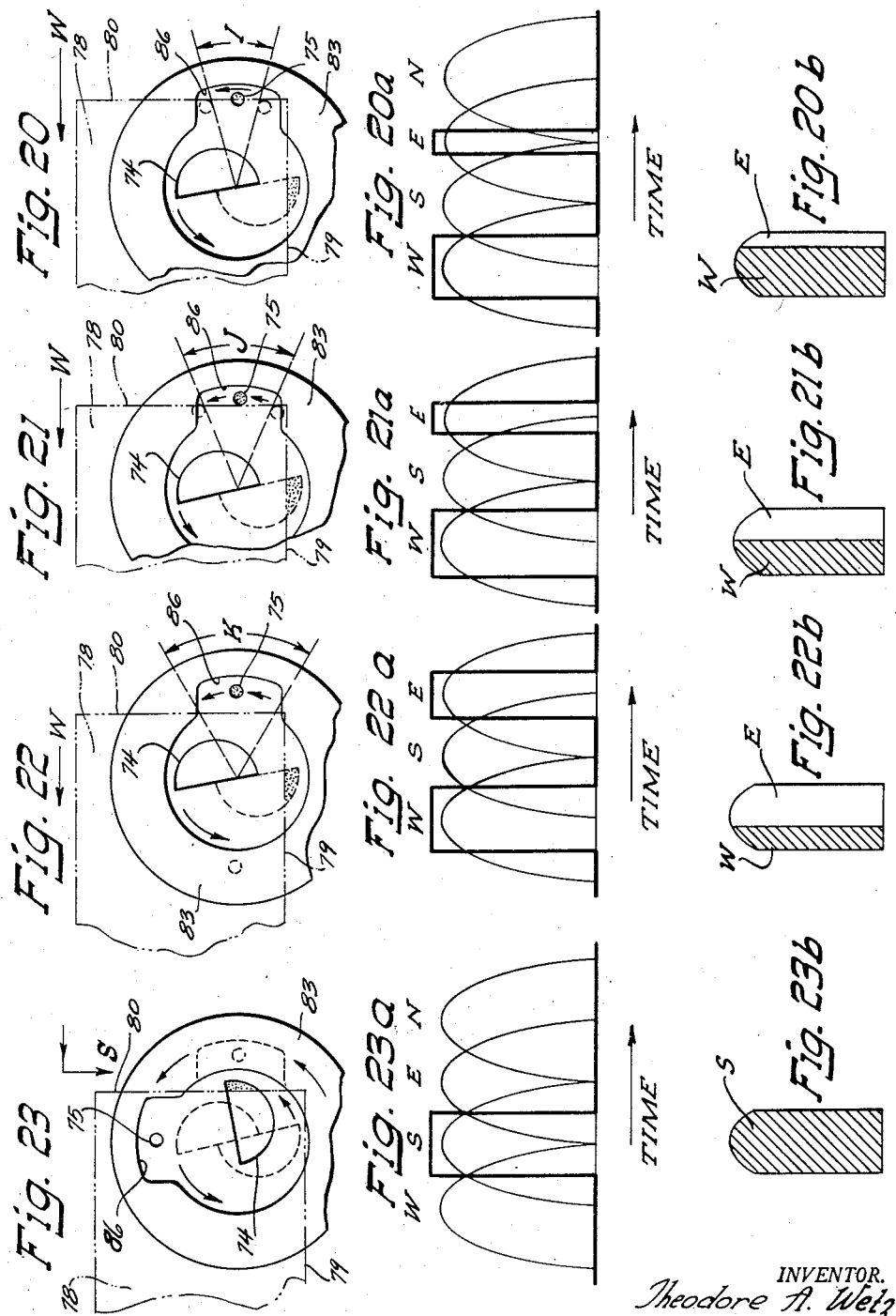

Sept. 23, 1958 T. A. WETZEL 2,853,626
AUTOMATIC COPYING MACHINE WITH ANTICIPATOR CONTROL
Filed Sept. 17, 1951 15 Sheets-Sheet 10

INVENTOR.
Theodore A. Wetzel
BY
Elroy J. Wutschel
Attorney

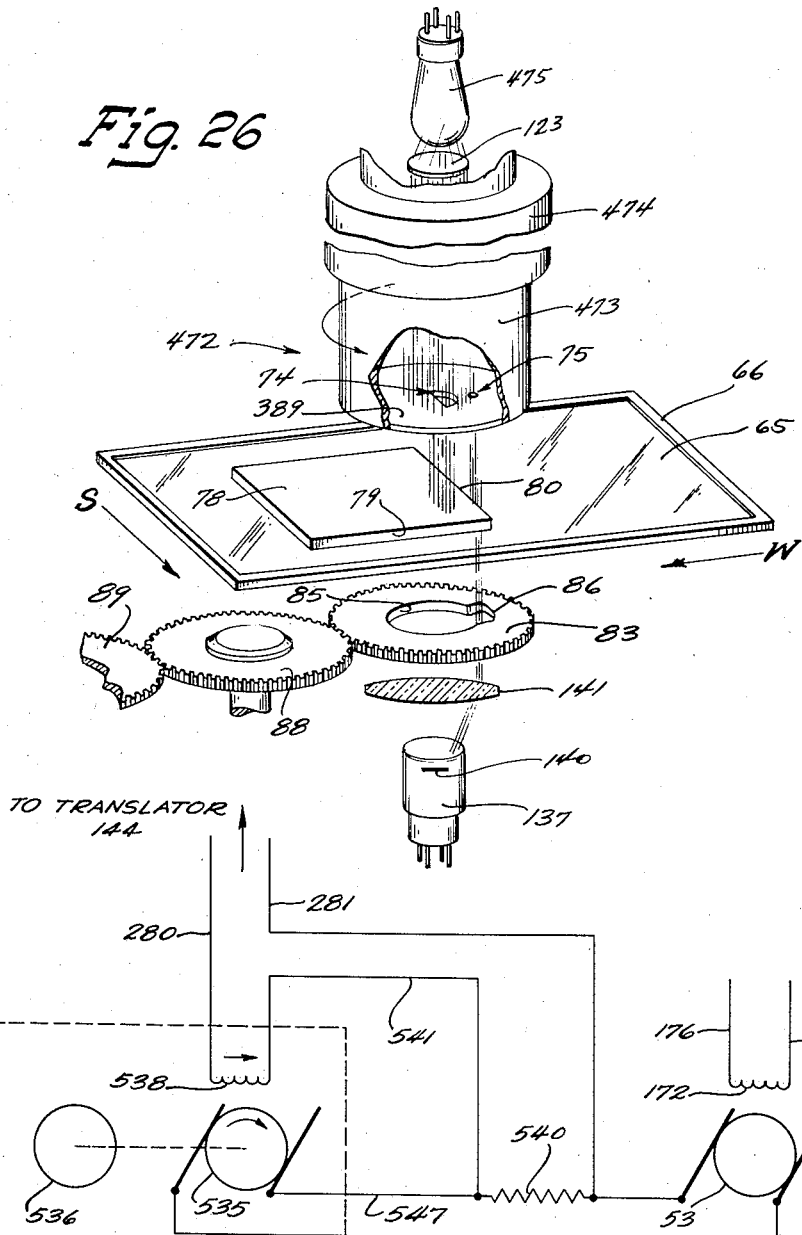

Sept. 23, 1958 T. A. WETZEL 2,853,626
AUTOMATIC COPYING MACHINE WITH ANTICIPATOR CONTROL
Filed Sept. 17, 1951 15 Sheets-Sheet 12
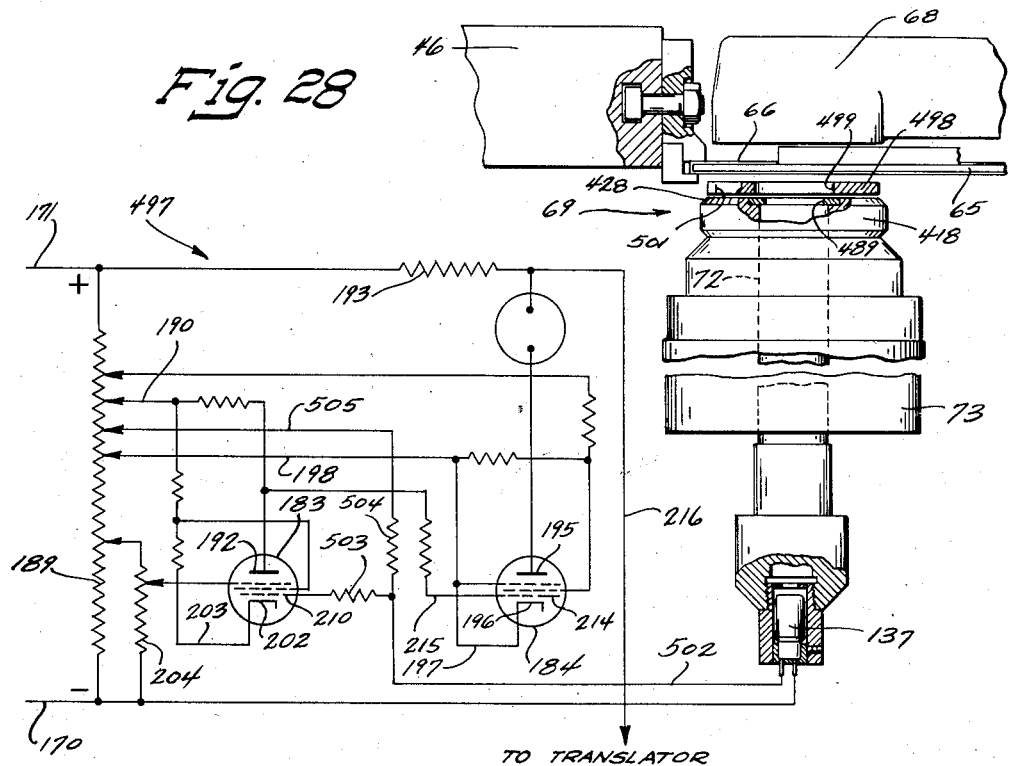
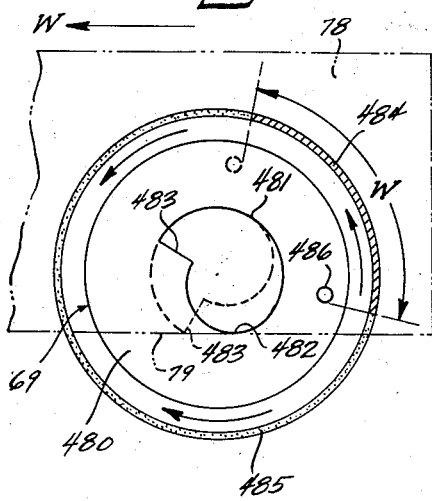
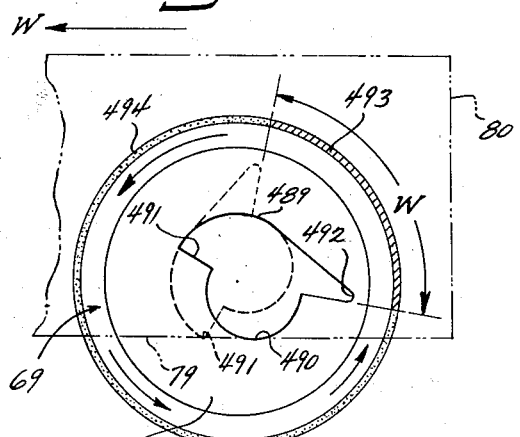
INVENTOR.
Theodore A. Wetzel
BY
Elroy J. Wutschel
Attorney

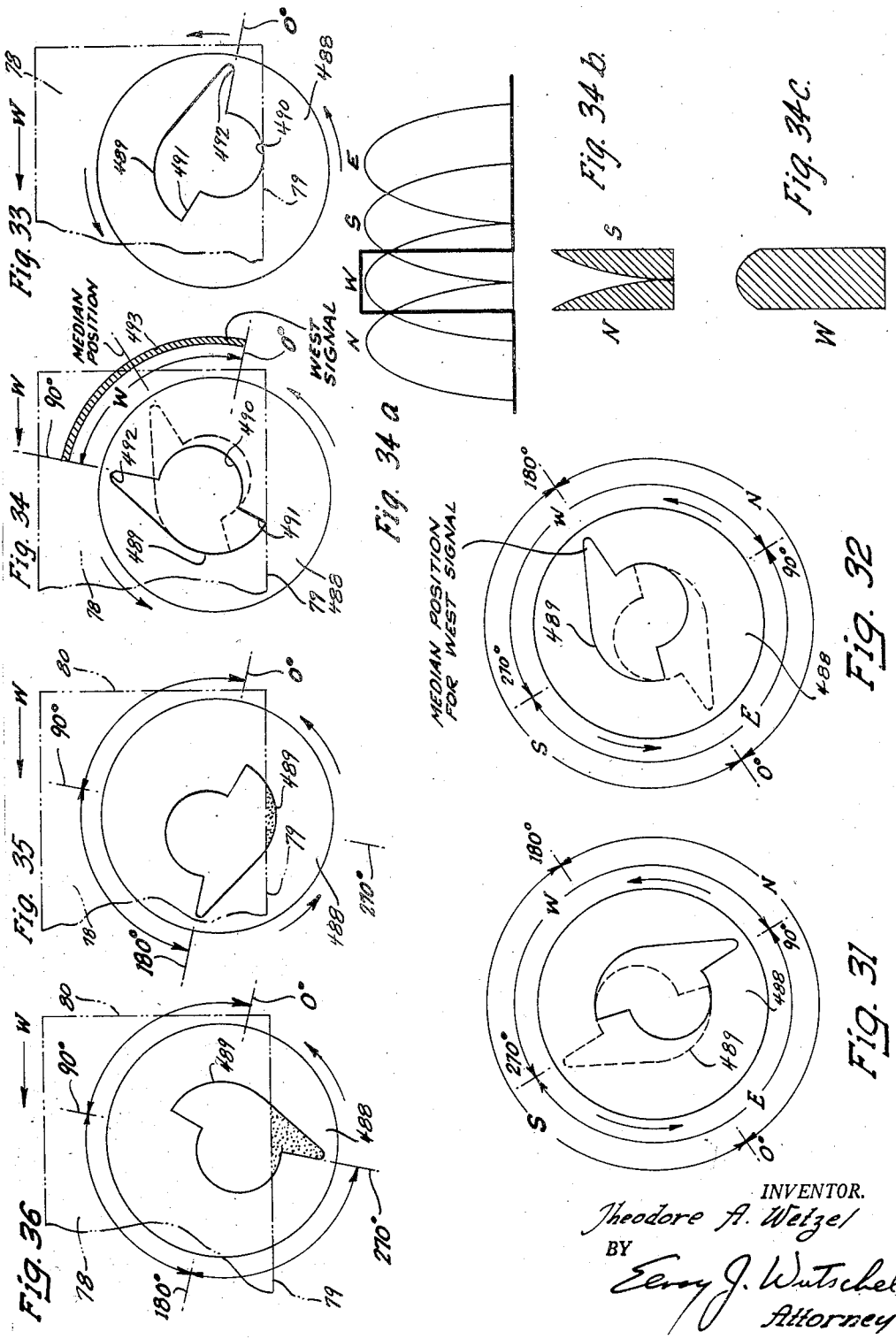

Sept. 23, 1958 T. A. WETZEL 2,853,626
AUTOMATIC COPYING MACHINE WITH ANTICIPATOR CONTROL
Filed Sept. 17, 1951 15 Sheets-Sheet 14
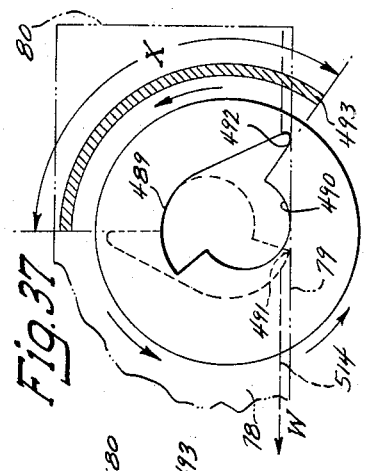
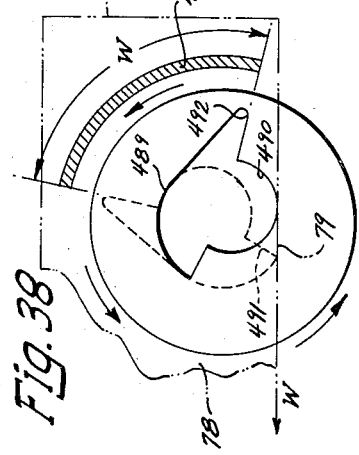
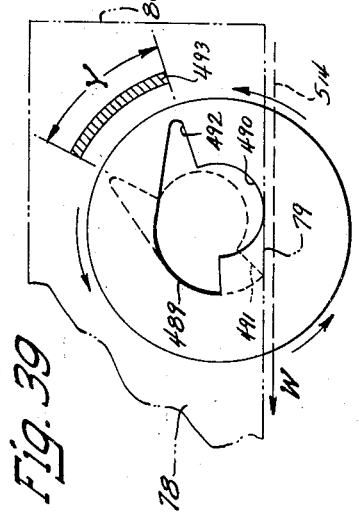
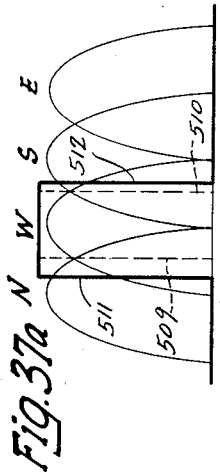
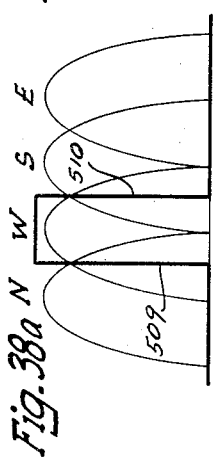
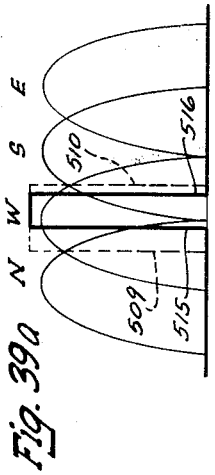
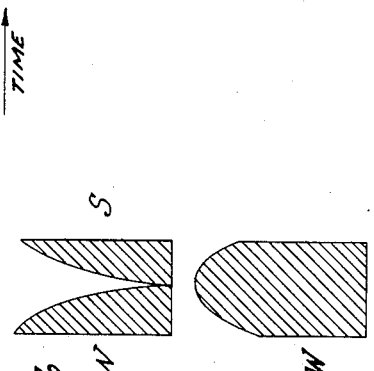
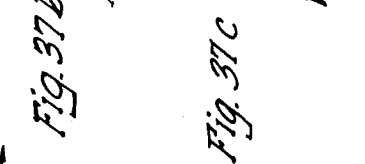
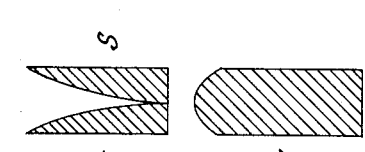
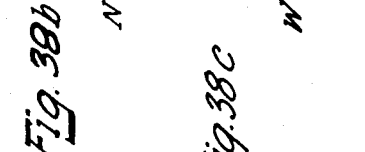
INVENTOR.
Theodore A. Wetzel
BY
Emery J. Wutschel
Attorney

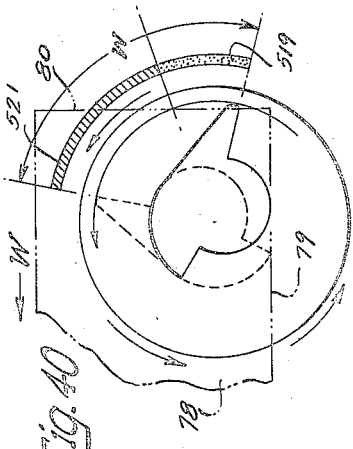
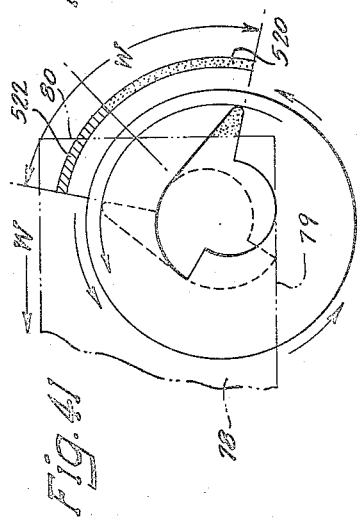
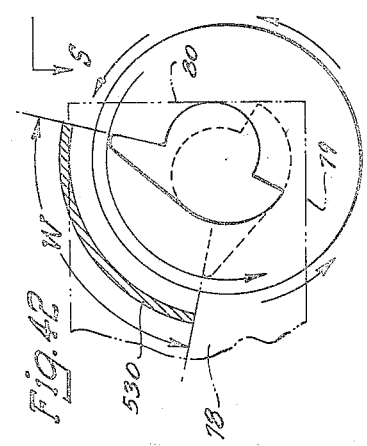
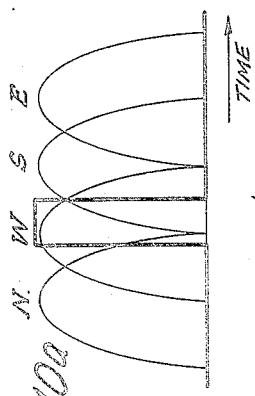
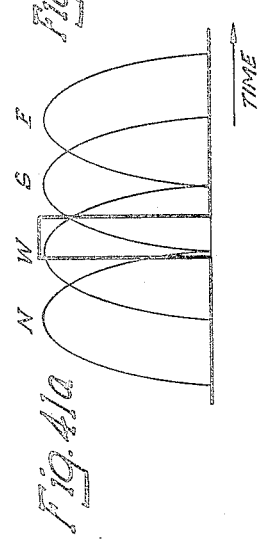
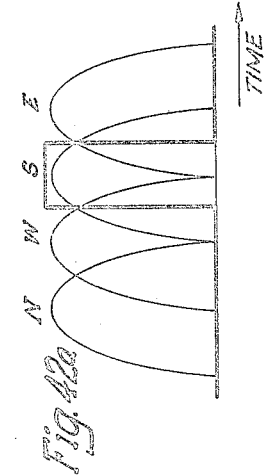
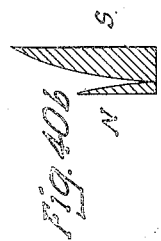
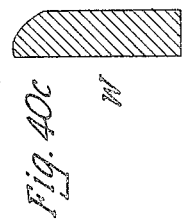
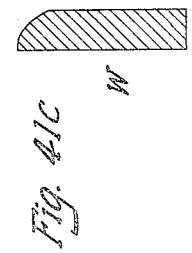
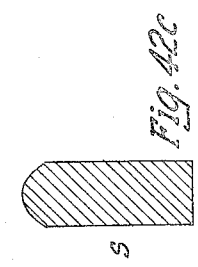
INVENTOR.
*Theodore A. Wetzel*
BY
*Attorney*

United States Patent Office 2,853,626
Patented Sept. 23, 1958

2,853,626

AUTOMATIC COPYING MACHINE WITH ANTICIPATOR CONTROL

Theodore A. Wetzel, Milwaukee, Wis., assignor to Kearney & Trecker Corporation, West Allis, Wis., a corporation of Wisconsin Application September 17, 1951, Serial No. 246,980

30 Claims. (Cl. 250—202)

This invention relates, generally, to improvements in copying machines and more particularly to improved line tracker control systems adapted to follow the representation of a guiding contour as well as to anticipate directional changes in the path of movement dictated by the guiding contour.

In some prior types of copying or tracing machines, there has been provided a control system responsive to the peripheral contour of a guiding pattern, and, operative to effect corresponding relative movement between a tool support and work support. The control system was provided with a sensing device arranged to supply input signals that subsequently activated a source of power connected to effect corresponding motivation for the required relative movement between the tool support and work support, as well as a corresponding movement between the sensing device and the guiding contour. By means of this arrangement, the sensing device was responsive to successively new portions of the guiding contour which was continuously displaced along a path of travel corresponding to its configuration. In some cases the sensing device constituted a stylus having actual physical contact with the peripheral edge of a guiding pattern to effect the required relative movement therebetween. In other cases, such as line tracker controlled machines, the sensing device was moved into intercepting or overlapping relationship with the pattern edge to effect the required relative movement therebetween. For some types of copying operations, more especially at the lower feeding rates, one or the other of these sensing devices with its cooperating control system was adequate to control the relative movement of the machine elements. In traversing a directional change in the path of travel, however, there usually occurred a slight overtravel in the original direction of movement before the sensing device and control system responded to the new path of travel to effect the necessary corrective movements. This overtravel occurred even at very slow feeding rates, resulting in an inaccuracy in the finished work caused by undercutting the contour being generated. As the feeding rates were increased, the condition became even more aggravated and the undercutting was correspondingly more severe. At extremely high feeding rates, the overtravel became so excessive that the resultant undercutting caused irreparable damage to the work. Among the several factors contributing to this condition, the principal one is the time lag occurring between the initiation of an input signal to move and the actual motivation for movement effected by that particular signal, which is an inherent characteristic of prior types of control systems for copying machines.

A general object of the invention is to provide a control system for a copying machine that is operative to control machine movements for generating a contour in work, corresponding to the representation of a contour, and without damaging the work when traversing a directional change in the path of travel.

Another object of the invention is to provide a direction anticipating line tracker control system for a copying machine.

Another object of the present invention is to provide an improved line tracker control system that is adapted to automatically follow the representation of a contour throughout a full 360°, as well as to anticipate directional changes in the path of travel dictated by the guiding contour.

Another object is to provide an improved control system for a copying machine that is accurate throughout an extremely wide range of feeding rates.

Another object is to provide an anticipating control for a copying machine that is operative to eliminate overtravel when traversing a directional change in the path of travel.

Another object is to provide an improved line tracker control system that is simultaneously responsive to two spaced apart edge zones of a guiding contour in such a manner as to anticipate directional changes in the path of travel.

Another object is to provide an improved line tracker control system that is operative to compensate for the time lag between the input signal to move and the resulting motivation for movement during the interval in which a corner in the path of travel is traversed.

Another object is to provide an improved sensing device for a line tracker control system that is operative to maintain its central axis a fixed distance from a guiding contour and is simultaneously responsive to a point on the contour more remote therefrom than the square root of two multiplied by the fixed normal distance.

Another object is to provide an improved sensing device for a copying machine that is operative to form a principal copy signal and a separate anticipating signal adapted to modify the copy signal or the effect thereof during the same cycle of operation.

Another object is to provide a directionally controlled blanking device disposed to cooperate with a sensing device for selectively controlling the formation of an anticipating control signal.

Another object is to provide an improved line tracker control system that is selectively reversible in operation.

A further object is to provide improved magnetic locking means for the relatively rotatable members of a signal forming sensing device.

A still further object is to provide an electrical steering arrangement for a signal modifying blanking device.

According to this invention, a milling machine of the vertical spindle type is provided with an improved form of direction anticipating line tracker control system that is operative to effect continuous feeding movement of the work table relative to the tool spindle along a path of travel corresponding in configuration to the contour of a guiding template or pattern throughout an angle of 360°. Thus, a contour may be generated in a workpiece supported on the table that corresponds to the contour of a pattern employed to guide feeding movement of the table relative to a cutting tool carried by the relatively fixed tool spindle. Although the workpiece is moved at a substantially uniform feeding rate relative to the cutting tool, the line tracker control is arranged to anticipate directional changes in the path of travel in order to prevent overtravel as the direction of workpiece movement is changed to conform to the new direction of travel dictated by the pattern.

Essentially, the line tracker control comprises a photoelectric motor regulating system in combination with a signal forming scanning device mounted in fixedly spaced relationship with respect to the axis of the tool spindle. The scanning device is disposed to provide a copy signal light beam and an anticipating signal light beam arranged to be continuously movable in a manner to actuate the photoelectronic regulating system according to the requirements of a particular guiding contour. To selectively activate the photoelectronic regulating system, the moving light beams of the scanning device are intercepted at recurring intervals by a guiding line of trace having a differential effect on light. A guiding contour delineating a line of trace may be established by an opaque pattern having an edge zone, a translucent line etched on an opaque template or any other suitable means employing a light differentiating line of trace.

The copy signal light beam provided by the scanning device is intercepted at regularly recurring intervals by a relatively straight portion of the line of trace to afford a continuous series of light pulses of controlled duration for effecting continuous feeding movement of the workpiece along a correspondingly straight path of travel. Whenever a corner is to be traversed however, the anticipating signal light beam and scanning device cooperate with that edge of the pattern delineating a directional change in the line of trace to afford a series of light pulses of gradually changing duration that are respectively operative to modify the motivation for effecting movement of the pattern and workpiece. The modified light pulses are operative to activate the photoelectronic motor regulating system for providing a controlled feed rate of the workpiece to prevent overtravel whenever the directional path of workpiece movement is subsequently changed to conform to the new direction of trace. After the corner has been traversed, the photoelectronic regulating system is again activated only by the continuous succession of light pulses resulting from the interception of the directionally changed guiding line of trace with the copy signal light beam from the scanning device. The recurring light pulses blend together to provide a continuous, pulsating light beam copy signal for effecting continuous movement of the workpiece at a substantially uniform feed rate.

In a principal modified form of the invention, there is provided a sensing device having an inverted function in which the dark or no-light portion of each cycle provides the signal to effect movement. Due to the operation of the modified sensing device, the duration of each successive no-light signal is selectively changed to anticipate a directional change in the path of travel. The changed no-light signals, in turn, activate an inverted form of photoelectronic motor regulating system to provide a controlled feed rate for preventing overtravel as the direction of workpiece movement is changed to conform to the new direction of trace.

Power for effecting feeding movement of a workpiece relative to a cutter carried by the tool spindle, as well as a coordinate movement of a guiding pattern relative to the scanning device, is derived from a pair of reversible feed motors that are selectively responsive to the photoelectronic regulating system. The feed motors are individually operative to effect movement of the work table and a transparent pattern support coupled thereto along two mutually perpendicular lines of travel. Selective coordinate energization of the feed motors at predeterminately proportioned feed rates, according to the dictates of the photoelectronic regulating system, is operative therefore to effect coordinate movement of the pattern and workpiece along any angular direction of travel corresponding to the directional changes in the line of trace represented by the contour of the guiding pattern.

Although the actuating and control apparatus comprising the invention is represented herein as being embodied in a vertical spindle milling machine of the knee and column type, it is to be understood that the particular embodiments shown are intended to be illustrative only and that various other machine tools may utilize the features in various forms within the range of equivalents defined in the subjoined claims. Likewise, although the line tracker control apparatus disclosed herein is represented as being selectively activated by a light differentiating line of trace, light reflective activating means may be employed with equally good results. In a similar manner, recurrently intercepted light beam signals are the preferred form of activating medium, although magnetic force or pulsating air as well as other forms of radiated energy are also contemplated as being suitable actuating media within the scope of this invention.

The foregoing and other objects of this invention which will become more fully apparent from the following detailed description, may be achieved by the exemplifying apparatus shown in and described in connection with the accompanying drawings in which:

Fig. 2 is a plan view of the machine;

Fig. 3 is a schematic view in horizontal section through the shutter head constituting the sensing device;

Fig. 3a is a schematic plan view of the shutter head;

Fig. 4 is a view partly in transverse and partly in longitudinal vertical section through the control box and taken generally along the lines 4—4 in Fig. 1;

Fig. 9 is a diagrammatic view of the shutter head and illustrating the timing relationship with the electrical control circuit;

Figure 24:
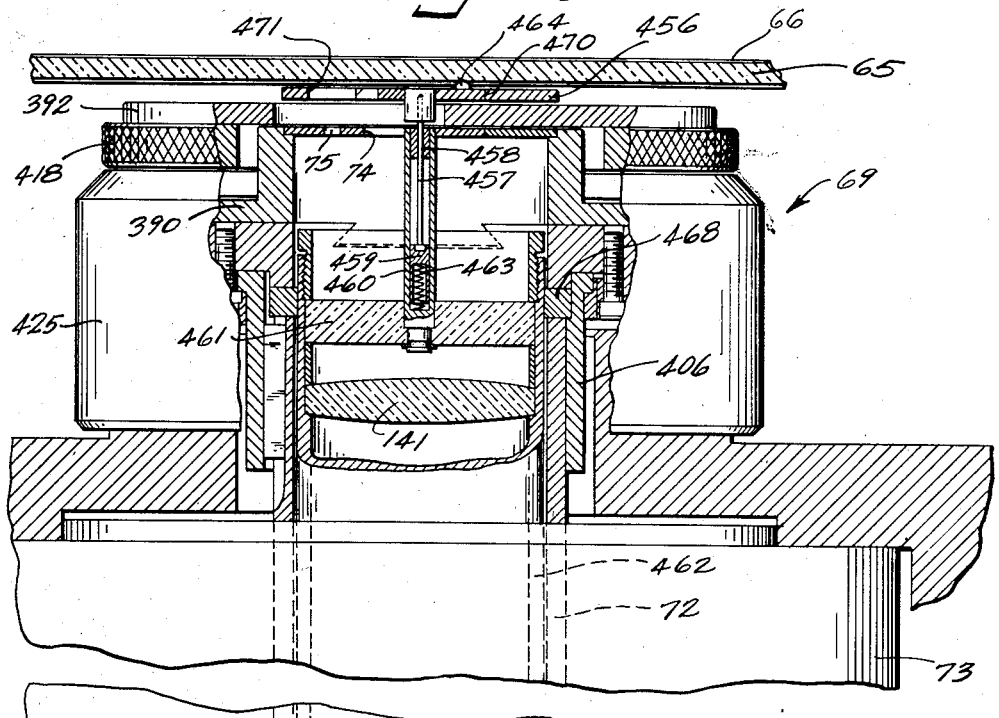
Figure 25:
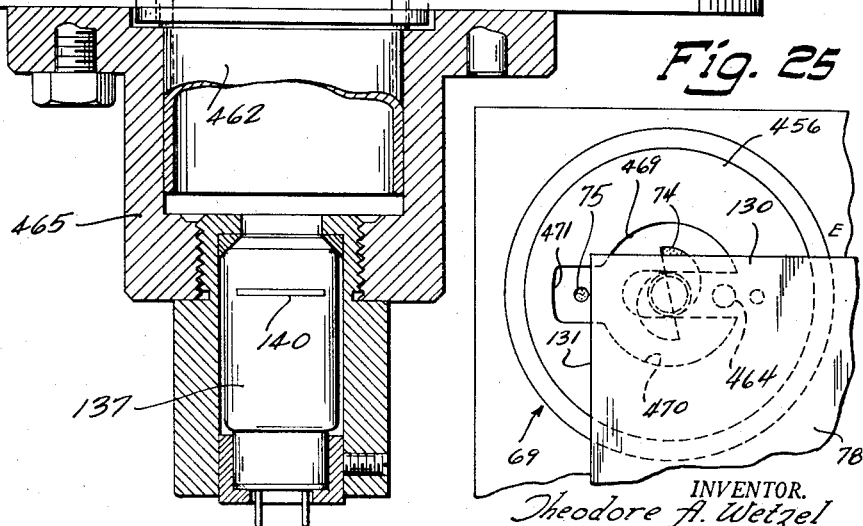

Figs. 10 to 16 inclusive are diagrammatic views illustrating several operating conditions of the direction anticipating control system;

Figs. 17 to 19c inclusive are diagrammatic views representing the lateral correcting effect of the control system;

Figs. 20 to 23b inclusive are additional diagrammatic views illustrating the operating conditions occurring as a directional change in the path of travel is traversed;

Fig. 24 is a fragmentary view in vertical section through the actuating control mechanism and showing a modified form of blanking device;

Fig. 25 is a plan view of the modified form of blanking device shown in Fig. 24;

Fig. 26 is a fragmentary perspective view showing a modified form of a signal forming sensing device;

Fig. 27 is a fragmentary schematic circuit diagram showing a modified form of motor control;

Fig. 28 is a diagrammatic plan view of a modified form of signal forming shutter;

Fig. 29 is a diagrammatic plan view of another modified form of shutter provided with a single aperture arranged to form both copy signals and anticipating signals;

Fig. 30 is a fragmentary, partly diagrammatic view showing a modification of the invention disposed to be utilized in combination with the shutters shown in Figs. 28 and 29;

Figs. 31 and 32 are diagrammatic plan views showing the timing relationship between the modified shutter, Fig. 29, and the electrical control circuit;

Figs. 33 to 36 inclusive are diagrammatic views representing one cycle of operation of the modified shutter shown in Fig. 29;

Figs. 37 to 39c inclusive are diagrammatic views representing the lateral correcting effect of the modified control system shown in Fig. 30; and, Figs. 40 to 42c inclusive are diagrammatic views representing the anticipating effect of the modified control system shown in Fig. 30.

The particular line tracker controlled machine tool shown generally in the accompanying drawings as exemplifying a preferred embodiment of the present invention is a milling machine of the vertical spindle, knee and column type that is arranged to include a directional anticipator as an integral part of the operating and control system. It is to be understood, however, that apparatus comprising the anticipating line tracker control may be constructed in the form of an attachment that may be applied with equal advantage to other types of machine tools. In a similar manner, the invention may be utilized effectively in combination with a wide variety of other classes of machines that require directionally controlled advancement of a movable element along a path of travel corresponding to the representation of a contour of predetermined configuration.

Figure 1:
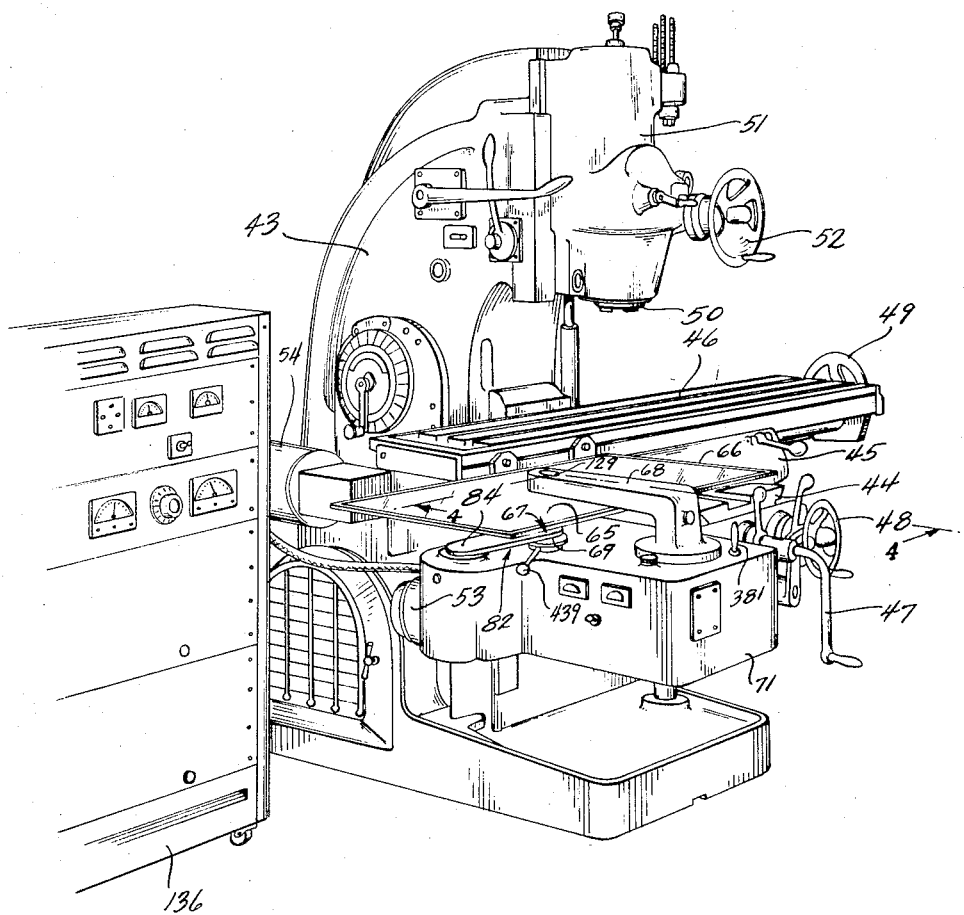
Figure 1 is a perspective view of a milling machine of the vertical spindle, knee and column type incorporating a direction anticipating line tracker control system constituting a preferred embodiment of the present invention.

Referring more specifically to the drawings and particularly to Figs. 1 and 2 thereof, the line tracker controlled milling machine there shown comprises essentially a vertically upstanding column 43 that carries the usual work supporting elements including a vertically adjustable knee 44, a transversely movable saddle 45 and a longitudinally movable table 46. For effecting selective vertical adjustment of the knee 44 along the front face of the column 43, there is provided toward the front central portion of the knee a handcrank 47 that is operative in well known manner to actuate a screw and nut elevating mechanism (not shown). In a similar manner, there are provided handwheels 48 and 49 respectively operable to effect transverse adjustment of the saddle 45 along the upper surface of the knee 44 and longitudinal movement of the work supporting table 46 along the upper guiding surface of the saddle 45.

A vertical tool spindle 50 cooperatively disposed above the work table 46 is rotatably journalled in a spindle supporting head 51 that is slidably mounted for selective vertical adjustment toward the front upper portion of the column 43. Power for rotating the tool spindle 50 at a selected speed is derived from a motor (not shown) contained within the base of the column 43. Vertical adjustment of the tool spindle 50 relative to the cooperatively disposed work supporting table 46 may be accomplished by means of a handwheel 52 rotatably carried toward the front upper portion of the machine.

Power for effecting feeding movement of the work table 46 along either of two mutually perpendicular lines of travel relative to the tool spindle 50 is derived from one or the other of two reversible feed motors 53 and 54 carried at the left side of the machine. As shown in Figs. 1 and 2, the feed motor 53 is secured to the knee 44 and is connected through a worm and wormwheel 55 to rotate a shaft 56 journalled in the knee. From the shaft 56, power is transmitted through bevel gears 57 to actuate a feed screw 58 journalled in the knee 44 and that is disposed to engage a feed nut (not shown) secured to the underside of the saddle 45. Selective energization of the saddle feed motor 53 is operative to effect feeding movement of the saddle and table toward or away from the front face of the column 43. The feed motor 54 is secured to the leftward end of the table 46 and is connected through a worm and wormwheel 63 to actuate a feed screw 64 journalled in the table and that is arranged in well known manner to engage a feed nut (not shown) secured to the upper surface of the saddle 45. Thus, selective energization of the table feed motor 54 is operative to rotate the feed screw 64 for effecting longitudinal movement of the table 46 in either a right or left hand direction of travel relative to the saddle 45.

To facilitate the description, it will be assumed that the machine is so positioned relative to the four major points of the compass that the saddle feed screw 58 is operative to effect feeding movement of the work table 46 in a north or south direction and the table feed screw 64 is operative to effect movement of the table in an east or west direction. Selective energization of one or the other of the reversible feed motors 53 and 54 will thus operate to effect feeding movement of the work table 46 in a north, south, east or west direction of travel. Likewise, simultaneous energization of both of the feed motors 53 and 54 at predeterminately proportioned feed rates will effect a resultant feeding movement of the work table in any selected direction of travel intermediate the four cardinal points of the compass. If the table feed motor 54 is energized to effect westward table movement, for example, and the saddle feed motor 53 is simultaneously energized to effect northward movement, the resultant feeding movement of the table will be in a northwest direction of travel.

In order that the representation of a guiding contour delineating a line of trace may be retained in laterally spaced relationship to a workpiece carried by the work table 46, a horizontally disposed transparent pattern support member 65 is secured by means of a bracket 66 to the leftward forward edge of the table 46. It will be readily apparent that selective energization of the feed motors 53 and 54 will produce a coordinate feeding movement of the pattern support 65 and the work table 46 along identical paths of travel.

As the work table 46 is caused to be moved relative to the tool spindle 50, the pattern support 65 will likewise be moved relative to a scanning device 67 positioned therebelow in fixedly spaced relationship to the axis of the tool spindle 50. The scanning device 67 is positioned directly below a relatively intense beam of light that is directed coaxially downward from the inner end of a horizontal arm member 68 that is carried in parallel spaced relationship above the transparent pattern support 65. When the machine is in operation, light from the forward end of the arm 68 is directed downwardly toward the scanning device 67 in a manner to be partially intercepted by the light differentiating edge of a pattern interposed therebetween and that is supported on the selectively movable pattern support 65. The scanning device 67 constitutes a sensing mechanism of a direction anticipating line tracker control system and is sensitive to a line of trace formed by the representation of a contour carried by the pattern support for selectively energizing the feed motors 53 and 54. As one alternative method of providing a line of trace, the representation of a contour may be scribed on an opaquely covered transparent plate that can be secured directly to the machine table 46 in place of the removable pattern support 65. The feed motors are, in turn, operative to effect a coordinate feeding movement of the pattern support 65 and work table 46 along a path of travel corresponding in configuration to the guiding contour, thereby effecting a uniform advancement of the line of trace relative to the scanning device.

Figure 7:
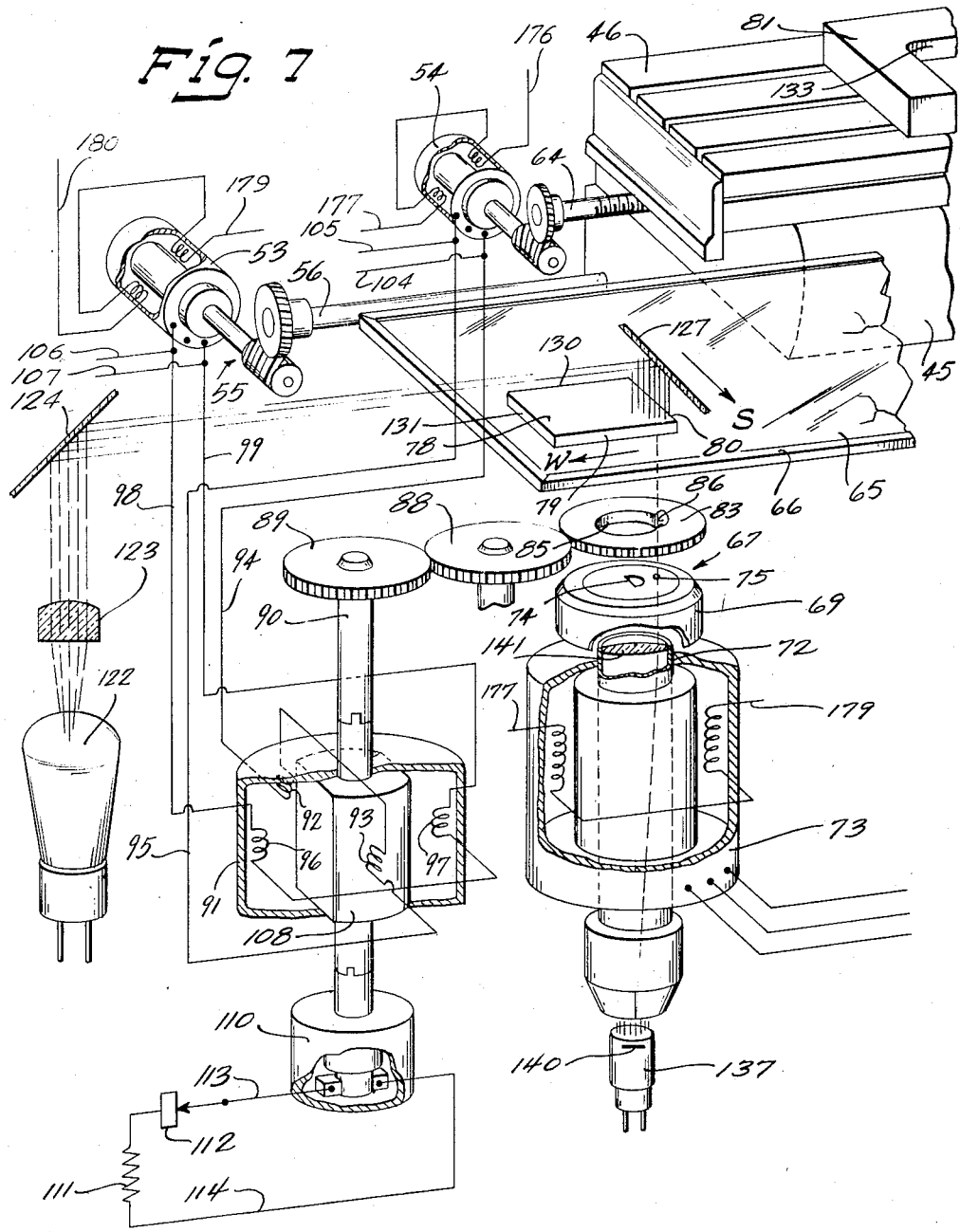
Fig. 7 is an enlarged fragmentary view, partly diagrammatic and partly in perspective, showing a portion of the control mechanism.

As shown in Figs. 2, 4 and 7, the scanning device 67 comprises a rotatable shutter head 69 that is affixed to a tubular motor shaft 72 extending upwardly from a housing 71 secured to the front face of the knee 44. The rotatable shutter head 69 is driven at synchronous speed, for example, 3600 R. P. M. by the hollow shaft 72 of a motor 73 mounted within the housing 71. As shown in Figs. 2 and 7, the shutter head 69 is provided in its upper surface with two light passing openings 74 and 75 respectively arranged to pass light downwardly through the hollow motor shaft 72 in the form of two spaced light beams. The larger semi-circular or D-shaped opening 74 is positioned eccentrically with respect to the rotational axis of the hollow motor shaft 72 and will henceforth be known as the copy aperture. Inasmuch as the shutter head 69 is normally rotated continuously in a counter-clockwise direction, the eccentrically positioned D-shaped copy aperture 74 is disposed to produce a continuously moving copy signal light beam. The smaller opening 75 is spaced radially outward from the circular portion of the D-shaped copy aperture 74 along a line approximately perpendicular to the straight or leading edge thereof and will hence forth be known as the anticipating hole. Since the copy aperture 74 and the anticipating hole 75 are continuously moved in spaced relationship as the shutter head is rotating, the anticipating hole 75 is disposed to produce a downwardly projecting anticipating signal light beam that continuously sweeps through an orbital path of travel in relatively fixed correspondence with the simultaneously moving copy signal light beam.

When the machine is not being used to perform a copying operation, the copy signal light beam and the anticipating signal light beam will be continuously formed by the rotating copy aperture 74 and anticipating hole 75 respectively, to provide uninterrupted light beams that are continuously moved along their respective orbital paths of travel. With this condition existing, that is with continuously moving uninterrupted light beams, the feed motors 53 and 54 will not be energized and the work table 46 will remain stationary. Likewise, if an opaque pattern is placed on the pattern support 65 in a manner to completely overlie the scanning device 67 as well as the orbitally moving copy aperture 74 and anticipating hole 75, the work table 46 will also be retained in unmoving relationship to the tool spindle 50. It will be readily apparent that whenever an opaque pattern completely overlies the orbitally moving copy aperture 74 and anticipating hole 75, the light directed downwardly toward the rotating shutter head 69 will be intercepted to prevent the formation of either a copy signal light beam or an anticipating signal light beam.

During an actual copying operation, however, a pattern, such as the opaque male pattern 78 shown in Figs. 2 and 7, is positioned on the transparent pattern support 65 in such a manner as to partially overlie the shutter head 69 as well as the orbital paths of movement of the copy aperture 74 and the anticipating hole 75, respectively. As a result, the copy aperture 74 and anticipating hole 75 are thereby moved into overlapping relationship with an edge 79 of the pattern 78 delineating a relatively straight line of trace once during each revolution or cycle of operation. Since the opaque pattern partially intercepts the light directed downwardly toward the rotating shutter head 69, light beam signals will be selectively formed by the copy aperture 74 only during a restricted portion of its orbital path of movement. Assuming that the pattern 78 is being moved westward, as will hereinafter be more fully explained, formation of an anticipating signal light beam is further restricted to occur only at the instant the anticipating hole 75 overlaps an edge 80 of the pattern 78, Fig. 7, delineating a directional change in the line of travel to prevent overtravel as the corner is traversed.

With the shutter head 69 being continuously rotated in a counterclockwise direction, the copy aperture 74 is disposed to provide a continuous succession of light beam pulses or signals for effecting feeding movement of the pattern support 65 and the work table 46 along a path of travel corresponding to the contour of the male pattern 78. The regularly recurring copy signal light beam pulses, formed as the D-shaped copy aperture 74 overlaps the edge 79 of the pattern 78 so function to control directional movement that the edge of the pattern is constantly maintained a fixed normal distance from the rotational axis of the shutter head 69. Since the pattern 78 is being continuously advanced in response to the regularly recurring light pulses passed by the copy aperture 74, the copy aperture will be moved into overlapping relationship with successively new portions or edge zones of the pattern. Any slight angular changes in the advancing edge of the pattern will produce a change in the duration of the resulting copy signal light pulses which, in turn, operates to correct the direction of pattern movement in conformity with the changed path of travel dictated by the pattern. Generally a male pattern, such as the pattern 78, is used to guide feeding movement of the work table 46 relative to the tool spindle 50 in a manner that a female contour can be generated in a workpiece, for example, the workpiece 81 supported on the table.

The scanning device 67 is operative to anticipate a corner formed by a directional change in the line of travel due to the cooperative operation of a blanking device 82 that is operatively interposed between the horizontally movable pattern support 65 and the vertically fixed shutter head 69, as shown in Figs. 2, 4 and 7. The blanking device 82 is so arranged that the anticipating hole 75 in the shutter head 69 is operative to pass an anticipating signal light beam only when it sweeps into overlapping relationship with an edge of the pattern delineating a directional change in the path of movement. As will hereinafter be more fully explained, the resultant, recurring anticipating signal light beam pulses are disposed to so modify the effect of the copy signal light beam pulses formed during corresponding cycles as to effect a controlled deceleration of work table movement to prevent overtravel as a corner is traversed.

The blanking device 82 comprises essentially a rotatable gear or blanker 83 coaxially journalled above the shutter head 69 toward the inner end of a horizontal arm member 84 that is pivotally carried at its forward or outer end by the housing 71. As shown in Figs. 2 and 7, the blanker 83 is provided with a circular opening 85 that is smaller than the orbital path of movement followed by the anticipating hole 75 and larger than that followed by the copy aperture 74. The blanker 83 is further provided with a notched out opening 86 extending radially outward from the circular opening 85 in a manner to intercept the orbital path of movement followed by the anticipating hole 75. While the blanker 83 does not interfere with the formation of a copy signal light beam, it does prevent the formation of an anticipating signal light beam excepting during that period in which the anticipating hole 75 sweeps into overlapping relationship with the radially extending opening 86 formed therein.

In order that the blanking device 82 will be effective to selectively control the formation of anticipating signal light beam pulses, the rotatable blanker 83 is arranged to be so oriented that the radially extending notch 86 formed therein normally is pointed in a direction opposite to the direction of pattern movement. With the pattern 78 being advanced in a westward direction of movement, as shown in Fig. 2 for example, the radial opening 86 will be pointed in an eastward direction. With the blanker positioned as shown, it will also be noted that the radial opening or notch 86 is so formed as to be completely covered by the opaque portion of the pattern 78, with its edge spaced inwardly from the edge 79 of the pattern delineating the major path of movement. In order that the invention will operate to anticipate only slight directional changes in the path of travel, the edge of the blanking notch 86 is preferably arranged to be substantially coincidental with the pattern edge, and within the opaque zone. As the pattern 78 is gradually advanced in a west direction therefore, the radial opening 86 of the blanker 83 will gradually overlap the edge 80 of the pattern, marking a change in the path of movement. The anticipating hole 75 will then begin to simultaneously overlap the blanker notch 86 and the pattern edge 80 to pass a series of regularly recurring anticipating light beam pulses that are operative to effect a controlled deceleration of the westwardly moving pattern 78, as shown in Fig. 7.

To maintain the blanker 83 properly oriented with respect to the guiding line of trace, the gear teeth formed thereon are operatively engaged by an idler gear 88 journalled in the arm 84 and that, in turn, is disposed to be driven by a gear 89 secured to the upper end of a vertical shaft 90 journalled toward the outer end of the arm member 84. The shaft 90 is disposed to be rotatably positioned by a direct current selsyn or positioning motor 91 mounted within the housing 71. The selsyn operates as a positioning motor only and is provided with a rotor that rotates to a relatively fixed angular position with respect to the stator in accordance with the relative magnitude and polarity of two separate direct current voltages. Energy for activating the D. C. selsyn 91 is derived from the main supply conductors that are operatively connected to transmit direct current to the armature terminals of the reversible feed motors 53 and 54.

As shown in Fig. 7, two of the selsyn field windings 92 and 93 are connected in series to a pair of conductors 94 and 95 leading to the armature terminals of the table feed motor 54 that is disposed to effect east or west movement of the work table 46. The other two field windings 96 and 97 are connected in series through a pair of conductors 98 and 99 leading to the armature terminals of the direct current saddle feed motor 53 that is disposed to effect north or south movement of the saddle 45. Rectified current of the required polarity for effecting selective proportional energization of the feed motors 53 and 54 in response to control signals from the scanning device 67 is supplied through a pair of supply conductors 104, 105 and conductors 106, 107, respectively. With the feed motors 53 and 54 energized to effect directional feeding movement of the table 46, the selsyn field windings 92 and 93, as well as the windings 96 and 97 will be proportionately energized by the applied E. M. F. to the feed motors to angularly position the selsyn armature or rotor 108 which may be of the permanent magnet type. With the D. C. selsyn 91 positioned in accordance with the selected rotational speeds of the reversible feed motors, the gears 89 and 88 will be so positioned as to retain the radial opening 86 in the blanker 83 pointed in a direction opposite to the directional feeding movement of the pattern support 65 and the table 46.

By means of this arrangement, the selsyn 91 is responsive to the slightest changes in the rotational speed of the feed motors 53 and 54 for reorienting the blanker notch 86 in accordance with any change in the direction of feeding movement. In the event of an abrupt change in the direction of table movement, resulting from a sudden change in the speed or direction of feed motor rotation, however, the selsyn armature 108 tends to swing beyond the normal position required in responding to the suddenly changed applied E. M. F. to the feed motors. As a result, the armature 108 of the selsyn may oscillate (unless prevented) for a period of time before assuming the relatively steady state position required for the new direction of feeding movement. Such resulting oscillations of the blanker 83 might be sufficient to allow the notched opening 86 formed therein to overlap an edge of the pattern delineating a straight path of movement with the result that the anticipating hole 75 would pass an anticipating light beam signal at the wrong time in the cycle. The improperly formed anticipating signal light beam thus would tend to allow the rotating copy aperture 74 to move over the line of trace and might result in a complete cessation of feeding movement.

To obviate this difficulty, as shown in Fig. 7, a direct current generator 110 is operatively arranged to be driven by the selsyn 91 in a manner to exert a braking or damping action whenever the selsyn armature 108 is suddenly moved to a new angular position. The output of the generator 110 is shunt connected through a resistor 111 and a rectifier 112 by means of a pair of conductors 113 and 114 to provide a resistance load that is proportionate to the speed and extent of reversed selsyn rotation. The generator 110 has no effect on the initial movement of the selsyn armature 108, which will swing beyond the required position in responding immediately to the changed applied E. M. F. to the feed motors 53 and 54. As the selsyn amature reverses to swing back to the required new directionally changed position, however, the generator 110 reverses polarity to pass current through the rectifier to its load resistor and thus by reaction exerts a braking action, that prevents a reversed oscillation beyond the position established by the direction of the field flux. The generator 110 is operative to afford a more closely regulated directional control of the blanker 83 for maintaining the notch 86 formed therein in a position below the opaque portion of a pattern and spaced inwardly from the guiding edge thereof.

For providing convenient access to the shutter head 69, the arm member 84 disposed to support the blanking device 82 is arranged to be pivotally movable to a nonoperating position, as indicated by the solid lines in Fig. 2. To this end, the arm member is provided at its forward or outer end with a frusto-conical bearing member 115, Fig. 4, that is received in a complementary bearing recess formed in the upper part of the housing 71. The bearing member 115 is axially concentric with a bored hole that is disposed to rotatably support the selsyn driven shaft 90. To retain the blanking device 82 in its proper operating position, with the forward end of the arm 84 directly above the shutter head 69, as indicated by the broken lines in Fig. 2, there is provided a detent mechanism 116 operative in well known manner to engage a detent notch formed in the bearing member 115.

In order that the copy aperture 74 and anticipating hole 75 may pass sharply defined light beam signal pulses, a well collimated intense beam of light is directed downwardly toward the shutter head 69 from the inner end of the hollow arm member 68. At its forward or outer end, as shown in Fig. 4, the arm member 68 is provided with a frusto-conical bearing member 119 adapted to be pivotally received in a complementary bearing recess formed in the upper forward portion of the housing 71. By means of this arrangement, as shown in Fig. 2, the arm 68 may be angularly displaced from its normal operating position in order to obtain convenient access to the shutter head 69 To retain the arm 68 in an operating position with its forward end directly above the shutter head 69, as indicated by the broken lines in Fig. 2, there is provided a detent mechanism 120 having a plunger 121 that is operative in well known manner to engage a cooperating detent hole formed in the bearing member 119. As shown in Fig. 4, the light beam directed downwardly from the inner end of the hollow arm 68 is derived from an arc lamp 122, constituting a preferred source of radiant energy, that is positioned below a vertically bored hole extending through the bearing member 119 at the forward end of the arm. From the arc lamp 122, light is directed vertically upward through a condensing lens 123 toward an angularly positioned reflecting mirror 124 mounted in an adjustable carrier 125 within the hollow arm member 68. From the mirror 124, the light is reflected horizontally through the hollow central portion of the arm member 68 toward a semi-transparent angularly positioned mirror 127 secured in similar fashion to an adjustable carrier 128 at the inner end thereof. The semi-transparent mirror 127, in turn, serves to reflect the major portion of the light beam vertically downward through the transparent pattern support 65 toward the shutter head 69 whenever the arm is in its operating position.

It is essential that the light beam directed downwardly toward the shutter head 69 fully encompass the orbital paths of movement described by the copy aperture 74 and the anticipating hole 75 to insure the proper formation of light beam signals for controlling machine operation. To the end that a machine operator may periodically inspect the exact position of the downwardly projected light beam relative to the shutter head 69, therefore, a transparent window 129 is provided in the upper surface of the arm 68 immediately above the semi-transparent mirror 127. In the event it is necessary to refocus the light beam, the carriers 125 and 128 respectively disposed to support the mirror 124 and the semi-transparent mirror 127 are arranged to be pivotally adjustable about mutually perpendicular vertical and horizontal axes. This adjustment, however, is usually permanently accomplished prior to the time the machine is initially placed in operation.

Although the opaque male pattern 78 is illustrated in Figs. 2 and 7 as providing a contour disposed to activate the scanning device 67 for effecting feeding movement of the pattern and workpiece along a like path of travel, other suitable representations of a guiding contour may be employed with equally good results. To properly activate the scanning device, however, the guiding contour must provide a light differentiating line of trace constituting, in effect, a line of demarcation between an opaque section and a transparent or translucent light passing portion. The actual line of trace constituted by such a line of demarcation is of zero width. It is necessary, however, that the opaque zone be at least as wide as the orbital path of movement described by the outermost end of the anticipating aperture 75. Likewise, it is preferable that the transparent or translucent zone adjacent the opaque zone be as wide as the radial spacing between the copy aperture 74 and the anticipating hole 75. Thus, a representation of a contour delineating a required path of movement may be formed by other means including a template, a drawing, or an opaquely coated glass plate having a scribed, transparent line of trace and which may be secured directly to the work table 46 by means of the brackets 66 in place of the transparent pattern support 65. In the latter case, the anticipator hole 75 may be elongated radially toward the center of rotation to insure full duration for the anticipator signal.

The male pattern 78 shown in the drawings is so positioned on the pattern support that the opaque portion thereof is disposed to completely overlie the axis of rotation of the shutter head 69. As the pattern is displaced along a path of movement determined by its configuration, the respective edges 79, 80, 130 and 131 will be successively moved relative to the shutter head 69 in a manner that the rotational axis thereof is maintained a fixed normal distance from each moving pattern edge and under the opaque zone. The orbitally moving copy aperture 74 sweeps into overlapping relationship with an edge of the pattern once during each cycle to pass a single copy signal light pulse comprising one of a continuous succession of recurring copy signal light pulses that are operable to effect continuous directionally controlled movement of the pattern and workpiece at a substantially uniform feeding rate. The direction of pattern movement is opposite to the rotary movement of the copy aperture 74 which is continuously rotated in a counterclockwise direction in a manner that the straight or leading edge thereof overlaps the pattern edge first to initiate the passage of a copy signal light beam or light pulse. Each copy signal light beam thus initiated is terminated by movement of the trailing or circular portion of the copy aperture back over the moving pattern edge and into a zone below the opaque area which intercepts light projected downwardly from the arm 68 toward the shutter head 69.

In actual operation, the degree by which the rotating copy aperture overlaps the pattern edge is extremely slight. For all practical purposes, therefore, it may be said that the pattern edge is substantially tangential to the orbital path of movement described by the outermost end of the copy aperture. Since the respective pattern edges are moved in a direction opposite the direction of shutter head rotation, the copy aperture 74 will overlap an edge of the pattern to initiate a copy signal light pulse at a point slightly ahead of the point at which it again crosses the pattern edge to terminate that particular light pulse. There is a measurable distance between the respective points on the contour at which a copy signal is respectively initiated and terminated, this distance being termed the edge zone for controlling the direction of movement. As the pattern is moved relative to the shutter head, the copy aperture is continuously moved into overlapping relationship with successively overlapping edge zones of the guiding contour.

A male pattern, such as the opaque pattern 78, will be bodily displaced along a generally counterclockwise path of movement as each succeeding edge thereof is continuously moved in guiding relationship to the copy aperture 74 and the anticipating hole 75 of the scanning device. A pattern of the female type, on the other hand, will be bodily displaced along a generally clockwise path of movement, since the opaque portion thereof surrounds the female opening formed therein to provide a continuous inner edge delineating a line of trace for guiding work table movement. Inasmuch as the opaque portion of a female pattern must also overlie the axis of the shutter head, with the inner guiding edge thereof moving in a direction opposite to the direction of copy aperture rotation, a female type pattern will be bodily moved in a direction opposite to that of a male pattern. Either a male or a female pattern, however, may be used in conjunction with the scanning device to provide a light differentiating line of trace for effecting movement of a workpiece along a corresponding path of travel.

Referring again to Figs. 2 and 7, it will be apparent that the actual path of movement traversed by the opaque male pattern 78 will be smaller than the pattern itself by a fixed normal amount according to the distance the axis of the shutter head 69 is spaced inwardly from the guiding edge of the pattern. The workpiece 81 supported on the table 46 will be simultaneously moved along a corresponding path of travel relative to the axis of the tool spindle 50. Since the edge of the male pattern 78 is maintained a fixed distance from the axis of the shutter head 69 that equals the radius of a cutter, such as the endmill 132 carried by the tool spindle 50, a female contour 133 corresponding to the male pattern 78 will be generated in the workpiece 81. The female contour 133 will correspond in both size and configuration to the contour of the male pattern. As the work table 46 is caused to be moved in accordance with the shape and size of the male pattern 78, it will be noted that the cutter 132 may be utilized to generate a peripheral contour about a male workpiece, that is of corresponding shape, but smaller in size, than the male pattern. In like manner, a female type pattern may be utilized to activate the scanning device 69 for controlling movement of the work table 46 in order to generate either a male or a female contour of the required corresponding configuration.

To selectively energize the feed motors 53 and 54 for effecting coordinate feeding movement of the pattern support 65 and work table 46 along any required directional path of movement, a photoelectronic feed motor regulating system contained partly in the housing 71 and partly in a control cabinet 136, as shown in Fig. 1, is arranged to be activated by the light beam signals passed by the rotating shutter head 69. As shown in Figs. 4 and 7, the electronic motor regulating system is provided with a signal receiving photoelectric cell 137 mounted within the housing 71 below the hollow motor shaft 72 of the synchronous shutter head motor 73. The photoelectric cell 137 is supported in a removable carrier 138 that is threadedly received in a bracket 139 mounted within the housing 71 immediately below the motor 73. To permit unobstructed passage of light from the shutter head 69 to the photoelectric cell 137, the bracket 139 is provided with a vertically bored hole that is concentric with the circular opening extending through the hollow motor shaft 72. In order that the light beam signals respectively passed by the copy aperture 74 and the anticipating hole 75 are focused downwardly toward the light sensitive cathode 140 of the photocell 137, a focusing lens 141 is suitably mounted within the upper portion of the hollow motor shaft 72.

Figure 8:
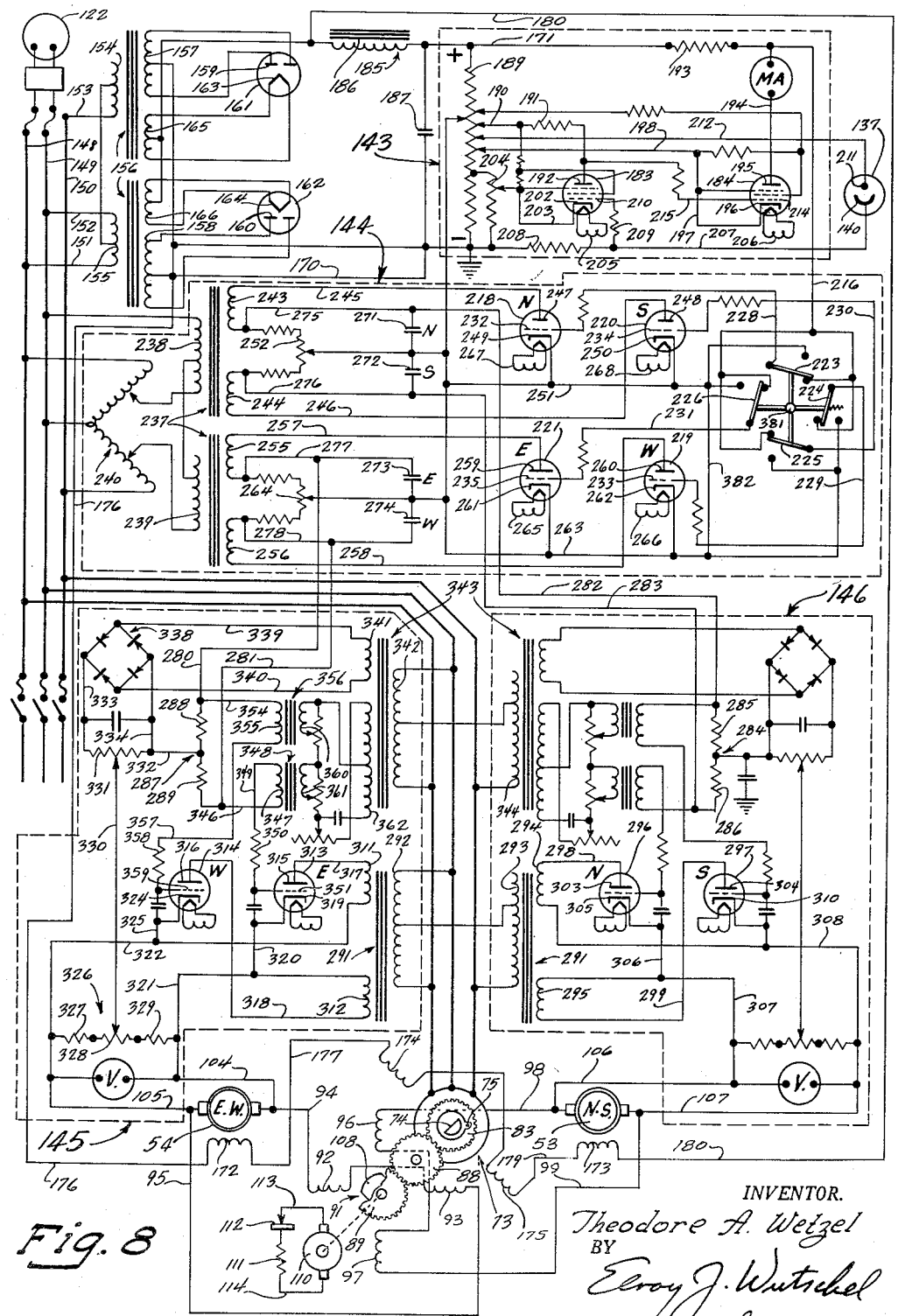
Fig. 8 is a schematic diagram showing the electrical control circuit and the associated controlling mechanism.

The photoelectronic motor regulating system, represented as an electrical circuit in Fig. 8, comprises essentially a photo signal amplifier 143 enclosed within the dotted lines, and an electronic translator 144 that is operative to transform amplified control signals into pulsating electrical control voltage for activating one or the other of two electronic motor controllers 145 and 146. The saddle feed motor 53 and the table feed motor 54 are thereby selectively energized for rotation in a clockwise or counterclockwise direction in accordance with the activation of one or the other of the two motor controllers 145 and 146, respectively. In order that the feed motors 53 and 54 may be selectively energized to effect feeding movement of the work table 46 along any required path of travel, the electronic translator 144 is disposed to constitute an electrical commutating timing device that operates in exact synchronism with the continuously rotating shutter head 69. Thus, the transistor 144 is disposed to provide electrical control voltage for effecting the required directional feeding movement of the table in accordance with the angular orientation of the shutter head 69 about its axis at the instant a particular light beam signal is formed by the copy aperture 74 or the anticipating hole 75, respectively.

Referring more specifically to Fig. 8, power is supplied from a suitable source through three phase alternating current lines 148, 149 ad 150 that are connected directly to supply current for driving the armature of the synchronous shutter head motor 73. From the three phase lines 148, 149 and 150, power is transmitted through branch conductors 151, 152 and 153 to the primary coils 154 and 155 of Scott connected transformers 156, having secondaries 157 and 158 respectively, which are connected to supply two phase current to the plates 159 and 160 of a pair of full wave rectifiers 161 and 162. The cathodes 163 and 164 of the rectifiers 161 and 162 are connected to coils 165 and 166 that are respectively energized by the primary coils 154 and 155 of the Scott connected transformers 156. The midpoints of the secondary coils 157 and 158 are connected to a common conductor 170. Likewise, the midpoints of the coils 165 and 166 disposed to energize the rectifier cathodes are connected to a common conductor 171.

The full wave rectifiers 161 and 162 provide a source of rectified direct current for energizing the field windings 172 and 173 of the direct current feed motors 54 and 53, as well as the field windings 174 and 175 of the synchronously driven shutter motor 73. A conductor 176 connected to the common conductor 170 of the direct current power source transmits current to the field 172 of the table feed motor 54 which is connected in series with the fields 174 and 175 of the synchronous motor 73 by means of a conductor 177. The field 175, in turn, is connected in series by means of a conductor 179 with the field winding 173 of the saddle feed motor 53 which is connected by means of a conductor 180 to the common conductor 171 of the power circuit.

The direct current power circuit leading from the full wave rectifiers to the common conductors 170 and 171 is also disposed to provide unidirectional current for energizing the signal receiving photoelectric cell 137 and for amplifying its output through the photo signal amplifier 143 comprising essentially the two pentodes or five element vacuum tubes 183 and 184. For smoothing out the ripples in this rectified power circuit, there is provided a filter 185 comprising a choke 186 and a shunt condenser 187. Interconnected between the common conductors 170 and 171 is a voltage divider or potentiometer 189, an adjustable point thereof being connected through a conductor 190 and a resistor 191 to the plate 192 of the tube 183 constituting the first stage of the amplifier 143. The positive potential conductor 171 is connected through a resistor 193 and a branch conductor 194 to the plate 195 of the pentode 184 that constitutes the second stage of the photo signal amplifier. The cathode 196 of the tube 184 is connected through branch conductors 197 and 198 to an adjustable point of the potentiometer 189, and the cathode 202 of the tube 183 is connected through a conductor 203 to an adjustable point of a second potentiometer 204 that is, in turn, interconnected between a fixed point of the potentiometer 189 and the common conductor 170. The screen grids and suppressor grids of both the tubes 183 and 184 are connected in well known manner to perform their usual functions. The filaments of the tubes are energized by a pair of secondary windings 205 and 206 that, in turn, are energized by the primary coils 154 and 155, respectively.

The normally non-conductive photoelectric cell 137 is disposed to control the signal output of the amplifier 143 by having its cathode 140 connected by a conductor 207 through a resistor 208 to the common conductor 170 or ground, as well as to a branch conductor and a resistor 209 leading to the control grid 210 of the first amplifying tube 183. The anode 211 of the photocell 137 is connected through a conductor 212 to an adjustable point of the potentiometer 189. The first amplifying tube 183 therefore is normally non-conductive since the potential of its control grid 210 is normally retained at ground level. As a result, the second amplifying tube 184 is normally conductive since its control grid 214 is connected by means of a conductor 215 through a protective resistor to the plate circuit of the tube 183. With the second amplifier tube 184 conducting anode current, the potential of a signal output conductor 216 leading from the plate 195 will normally be continuously maintained in the vicinity of the voltage level of the cathode 196.

Whenever a light beam signal or light impulse activates the photoelectric cell 137, however, the potential of the signal output conductor 216 will be raised (made more positive) toward the anode voltage supply level. During a normal copying operation, the photoelectric cell 137 is energized at recurring intervals by a continuous succession of light beam pulses. As a result, the amplifier 143 will be activated to magnify the voltage change of the photo signal and cause the output conductor 216 to swing voltage-wise toward the positive at recurring intervals and thus produce a continuous succession of signal voltage pulses for selectively activating the translator 144, indicated by the dotted lines in Fig. 8.

The recurring signal voltage pulses emanating from the amplifier 143, are disposed to control the operation of four vacuum tubes 218, 219, 220 and 221 constituting a major portion of the translator 144 for effecting the required directional feeding movement of the coordinately movable pattern support 65 and work table 46. As shown in Fig. 8, the translating tubes, which are of the three element type known as triode pliotrons, are designated N. W. S. and E. respectively, and are individually operative to selectively control the energization of the feed motors 53 and 54 for moving the work table along a north, west, south or east direction of travel. To selectively activate the tubes 218, 219, 220 and 221, a control circuit is established from the amplifier 143 through the signal output conductor 216 which is connected to the respective treminals of four normally closed switches 223, 224, 225 and 226. From the switches, the circuit continues through four branch conductors 228, 229, 230 and 231 respectively connected through a resistor interposed in each line to the four control grids 232, 233, 234 and 235 of the north, west, south and east translating tubes. The potential of the four control grids 232, 233, 234 and 235 will thus swing toward the positive to enable all four tubes to pass current in response to the amplified control signals received through the signal input conductor 216. Although all of the tubes will then be ready to pass current, only those having their plates positive at that particular instant will be actually operative to pass current.

For effecting a selective response to control signals provided by the single photoelectric cell 137, the four tubes 218, 219, 220 and 221 of the translator 144 are arranged to be sequentially operative in overlapping relationship and in such a manner as to constitute an electrical commutating timing circuit that operates in synchronism with the rotating shutter head 69. To effect this result, there is provided a second pair of Scott connected transformers 237 having a pair of primary coils 238 and 239 connected to receive current from the three phase power lines 148, 149 and 150 in a manner to provide two phase alternating current for the translating tubes. An infinitely adjustable transformer 240 of the type known as a variac is operatively interposed between the Scott connected transformers 237 and the three phase supply lines for controlling the voltage to the primary coils 238 and 239, and thus serve as a variable speed device for varying the feeding rate of the motors 53 and 54.

Current for activating the north and south tubes 218 and 220 of the translator 144 is derived from a pair of secondary windings 243 and 244 that are energized by the primary winding 238 to establish a related single phase from the three phase alternating current supply lines. From the opposite outer ends of the secondary windings 243 and 244, current is conducted through a pair of conductors 245 and 246 connected directly to the anodes or plates 247 and 248 of the north and south tubes. The cathodes 249 and 250 of these tubes are connected through a common conductor 251 to the midpoint of a resistor 252 interconected between the inner ends of the secondary windings 243 and 244.

In a similar manner, current for activating the east and west tubes 221 and 219 is derived from a pair of secondary windings 255 and 256 that are energized by the primary winding 239 in a manner to establish a related second phase from the alternating current supply lines, the second phase being displaced 90° from the first phase provided for the north and south tubes. From the secondary windings 255 and 256, current is transmitted through a pair of conductors 257 and 258 connected to the anodes 259 and 260 of the east and west tubes. The respective cathodes 261 and 262 of these tubes are connected through a common conductor 263 to the midpoint of a resistor 264 interconnected between the secondary windings 255 and 256 of the second of the Scott connected transformers 237. The filaments of the east and west tubes are respectively connected to a pair of coils 265 and 266 that are energized by the primary winding 239. In like manner, the filaments of the north and south tubes are respectively connected to a pair of coils 267 and 268 that are energized by the primary winding 238.

By means of this arrangement, the plates of the respective translating pliotrons are spaced in electrical quadrature relative to the synchronously rotating shutter head 69, as more clearly represented in Fig. 9. The D-shaped copy aperture 74 is there shown in four different positions, spaced 90° apart, and respectively representing the exact orientation of the rotating shutter head 69 at the instant the corresponding pliotron plates 247, 260, 248 and 259 are at their maximum positive voltage. The plate 247 of the north pliotron 218 is positive from 0° to 180°, represented by the angle N in Fig. 9, and reaches its maximum positive potential at the instant the copy aperture sweeps through a position indicated by the solid lines. In a similar manner, the copy aperture is indicated in dotted line positions A, B and C which coincide in time with the exact instant the respective plates 260, 248 and 259 of the west, south and east pliotrons reach their maximum positive voltage. The west pliotron plate 260 is positive from 90° to 270°, represented by the angle W; the south pliotron plate 248 is positive from 180° to 360°, represented by the angle S; and, the plate 259 of the east pliotron 221 is positive from 270° to 90°, as shown by the angle E. Since the translating tubes 218, 219, 220 and 221 are conductive whenever the respective plates thereof are at positive potential, these tubes will therefore be sequentially operative in overlapping relationship. For each cycle, corresponding with one revolution of the shutter head 69, one of the tubes, for example the north tube will be operative (insofar as plate voltage is concerned) for 180°, and two adjacent tubes, the east and west tubes will be operative during this time interval for 90°; the 90° representing the overlap of their respective phases.

Whenever the rotating shutter head 69 passes a light pulse signal, the photocell 137 will be energized to provide an amplified input signal for causing the four control grids 232, 233, 234 and 235 of the translating tubes to swing toward the positive. If the plate 247 of the north tube 218 is positive at that particular instant, the north tube will be operative to pass current representing an output reference voltage pulse that is operative to effect coordinate northward feeding movement of the pattern and workpiece. Assuming that the major direction of pattern movement at that particular instant is north, and that the duration of the input signal to the control grids is 90°, the east and west tubes will likewise pass current due to their overlapping relationship with the north tube. With the east and west tubes passing current for exactly equal periods of time, approximately 45°, the normal motor controlling effects of the reference output voltages therefrom are cancelled to prevent lateral movement of the pattern either toward or away from the major northward path of travel.

To selectively control the reference output voltage pulses from the tubes 218, 219, 220 and 221, the translator 144 is provided with four shunt condensers 271, 272, 273 and 274, respectively connected across the output of the tubes. The north condenser 271 is interconnected between the common conductor 251 and a conductor 275 in a manner to become charged whenever the north translating tube 218 is conductive. The south condenser 272 is interconnected between the common conductor 251 and a conductor 276 in a manner to become charged whenever the south tube 220 is passing current. In like manner, the east and west condensers 273 and 274 are interconnected between the common conductor 263 and a pair of conductors 277 and 278 in such a manner as to become charged in response to signal output pulses from the east and west tubes, respectively. The east and west condensers 273 and 274 are operatively connected through a pair of output conductors 280 and 281 to selectively activate the east and west motor controller 145, and the north and south condensers 271 and 272 are connected through a pair of output conductors 282 and 283 to selectively activate the north and south motor controller 146.

The north and south condensers 271 and 272 are disposed to cooperate in such a manner as to supply an output reference signal voltage of the required potential and polarity to a reference voltage divider 284 comprising two resistors 285 and 286 connected in series between the opposite ends of the conductors 282 and 283. The potential across the two resistors 285 and 286 constituting the north and south reference voltage divider 284 varies according to whichever of the condensers 271 and 272 has been preponderantly charged in response to output voltage pulses from the north and south translating tubes, respectively. The north and south motor controller 146 is, in turn, selectively activated to energize the saddle feed motor 53 for either clockwise or counterclockwise rotation at a required speed in accordance with the potential and polarity of the output signal voltage across the reference voltage divider 284.

In a similar fashion, the east and west condensers 273 and 274 are disposed to cooperate in a manner to transform output voltage pulses from the east and west translator tubes into a reference signal voltage that is fed across a reference signal divider 287 comprising a pair of resistors 288 and 289 interconnected between the conductors 280 and 281. As the potential and polarity of the output signal voltage across the reference divider 287 is resultantly varied, the east and west motor controller 145 will be correspondingly activated to energize the table feed motor 54 for rotation at the required speed in either a clockwise or counterclockwise direction.

Whenever the pliotrons of the translator 144 are not conducting, any charge remaining on the signal control condensers of the translator is dissipated through the bleeding resistors 252 or 264. Another shunt bleeding path for dissipating condenser charges is provided by the reference voltage dividers 284 and 287, respectively.

Power for energizing the motor controllers 145 and 146 is derived from a third pair of Scott connected transformers 291 having primary windings 292 and 293 respectively connected to be energized by the three phase alternating current supply lines 148, 149 and 150. A pair of secondary windings 294 and 295 energized by the primary winding 293 are connected to supply single phase alternating current for energizing a pair of gas filled tubes 296 and 297 of the type known as thyratrons and that are selectively operative to supply rectified direct current of the proper polarity to energize the saddle feed motor 53 for clockwise or counterclockwise rotation. From the opposite ends of the secondary windings 294 and 295, current is transmitted through a pair of conductors 298 and 299 connected to the anodes 303 and 304 of the north and south thyratrons, respectively. From the cathode 305 of the north tube 296, a power circuit may be established through a branch conductor 306 extending to a branch conductor 307 that, in turn, is connected through the conductor 106 to one armature terminal of the north and south or saddle feed motor 53. From the other armature terminal of the feed motor 53, a circuit is completed through the conductor 107 and a conductor 308 connected directly to the secondary winding 294. From the cathode 310 of the south tube 297, a power circuit may be established through the branch conductor 308 and the conductor 107 leading to one armature terminal of the saddle feed motor 53, and thence from the other armature terminal through the conductors 106 and 307 to the inner end of the secondary winding 295, the opposite end of which is connected to the plate 304 through the conductor 299.

Power for the east and west motor controller 145 is derived from a pair of secondary windings 311 and 312 energized by the primary winding 292 of the Scott connected transformers 291 in a manner to supply single phase alternating current (90° displaced with respect to the secondary windings 294 and 295) to a pair of gas filled tubes or thyratrons 313 and 314 that are selectively operative for supplying rectified direct current to energize the table feed motor 54. From the secondary windings 311 and 312, current is transmitted to the plates 315 and 316 of the east and west thyratrons 313 and 314 through a pair of conductors 317 and 318, respectively. From the cathode 319 of the east tube, a power circuit may be established through a branch conductor 320, a conductor 321 and the conductor 104 to one armature terminal of the table feed motor 54; and thence, from the other armature terminal, through the conductor 105, to a conductor 322 leading directly to the secondary winding 311. The cathode 324 of the west tube 314 is connected through a branch conductor 325, the conductor 322, and the conductor 105, through the feed motor armature to the conductor 104 and thence to the conductor 321 extending to the inner end of the secondary winding 312, the opposite end of which is connected to the plate 316 of the west tube. The filaments of the north and south thyratrons are activated by a pair of coils respectively energized by the primary winding 293; and, the filaments of the east and west thyratrons are activated by a pair of coils that are respectively energized by the primary winding 292.

The Scott connected transformers 291 supply two phase current to the four thyratrons so that the respective plates 303, 316, 304 and 315 thereof are disposed to be sequentially positive in overlapping relationship in a manner similar to the respective plates of the four translating tubes 218, 219, 220 and 221. Although the thyratron plates are thus spaced in electrical quadrature, the plate voltage to the individual thyratrons is disposed to lead the plate voltage to the corresponding pliotrons of the translator 144 by ninety degrees. Assuming that the plate 247 of the north translating tube 218 is positive from 0° to 180°, then the plate 303 of the corresponding north thyratron 296 will be positive from 270° to 90°.

Since each of the motor controllers 145 and 146 operates in like manner in response to signal output control voltage across the respective reference voltage dividers 284 and 287, only the east and west controller 145 for effecting selective energization of the table feed motor 54 will be described in detail. The east and west thyratrons 313 and 314 are disposed to be selectively activated in accordance with the potential and polarity of the input control voltage across the reference divider 287 and also in accordance with the potential and polarity of control voltage across a feed back control 326. The feed back control 326 comprises three resistors 327, 328, and 329 interconnected in series between the main supply conductors 104 and 105 leading to the armature terminals of the table feed motor 54. Whenever the motor 54 is rotating, it generates a counter E. M. F. that develops a feedback voltage across the feedback control 326, and that operates conjunctively with the input reference voltage across the reference voltage divider 287 to effect a precise speed regulation of the motor 54.

From a center tap of the resistor 328 constituting part of the feedback control 326, a circuit is completed through a conductor 330 leading to a tap on a resistor 331, and thence through a conductor 332 interconnected between one terminal of the resistor 331 and a midpoint of the reference voltage divider 287. The resistor 331 is disposed to supply a direct current grid bias voltage of predetermined value and is energized through a pair of conductors 333 and 334 leading to the output terminals of a direct current rectifier bridge 338. The rectifier bridge 338, in turn, is energized through a pair of conductors 339 and 340 leading to a secondary winding 341 that is energized by one primary winding 342 of a fourth pair of Scott connected transformers 343 that provides two quadrature phases from the three phase main supply lines 148, 149 and 150, the other phase being distributed from a primary winding 344 to corresponding components of the north and south motor controller 146.

A grid circuit for the east thyratron 313 is established from the cathode 319 thereof, through the conductors 320 and 321, thence through the rightward half of the feedback control 326 to the conductor 330. From the conductor 330, the grid circuit continues through the grid bias resistor 331, the conductor 332, and through the lower half of the reference voltage divider 287 to a conductor 346 connecting directly with one terminal of a secondary winding 347 of a transformer 348 energized by the main supply lines 148, 149 and 150. The circuit extends from the opposite terminal of the secondary winding 347 through a conductor 349 and a resistor 350 to the control grid 351 of the east thyratron 313.

In a similar manner, a grid circuit for the west thyratron 314 is established from the cathode 324 thereof through the conductor 325, the conductor 322 and through the leftward half of the feedback control 326 to the conductor 330. The circuit continues from the conductor 330, through the grid bias resistor 331, and the conductor 332 connected to the midpoint of the reference voltage divider 287, and through the upper half thereof to a conductor 354. The conductor 354 is connected to a secondary winding 355 of a transformer 356, and which, in turn, is connected through a conductor 357 and a resistor 358 to the control grid 359 of the west thyratron 314.

The transformers 356 and 348 are provided with a pair of primary windings 360 and 361 and are adjustably connected to be energized by a secondary winding 362 that, in turn, is energized by the primary winding 342 of the Scott connected transformers 343. The transformers 348 and 356 are disposed to be so energized as to provide a predeterminately adjusted phase shift arrangement, operable in a manner that the secondaries 347 and 355 thereof provide a lagging A. C. grid component of proper potential and phase relationship to the control grids of the east and west thyratrons, respectively. The respective A. C. voltages supplied by the secondary windings 347 and 355 to the control grids 351 and 359 of the east and west thyratrons are disposed to lag the anode voltages of the respective tubes by approximately 90°. The net effect of the lagging A. C. voltage component to the control grids 351 and 359 is to make the thyratrons 313 and 314 controllable over most all of the half cycle of conduction and thereby provide proper response to instantaneous changes in grid potential that exceed the critical grid voltage.

The D. C. negative bias voltage component supplied in each of the grid circuits by the drop across the resistor 331 is operative to control the thyratrons 313 and 314 by permitting limited firing for each, whenever the motor controller 145 is not being activated by the east and west translating tubes 221 and 219. With this condition existing, there is no signal voltage across the reference voltage divider 287 and no control voltage across the feedback control 326, whenever the motor 54 is not rotating to generate a counter E. M. F. During this quiescent state, however, it is essential that the armature of the feed motor 54 be instantaneously responsive to unidirectional current supplied through the conductors 104 and 105 in the event a signal voltage suddenly appears across the reference voltage divider 287. To this end, direct current pulses of reversing polarity and very low magnitude are continuously applied to the armature of the table feed motor 54 whenever the motor controller 145 is at rest. To effect this result, the negative grid bias voltage across the resistor 331 is so adjusted as to permit each of the thyratrons to fire very late in their respective cycles in a manner to supply alternating current of a very low magnitude, approximately 30 volts, to the table feed motor armature. It will be noted that, with the thyratrons 313 and 314 firing alternatively in each cycle, they operate conjunctively to produce a continuous succession of reversed polarity direct current pulses of sufficient magnitude to just balance the static friction of the feed drive but not great enough to cause motor rotation.

Each alternative direct current pulse thus supplied is of opposite polarity, in a manner that the continuous succession of pulses constitute in effect an alternating current of low voltage. The D. C. current pulses alternatively produced by the thyratrons 313 and 314 are balanced in potential and polarity and are of insufficient value to effect any movement of the feed motor 54. These current pulses however do oscillate in time with the periods during which a particular tube may be caused to conduct current for energizing the feed motor. Whenever there is a signal input voltage across the voltage reference divider 287 therefore, one or the other of the thyratrons 313 or 314 will fire earlier than it normally would be caused to fire by the grid bias voltage across the resistor 331 alone. The larger D. C. current pulse resultantly passed by that particular tube, in turn, operates to effect immediate movement of the feed motor armature in the required direction of rotation.

The motor controller 145 is thus disposed to respond immediately to input reference signals across the reference voltage divider to effect immediate energization of the table feed motor 54 for rotation in either a clockwise or counterclockwise direction. To obtain an extremely close regulation of speed, the counter E. M. F. generated by the rotating motor 54 is applied across the feedback control 326 in a manner to effect deenergization of the motor armature as soon as the motor speed matches the speed called for by the input signal voltage. If the motor speed exceeds the required speed, the counter E. M. F. across the feedback control 326 is disposed to exert a plugging action on the motor 54 in order to decrease its speed sufficiently to exactly conform to the requirements of the input signal voltage across the reference voltage divider.

To retain the edge of a continuously moving pattern a fixed normal distance from the axis of the shutter head 69, the scanning device 67 is operative to urge the guiding line of trace toward and away from the axis of the shutter head 69 alternatively during each cycle. The alternative motor torque pulses for motion toward and then away from the shutter head occur with such rapidity during the small increment of feeding advance for one cycle, that the workpiece is steadily and uniformly advanced without lateral displacement along an unwavering path of movement during repetitive cycles of operation. If the pattern is being moved along a straight path of travel, these motor torque pulses for motion toward and away from the axis of the shutter head 69 will be in exact balance, and this state of equilibrium will prevail during repetitive cycles of operation. If, however, the pattern is being moved along a curved path of travel, the motor torque pulse for motion away from the shutter head will be either greater or smaller in duration than the initial pulse toward the shutter head, depending on the exact direction of movement dictated by the pattern. The change in balance between the respective motor torque pulses for motion toward or away from the axis of the shutter head, provide the necessary lateral correction to constantly maintain the path of travel of the continuously moving pattern in exact correspondence with the configuration of the guiding contour. The translator 144 functions in such a manner as to tend to reestablish equilibrium between the respective motor torque pulses for motion toward and away from the axis of the shutter head. Since the edge of the moving pattern is thereby continuously maintained a fixed normal distance from the axis of the shutter head, the rotating copy aperture 74 overlaps a straight edge thereof by substantially the same amount during repetitive cycles.

As schematically shown in Figs. 17, 18 and 19, the pattern 78 is represented as being moved in a westward direction relative to the continuously rotating copy aperture 74. To effect lateral correction of the edge 79 of the westwardly moving pattern 78 relative to the axis of the shutter head 69, the duration and angular orientation of a copy light pulse passed by the copy aperture 74 is disposed to vary in accordance with the distance of the pattern edge 79 from the axis of the shutter head 69, as well as its angular orientation relative thereto. Copy light beam signals varying slightly in duration activate the translator 144 to effect the necessary lateral correction with respect to the line of trace, as indicated by the sine waves representing the overlapping pliotron plate voltages of the translator 144 and shown in Figs. 17a, 18a and 19a. For purposes of simplification, only the upper or positive half-waves of the overlapping sine waves are shown in the drawings. To more clearly illustrate the lateral correcting effect of the copy aperture 74, the pattern 78 is represented in Figs. 17 and 19 as being bodily displaced an unduly large amount from the path of westward movement it would normally follow and as shown in Fig. 18. The eccentricity of the copy aperture 74, as well as the relative activation of the translator pliotrons, Figs. 17a, 18a and 19a are correspondingly exaggerated to emphasize the corrective movement of the pattern 78 with respect to the normal line of trace. In operating the machine to traverse a perfectly straight line of trace, however, it is to be noted that these exaggerated conditions would not usually occur.

As shown in Fig. 18, the edge 79 of the pattern 78 delineating the major path of movement at that instant is always maintained perpendicular to a line 370 extending radially outward from the axis of the shutter head 69 and that may be referred to as a normal line denoting the major axis perpendicular to feed. This relationship exists irrespective of angular changes in the contour of a guiding pattern that may require a corresponding directional change in the path of travel and is determinative of the angular orientation of the rotating shutter head 69 at the instant it passes either a copy signal light beam or an anticipating signal light beam. As shown in Fig. 18, the copy aperture 74 is shown in overlapping relationship with the pattern edge 79 that represents an average or median position as it sweeps through an arc of movement to pass a copy light signal pulse for effecting movement of the pattern along a westward path of travel, the dotted area adjacent the pattern edge 79 representing the degree of overlap. It will be noted that the average position of the copy aperture 74, represented by the solid lines, is skewed slightly ahead of the normal line 370 by a certain angle P that may be referred to as the phasing angle. Although the phasing angle P may vary slightly, the most satisfactory results are obtained by predeterminately establishing its value at about 20°. The exact instant the copy aperture 74 begins to overlap the pattern edge 79 to pass light, as well as the instant it sweeps back over the pattern edge to terminate the light pulse, is determined by the phasing angle.

Referring to Fig. 18, the westwardly moving pattern 78 is so located with respect to the rotating shutter head 69, that the copy aperture 74 will sweep through an arc of approximately 90° represented by the angle F, as it overlaps the guiding edge 79. This is the normal duration of a copy signal light pulse whenever a straight line of trace is being traversed. As the rotating copy aperture sweeps through the dotted line position A, the leading edge thereof will begin to overlap the pattern edge 79 to initiate a copy signal light pulse. This light pulse continues as the copy aperture 74 sweeps through its average position, indicated by the solid lines, and is terminated at the instant it moves back under the opaque portion of the pattern 78, as indicated by the dotted lines B. The copy signal light pulse is terminated by movement of the circular or trailing edge of the copy aperture 74 back across the pattern edge 79 and into the opaque zone. The distance between the points on the edge of the guiding pattern at which a copy signal light pulse is respectively initiated and terminated constitute an edge zone of the pattern for controlling the direction of movement. Since the degree by which the copy aperture 74 overlaps the pattern edge is extremely slight, each succeeding overlapping edge zone of the pattern is extremely short in length. The exact length of each overlapping edge zone is a function of the feeding rate.

The copy signal light pulse passed as the copy aperture 74 sweeps through the angle F, will activate the north, west and south tubes of the translator 144, as shown in Fig. 18a. As there shown, the amplified signal from the amplifier 143 is represented as a square wave having a duration of approximately 90° and that is superimposed on the overlapping positive half-waves of the translator tubes occurring during one cycle. It will be apparent that the leading edge 371 of the signal coincides in time with the initiation of the light pulse as the copy aperture 74 sweeps through its dotted line position A. The rearward edge 372 of the signal coincides in time with the termination of the light pulse as the copy aperture sweeps through the dotted line position B under the opaque zone. Within the duration of the light pulse, the small sections of the sine waves represent the period during which the south and north condensers 272 and 271 are charged, as indicated by the shaded areas in Fig. 18b. The north and south condensers being charged equally, there will be no lateral movement of the pattern 78 with respect to its westward path of movement, since no lateral correction is required. Inasmuch as the north and south condensers are charged sequentially, however, there will be a resulting imperceptible voltage difference pulse to call for north movement that is exactly balanced by a voltage difference pulse calling for south movement. The pattern edge 79 is thereby urged in a northward direction toward the axis of the shutter head 69 and, alternatively in a southward direction away from the shutter head 69. During repetitive cycles, these impulses alternate with such rapidity that there is no perceptible movement either toward or away from the shutter head 69. Within the duration of the copy signal light pulse, Fig. 18a, the west translating tube 219 is simultaneously conductive to charge the west condenser 274, as indicated by the shaded area in the Fig. 18c, for effecting continued feeding movement of the pattern 78 in a westward direction.

As shown in Fig. 17, the pattern edge 79 is represented as being too far away from the axis of the shutter head 69, and the rotating copy aperture 74 sweeps into overlapping relationship with the line of trace to pass a copy signal light pulse that is shorter in duration as indicated by the angle H. With this condition existing, the pattern 78 will be urged to move northward to effect the necessary lateral correction at the same time it is being displaced along the major westward path of travel. The sections of the overlapping sine waves within the duration of the copy signal light pulse, Fig. 17a, indicate the relative time that the north, west and south translating tubes are conductive. Due to the particular configuration of the copy aperture 74, it will be noted that the leading edge 374 of the amplified square wave signal recedes slightly, while the trailing edge 375 is advanced by a somewhat greater amount. As indicated by the shaded areas in Fig. 17b, the north condenser 271 will then be charged voltage-wise to a greater extent than the south condenser 272 and the pattern will be urged northward until its guiding edge 79 coincides with its normal position, indicated by the dotted line 376 in Fig. 17, during a westward path of movement. As shown by the shaded area, Fig. 17c, the west condenser will be simultaneously charged to a voltage for effecting continued westward movement.

In a similar manner, if the guiding edge 79 of the pattern 78 is too close to the axis of the shutter head 69, as shown in Fig. 19, the copy aperture 74 operates to effect lateral correcting movement in a southward direction. With this condition existing, the rotating copy aperture 74 will overlap the pattern edge 79 to pass a proportionately longer copy signal light pulse as it sweeps through the angle G. The north, west and south translating tubes are conductive during the copy light pulse, indicated in Fig. 19a, to charge the north, west and south condensers respectively, as indicated in Figs. 19b and 19c. With the south condenser charged preponderantly, the pattern 78 will be moved southward until the edge 79 thereof coincides with its normal position, indicated by the dotted line 376 in Fig. 19 during a westward path of travel. Due to the configuration of the copy aperture 74, the leading edge 377 of the amplified square wave copy signal is advanced by a lesser amount than the rearward edge 378 thereof is extended. Irrespective of angular changes in the line of trace relative to the shutter head 69, the instant at which a light pulse signal is initiated varies a lesser amount than the instant at which the signal is terminated. The trailing or circular edge of the copy aperture 74 is more sensitive to directional changes in the line of trace and operates to shorten or extend the duration of a particular copy signal light pulse in accordance with the requirements of the guiding contour.

It is to be noted that the primary purpose of Figs. 17 to 19c inclusive is to illustrate the general sequence of events occurring during several different operating conditions for comparative purposes. These figures, as well as other similar views hereinafter described, are not intended to illustrate in complete detail the dynamically changing electrical values in each component of the electrical control system.

To simplify the description, and for purposes of uniformity, for example, all of the figures portraying the overlapping voltages of the translator tubes as Figs. 17a, 18a and 19a, represent the translator anode voltages as being at their maximum positive potential. Obviously this would be the case only when the respective condensers associated with the translator tubes were not charged in response to signal voltage pulses from the translator. It is assumed therefore that the positive half-waves shown in the drawings represent the positive anode voltages of the translator immediately prior to an initial charging pulse for a respective one of the condensers. After a particular condenser has become charged, the voltage across its terminals would be subtractive from the voltage of the associated translator plate A. C. voltage supply.

For like purposes of simplification, the figures, such as 17c, 18c and 19c, are representative of the sum total of net stored condenser charges at a particular instant in time. In actual operation, there would be a series of charging pulses diminishing in magnitude as a particular condenser became charged to a certain voltage level with a consequent diminution in the anode voltage of the associated translating tube after each charging pulse, since the anode voltage is always measured with respect to the cathode.

To facilitate movement of a pattern into guiding relationship with the scanning device 67, the feed motors may be selectively energized by a manually movable toggle lever 381 that is pivotally carried in the upper surface of the housing 71, as shown in Fig. 1. The inner end of the toggle lever 381, as shown in Fig. 8, is movable to selectively actuate one or another of the normally closed switches 223, 224, 225 and 226 that are operatively interconnected between the signal input conductor 216 and the control grids of the respective pliotrons of the translator 144. Actuating one or the other of the switches operates to selectively disconnect a respective pliotron control grid from the automatic feed signal conductor 216, and, in turn, operates to connect that particular control grid to a common conductor 382 connected to the common cathode conductors 251 and 263. The translating pliotron controlled by that control grid, in turn, is conductive to effect feeding movement of the work table 46 and pattern support 65 in the selected direction of travel. The toggle lever 381 is selectively operable to effect movement of the work table 46 in one of eight major directions of travel including N., N. W., W., S. W., S., S. E., E. and N. E. The directions intermediate the four major points of the compass are obtained by moving the toggle lever 381 to actuate any two adjacent switches simultaneously for energizing both of the feed motors 53 and 54 to effect a resultant feeding movement along a selected angular path of travel. As soon as a pattern has been moved into overlapping relationship with the scanning device 67 under control of the toggle lever 381, the copy aperture 74 will overlap the pattern edge to pass copy signal light beam pulses that predominate over the manual control. The automatic or photocell feed will then effect automatic feeding movement of the work table 46 according to the dictates of the guiding contour.

In actual operation for example, as shown in Fig. 2, the opaque pattern 78 and the workpiece 81 are represented as being simultaneously moved along corresponding westward paths of travel with the edge 79 of the pattern being continuously maintained a fixed normal distance from the axis of the shutter head 69. With the table feed motor 54 energized to effect westward movement in response to the copy signal light beam signals passed by the rotating copy aperture 74, the blanker 83 will be so oriented that the radial notch 86 therein is pointed eastward or opposite to the direction of pattern movement. The blanker 83 thus prevents formation of an anticipating signal light pulse as the anticipating hole 75 sweeps into overlapping relationship with the edge 79 of the pattern 78 delineating the westward path of travel. As the shutter head 69 is continuously rotated in a counterclockwise direction, the copy aperture 74 overlaps the edge 79 of the moving pattern 78 at recurring intervals to pass a continuous succession of copy signal light pulses of substantially equal duration for effecting continuous westward movement.

Referring now to Fig. 8, the light beam signals passed by the rotating copy aperture, activate the photoelectric cell 137 at continuously recurring intervals. Consequently, the amplifier 143 produces a continuous succession of amplified input control pulses that are transmitted through the conductor 216 to cause the control grids of all four pliotrons to swing voltage-wise toward the positive at correspondingly recurring intervals. Due to the phase relationship of the translator pliotron plate voltages with the synchronously rotating shutter head 69, however, only the plates 247, 260 and 248 of the north, west and south tubes will be positive at that particular instant and, consequently, only those particular tubes will be operative to pass current. Since the pattern edge 79, Fig. 2, requires a continued westward direction of movement, the north and south tubes 218 and 220 are operative at that instant to place substantially equal charges on the north and south condensers. With this condition existing, i. e., with the condensers 271 and 272 equally charged, there will be no signal output voltage through the conductors 282 and 283 to the reference voltage divider 284 and the armature of the north and south feed motor 53 will remain stationary.

At the same time, the west translating tube 219 will be simultaneously conductive to charge the west condenser 274. As a result, since the west condenser 274 is charged and the cooperative east condenser 273 is not charged, there will be an input voltage signal across the reference voltage divider 287 that varies in potential in direct accordance with the difference in the charges on the respective condensers. With the west condenser preponderantly charged, the lower terminal of the reference voltage divider 287 will be negative and the upper terminal thereof will be positive, indicating the polarity of the input reference voltage signal for selectively activating the gas filled tubes or thyratrons of the motor controller 145.

With this condition existing, i. e. with the lower terminal of the voltage divider 287 negative and the upper terminal positive due to the polarity of the input signal voltage, the control grid 351 of the east thyratron will be less positive, and the control grid 359 of west thyratron will be more positive relative to its cathode 324. As shown in Fig. 8, the lower terminal of the voltage divider is connected through the conductor 346, the secondary winding 347, the conductor 349, and the resistor 350 directly to the control grid 351 of the east tube 313. The upper half of the reference voltage divider 287, being connected in the grid-cathode circuit of the west thyratron 314 as hereinbefore explained, operates to make the control grid 359 of the west tube more positive. The west thyratron 314 will then be conductive since the plate 316 thereof will be positive at that instant due to the overlapping phase relationship of the thyratron plate voltages with respect to the corresponding pliotron plate voltages of the translator 144. As soon as the west thyratron 314 fires, a power circuit is established from the secondary winding 312 of the Scott connected transformers 291, through the conductors 104 and 105 leading to the armature terminals of the table feed motor 54. With the motor 54 thus energized to rotate for effecting continued feeding movement of the pattern 78, Fig. 2, along a westward path of travel, it will simultaneously be generating a back E. M. F. that is transmitted through the conductors 104 and 105, Fig. 8, to the feedback control 326. The back E. M. F. constitutes a source of direct potential across the feedback control 326 that varies in accordance with the speed of the feed motor 54 and that is of opposite polarity (conductor 105 is positive and conductor 104 is negative) to the input signal voltage across the reference voltage divider 287. Since the leftward half of the feedback control 326 and the upper half of the reference voltage divider 287 are contained in series in the grid-cathode circuit of the west thyratron 314, the relative magnitude of the feedback potential and the input signal potential determine the exact point in the cycle at which the potential of the control grid 359 will exceed the critical grid potential.

As the value of the feedback potential approaches the value of the input signal potential, the west thyratron will fire later in the cycle to limit the motor speed. With the respective control potentials in balance, the west thyratron 314 will not fire and the motor will coast momentarily. If the feedback potential exceeds the input signal potential by any appreciable amount however, the east thyratron 313 may be caused to fire for a few cycles to sharply decrease the motor speed a required amount. This is due to the fact that the rightward half of the feedback control 326 is in the grid-cathode circuit of the east thyratron 313. This condition might occur, for example, as a result of the scanning device 67, Fig. 2, anticipating a sudden directional change in the path of travel, such as the edge 80 of the pattern 78, to cause a sudden decrease in the potential of the input signal voltage across the reference voltage divider 287.

As more clearly shown in Fig. 7, it will be assumed that westward feeding movement of the pattern 78 and workpiece 81 is continued until the edge 80 of the pattern more closely approaches the axis of the scanning device 67, the pattern edge 80 denoting a directional change in the path of movement. As the pattern 78 continues to advance in a westward direction, the edge 80 of the pattern will begin to overlap the eastwardly extending notch 86 in the blanker 83. The anticipating hole 75 of the continuously rotating shutter head 69 will then sweep into overlapping relationship with both the blanker notch 86 and the pattern edge 80 to pass an anticipating signal light beam pulse for activating the photoelectric cell 137. The successive anticipating signal light beam pulses thus formed are disposed to become increasingly longer in duration as the pattern edge 80 more closely approaches the axis of the shutter head 69.

As shown in Fig. 7, the shutter head 69 is angularly oriented with respect to its axis in a manner that the anticipating hole 75 passes an anticipating signal light pulse. At this same instant, the eccentrically positioned copy aperture 74 is completely covered by the opaque pattern 78 and is in a position angularly displaced approximately 180° from the position in which it overlaps the front pattern edge 79 to pass a copy signal light pulse for westward movement, as shown in Fig. 2.

With the shutter head 69 angularly oriented, as shown in Fig. 7, any light pulse that may be formed by the anticipating hole 75 will normally activate the photoelectric cell 137 to so charge the east condenser as to diminish the signal voltage across the voltage divider 287, causing the feed motor 54 to move the pattern support 65 at a lesser feed rate in a westward direction. This is due to the timing relationship predeterminately established between the synchronously rotating shutter head 69 and the four translating pliotrons 218, 219, 220 and 221 that are spaced in corresponding electrical quadrature.

In operation, the east condenser charge resulting from an anticipating signal light pulse produces a voltage which is subtractive from the voltage resulting from the west condenser charge produced by the copy signal light pulse during the same cycle, to produce a gradual deceleration in feeding movement for preventing overtravel as the pattern 78 and workpiece 81 are suddenly caused to move along a directionally changed path of travel. As shown in Fig. 7, the orbitally moving anticipating hole 75 overlaps the blanker notch 86 and the westwardly moving pattern edge 80 to pass a continuous succession of anticipating signal light pulses of gradually increasing duration. The anticipating signal light pulses thus formed, are spaced in time relative to a continuous succession of westward copy signal pulses that are passed as the eccentrically formed copy aperture 74 overlaps the front pattern edge 79 during the corresponding cycles. The rotating shutter head 69 thus passes a westward copy signal light pulse and a relatively shorter eastward anticipating signal light pulse during each cycle. The photocell 137, in turn, is activated in response to the relatively spaced light pulses in a manner that the control grids of the translating pliotrons 218, 219, 220 and 221 swing voltage-wise toward the positive twice during each cycle. Because of the phase relationship of the pliotrons with the rotating shutter head 69, both the west pliotron 219 and the east pliotron 221 will be conductive during the same cycle to charge the west and east condensers 274 and 273, respectively. Since the duration of the anticipating signal light pulses is gradually increasing, the magnitude of the charge on the east condenser 273 will likewise be gradually increased to more closely approach the value of the charge on the west condenser 274.

With the east condenser becoming more fully charged relative to the west condenser, the potential of the signal input voltage across the reference voltage divider 287, Fig. 8, will be changed to conform to the difference in the charges therebetween. The changed potential of the input reference voltage, in turn, is effective to selectively control the firing of the east and west thyratrons 313 and 314 for producing a gradual deceleration in the speed of the table feed motor 54. The gradual reduction in motor speed operates to gradually decrease the feeding rate of the westwardly moving pattern support 65 and work table 46.

As the pattern 78 continues to be moved in a westward direction at a gradually decreasing feed rate, Figs. 2 and 7, the edge 80 thereof delineating the new path of travel will begin to intercept the orbital path of movement of the eccentrically formed copy aperture 74. At that instant, the rotating copy aperture 74 will begin to overlap the edge 80 of the pattern 78 to pass a copy signal light pulse disposed to effect southward feeding movement of the pattern support 65 and work table 46. With the saddle feed motor 53 energized to move the pattern 78 along a southward path of travel, the D. C. selsyn 91 will be energized in a manner to reorient the blanker 83 with respect to the new path of travel. The notch 86 formed in the blanker 83 will then be pointed in a north direction opposite to the direction of pattern movement to prevent the anticipating hole 75 from passing a light pulse as it overlaps the pattern edge 80 which now delineates the major path of travel.

The effect of the cooperatively operable anticipating hole 75 and blanker 83 in producing a controlled deceleration in the forward feeding movement of a pattern is more clearly shown in Figs. 20, 21 and 22. The conditions there shown are not intended to represent the exact sequence of decelerating cycles occurring before a corner is transversed, but rather, are representative in a general way of the gradually decreasing table feed rate occuring during this period. It will be apparent that, in actual operation, a much greater number of decelerating cycles would necessarily occur in the brief period existing between the instant a corner was first anticipated and the instant that corner was traversed by movement of the pattern and workpiece along the new path of travel. The period of deceleration is determined by the radial spacing between the orbital paths of movement respectively followed by the anticipating signal light beam and the copy signal light beam. This spacing is governed by the predetermined location of the copy aperture 74 and the anticipating hole 75 in the shutter head 69.

As shown in Figs. 20, 21 and 22, the pattern 78 is continuously moved in a westward direction in response to copy signal light beams passed by the copy aperture 74 as it sweeps into overlapping relationship with the pattern edge 79, the average position of overlap being indicated by the dotted areas adjacent the edge of the pattern. During corresponding cycles but approximately 180° later, the anticipating hole 75 is disposed to overlap the blanker notch 86, and the edge 80 of the pattern 78 delineating a directional change in the path of travel. With the pattern 78 moving in a westward direction, the edge 80 thereof will more closely approach the axis of the shutter head 69. Consequently, the anticipating hole 75 will pass successive anticipating signal light beams of a gradually increasing duration, as indicated by the angles I, J and K in the drawings.

As a result, as shown in Figs. 20a, 21a and 22a, the east and west pliotrons will both be conductive to charge the east and west condensers in proportion to the duration of the respective light signal pulses. The copy signal light pulse and the anticipating signal light pulse occurring during the same cycle are shown by the amplified square wave signal in relation to the overlapping sine waves representing the sequentially positive plate voltages of the translating tubes 218, 219, 220 and 221. The west pliotron will be conductive for approximately the same average period, and the east pliotron will be conductive for gradually increasing periods during corresponding successive cycles of operation. The shaded areas in Figs. 20b, 21b and 22b represent the preponderance of the charges on the west condenser which decrease during successive cycles, and, as the pattern edge 80, Fig. 22, is moved more closely to the axis of the shutter head 69 at a correspondingly decreasing rate of travel.

As the pattern 78 continues to advance at a reduced rate of travel, the copy aperture 74 will begin to overlap the edge 80 delineating the new path of movement, as shown in Fig. 23. With the pattern 78 then being urged to move in a southward direction, the blanker notch 86 will simultaneously be positioned to point northward. As shown in Fig. 23a, the south pliotron will be conductive within the duration of the south copy signal light pulse and as represented by the shaded area in Fig. 23b to effect continued southward feeding movement during repetitive cycles of operation.

During the decelerating period of operation, the rate of the pattern and workpiece movement is determined by the respective light pulses passed as the copy aperture 74 overlaps the pattern edge 79 and as the anticipating hole 75 overlaps the pattern edge 80 delineating the new path of travel, as shown in Figs. 20, 21 and 22. In other words, the sensing device or shutter head 69 is simultaneously responsive to both of the pattern edges 79 and 80 in a manner to effect a controlled feeding rate of the pattern 78 to prevent overtravel as the corner is traversed. The pattern edges 79 and 80 have been so designated to facilitate the description, and obviously these two edges form only a portion of a continuous peripheral edge of the male pattern 78 that constitutes a continuous two dimensional guiding contour for effecting a full 360° copying operation. It will also be apparent that the opaque portion of the pattern between the edges 79 and 80 forms an included angle of less than 180°, in this case, since the pattern edges are perpendicular, the angle is 90°. The edge 80 therefore represents a portion of the continuous guiding contour that delineates a directional change in the path of travel from the pattern edge 79. It is to be emphasized that the rotational axis of the shutter head 69 is continuously maintained a fixed normal distance from some point on the continuous peripheral edge of the pattern 78, in this case represented as 79 and 80 respectively, as the pattern is displaced along a path of travel corresponding to its contour.

As hereinbefore explained, the copy aperture 74 overlaps the pattern edge by such a slight amount that for all practical purposes, the pattern edge can be considered as being tangential to the orbital path of movement described by the copy aperture. Some point or edge zone along the peripheral edge of the pattern therefore, is continuously maintained a fixed normal distance from the axis of rotation. Although the exact location of this point or edge zone changes continuously as the pattern is advanced, it may be represented at any time in the course of a copying operation by the intersection of a radial line extending out from the shutter axis perpendicularly with the tangential line of trace. Since some portion of the pattern edge is always approximately tangential to the orbital path of copy aperture rotation, this relationship always exists irrespective of whether the line of trace is curved or straight or marked by abrupt angular changes in direction. Since the anticipating hole 75 sweeps through a larger orbit of movement than the copy aperture 74, it can thus overlap some portion of the pattern contour that is remote from the point or edge zone overlapped by the copy aperture 74 and which is continuously maintained a fixed distance therefrom. Even a slight directional change in the guiding contour, within the anticipating notch 86, may produce a corresponding deceleration in the feeding rate.

It is to be noted that the rotating copy aperture 74 is operative to control feeding movement of a pattern and workpiece along any required path of travel, whether it be curved or straight, and irrespective of its angular relationship to the shutter head 69. The anticipating hole 75 is likewise operative to effect a controlled deceleration in feeding movement regardless of the angular direction of travel. Assuming that a pattern, for example the pattern 385 shown in Fig. 10, is being advanced in a northwest direction of travel in response to copy signal light pulses passed as the rotating copy aperture 74 overlaps the pattern edge 386, the radially extending blanking notch 86 of the blanker 83 will be pointed in a southeast direction. As the edge 387 of the pattern 385 denoting a change in direction approaches the axis of the shutter head 69, the anticipating hole 75 will begin to overlap the blanker notch 86 as well as the pattern edge 387 to pass a corner anticipating light pulse. The maximum duration of the light pulse passed by the anticipating hole 74 is represented by the angle M, and is limited by the width of the radially extending notch 86 in the blanker 83. As shown in Fig. 10, the maximum duration of a corner anticipating light signal, represented by the angle M, is less than the average copy signal light pulse, represented by the angle L, that is passed during the same cycle.

The combined effect of the copy signal light pulse and the corner anticipating signal light pulse in producing a controlled deceleration in feeding movement are best illustrated in Fig. 11 in which the overlapping half waves represent the positive plate voltages of the sequentially operative tubes of the translator 144. Within the duration of the copy signal light pulse, there shown, the plates of the north and west tubes are positive so that current flows to charge the north and west condensers, respectively. The small sections of the sine waves shown as shaded areas, in Fig. 12, represent the average charge on the north and west condensers respectively, and are proportional to the average velocity or feeding movement of the pattern for a continuous succession of northwest copy signals. These velocities are drawn vectorially and the resultant velocity and direction shown in Fig. 13.

Within the duration of the corner anticipating light pulse passed during the same cycle, as shown in Fig. 11, the plates of the south and east tubes are positive so that current will flow to charge the south and east condensers, respectively. The small sections of the sine waves, shown as shaded areas in Fig. 14, represent the average maximum charge supplied the south and east condensers respectively, and are indicative of the diminution in the velocity or feeding movement that is subtractive from the north and west velocities shown in Fig. 13, and as represented by the condenser charges shown in Fig. 12. The difference between the respective average charges on the north and south condensers, as well as the difference between the respective charges on the west and east condensers, are illustrated by the shaded areas in Fig. 15. The shaded areas there shown represent the preponderance of the charges on the north and west condensers respectively, and are proportionate to the reduced velocity or feeding movement of the pattern. These velocities are drawn vectorially and the resultant velocity and direction shown in Fig. 16, the resultant velocity being proportionate to the decreased difference in condenser charges, as shown by the shaded areas in Fig. 15.

In the event it is necessary to generate a female contour that is slightly larger in size than the male pattern 78 shown in Fig. 2, a cutter may be used that is oversize with respect to the diameter of the cutter normally employed to generate a female contour of identical size. In like manner, an undersize cutter may be used to generate a female contour that is smaller than the male pattern by a required amount. In generating either an oversize or an undersize female contour with different sizes of cutters in this manner, the workpiece will be advanced along a path of travel determined by the distance the edge of the pattern 78 is spaced inwardly from the axis of the shutter head 69. This distance is uniformly maintained by the copy aperture 74, as the pattern 78 and workpiece 81 are moved along their respective paths of travel, the copy aperture 74 being approximately equal in diameter to a cutter disposed to generate a female contour identical in size to the male pattern 78.

In some instances, however, it may be advantageous to use different sizes of cutters for generating a female contour that exactly equals the size of the male pattern employed to guide the path of feeding movement. For effecting this result, it is necessary that the size of the copy aperture be changed to conform to the cutter diameter. As the size of the copy aperture is varied, it may likewise be necessary to vary the radial distance of the anticipating hole from the axis of the shutter head 69.

Figure 5:
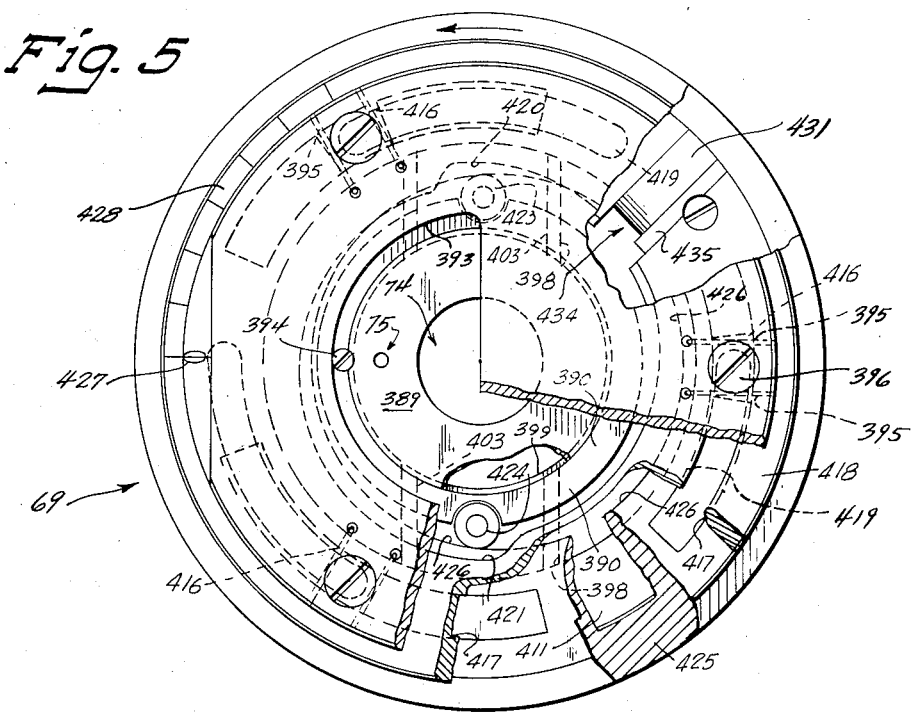
Fig. 5 is an enlarged plan view of the shutter head.
Figure 6:
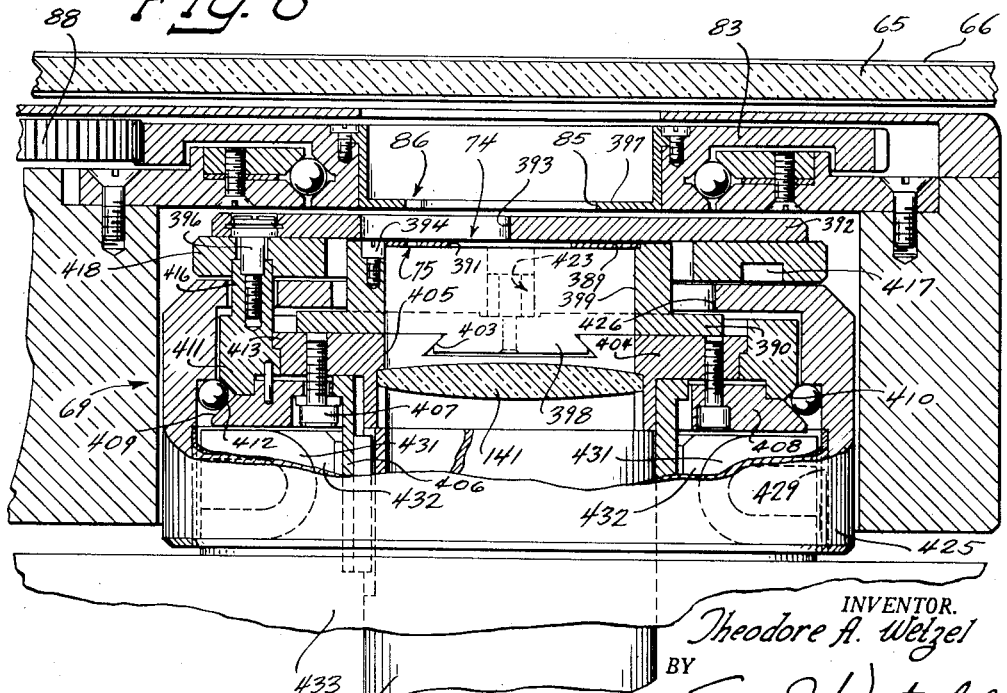
Fig. 6 is an enlarged view in vertical section of the shutter head.

To this end, as shown in Figs. 5 and 6, the shutter head 69 is provided with a removable circular shutter 389 that is carried within a flanged circular recess formed toward the upper end of an adjustably positionable cross slide 390. The shutter 389 is provided with a circular hole 391 that is partially masked by a cover plate or shield 392 to form the D-shaped copy aperture 74. The cover plate 392 is provided with a semi-circular opening 393 corresponding in shape to the copy aperture 74 and large enough to permit light to pass through the anticipating hole 75 contained in the shutter 389 in radially spaced relationship to the copy aperture. As shown in Fig. 5, the anticipating hole 75 is positioned radially outward from the circular portion of the copy aperture 74 and approximately perpendicular to the straight or leading edge thereof. To maintain the proper timing relationship, a peripheral notch in the shutter 389 is engaged by a cap screw 394 threaded in the cylindrical wall of the cross slide 390. The cover plate 392 is likewise carried in spaced relationship to the shutter 389 by means of spring clips 395 disposed to engage annular grooves formed on a plurality of clamping screws 396.

If the shutter 389 is replaced with a shutter having a different size circular opening 391, as well as a differently spaced anticipating hole 75, it is necessary to provide a blanker 83 that is suitably apertured to conform to the new shutter. The circular opening 85 of the blanker 83 must be larger than the orbital path of movement described by the outermost end of the copy aperture 74 and smaller than that followed by the anticipating hole 75. The blanking gear 83 therefore is provided with an enlarged bore disposed to removably receive a cup shaped mask 397 in coaxial relationship with the shutter head 69, the mask 397 being provided with the circular opening 85 and the radially extending anticipating notch 86.

To position the copy aperture 74 of the shutter 389 eccentrically with respect to the axis of the shutter head 69, the cross slide 390 is provided on its underside with a pair of dovetailed way surfaces 398 spaced on either side of a circular opening 399 extending therethrough. The way surfaces 398 of the cross slide 390 are slidably carried within a pair of complementary guideways 403 formed in the upper face of a carrier 404 and spaced on the opposite sides of a concentric circular opening 405 extending therethrough. The carrier 404 is fixedly secured to a shaft extension 406 by means of cap screws 407, the shaft extension 406 being keyed directly to the upper end of the hollow motor shaft 72. The cap screws 407 are disposed to engage a flanged shoulder of the shaft extension 406, as well as a circular clamp member 408. The circular clamp member 408 is provided with a beveled peripheral edge 409 that cooperates with a complementary beveled edge 410 formed toward the lower outer periphery of a cylindrical support member 411 in a manner to provide an annular raceway for receiving a plurality of balls 412 and thus constitute a ball bearing groove. A flanged rim 413 formed on the carrier 404 is disposed to engage a complementary shoulder of the support member 411 for the purpose of securing it to the clamp member 408 and shaft extension 406.

Extending upwardly from the cylindrical support member 411 in circumferentially spaced relationship are a plurality of arcuately formed lugs 416 constituting a circular guideway disposed to engage a circular groove 417 formed on the underside of a rotatable adjusting ring 418. The adjusting ring 418 is clamped to the cylindrical support member 411 in a predetermined position of rotatable adjustment by means of the clamp screws 396 which extend through arcuately formed slotted openings 419 in the ring to threadedly engage the upwardly extending lugs 416 of the support member 411. A pair of laterally offset cam surfaces 420 and 421 formed on the inner circumference of the adjusting ring 418 are operative to limit the lateral movement of the shutter carrying cross slide 390. To this end, the cam surfaces 420 and 421 of the adjusting ring 418 cooperate with a pair of rollers 423 and 424 vertically journalled toward the opposite sides of the cross slide 390. Lateral movement of the cross slide 390 in either direction is thereby limited by one or the other of the rollers 423 or 424 being moved into abutting engagement with a respective one of the cam surfaces 420 or 421 of the adjusting ring 418.

To effect lateral movement of the cross slide 390 within its predetermined limit of adjustment, there is provided a hollow adjusting cup 425 that is rotatably carried by the ball bearings 412. In the upper face of the adjusting cup 425 there is formed an eccentric internal cam 426 that continuously engages both of the rollers 423 and 424 journalled on the cross slide 390. By means of this arrangement, the copy aperture 74 in the shutter 389 may be positioned eccentrically in either direction from the shutter head axis, depending on the direction in which the motor shaft 72 is rotating. To predeterminately position the relatively rotatable adjusting ring 418 for limiting the lateral movement of the cross slide 390, a zero mark 427 on the light shield 392 is arranged to be read against calibrations on the ring 418. This adjustment determines the eccentricity of the copy aperture 74 and is varied in accordance with the diameter of the copy aperture. The preferred range of copy aperture eccentricity varies between approximately fifteen and sixty thousandths of an inch, although the range is not to be considered as being limited.

With the motor shaft 72 rotating in a counterclockwise direction, it is essential that the independently rotatable cup 425 lag the shaft 72 immediately in a manner to urge the cross slide 390 downwardly from its central position shown in Fig. 5. To retain the adjusting cup 425 in lagging relationship to the rotating motor shaft 72, for maintaining the copy aperture 74 in its required position of eccentricity relative to the axis of the shutter head 69, there are provided a plurality of permanent magnets 431 that are fixedly positioned with respect to the rotating cup. Lateral movement of the cross slide 390 is limited by the roller 424 moving into abutting engagement with the cam surface 421 of the adjusting ring 418 which is clamped in predetermined position to the cylindrical support member 411. With the cross slide 390 moved to its lowermost position, the copy aperture 74 will be eccentrically positioned in the proper direction for counterclockwise rotation of the shutter head to correctly perform a normal copying operation, this rotation being such that the straight or leading edge of the copy aperture 74 initiates the formation of a copy signal light pulse.

If the direction of motor shaft rotation is suddenly reversed, as may be necessary in retraversing a particular portion of the guiding contour, the eccentricity of the copy aperture 74 is likewise reversed. With the motor shaft 72 rotating in a clockwise direction, for example, the adjusting cup 425 would lag the shaft 72 to urge the cross slide 390 upwardly from its central position shown in Fig. 5 until the upper roller 423 is moved into abutting engagement with the cam surface 420 of the adjusting ring 418. With this condition existing, the opposite end of the straight edge of the copy aperture 74 would overlap the line of trace first to initiate the formation of a copy signal light pulse.

As shown in Figs. 5 and 6, the magnets 431 are fixedly mounted in circumferentially spaced relationship within an upwardly extending cylindrical member 432 secured to the upper face of a mounting support member 433 to which the shutter motor 73 is secured. As shown in Fig. 6, the stationary cylindrical support member 432 extends upwardly within the lower portion of the hollow adjusting cup 425. The support member 432 is provided with a plurality of radially extending slots 434 disposed to receive the magnets 431 which are secured therein by wedges 435 and cap screws. Whenever the motor shaft 72 is rotating in either a clockwise or a counter clockwise direction, the magnets 431 are disposed to cooperate with an eddy current copper ring 429 within the rotating cup 425 to exert a braking or dragging effect and thus continuously maintain the shutter copy aperture 74 in its required position of eccentricity. In addition, the magnets 431 exert a braking action on the rotating cup 425 at the instant the rotational direction of the motor shaft 72 is reversed for the purpose of insuring immediate movement of the copy aperture 74 to its opposite position of eccentricity.

To retraverse a guiding contour, it is necessary not only to reverse the rotation of the synchronous shutter motor 73 and the eccentricity of the copy aperture 74, but also to reverse the angle of skew of the copy aperture 74, as well as the current to one of the table feed motors. To this end, as shown in Figs. 3 and 4, the shutter motor 73 is movably supported for bodily rotatable movement under the control of a reverse lever 439. The shutter motor 73 is secured to the underside of the mounting support member 433 which is provided with a downwardly extending cylindrical journal 440, in a manner to be rotatably received within a circular opening formed in the upper face of the housing 71. A circular bearing ring 441 is secured to the underside of the mounting support member 433 by means of cap screws 442. To limit the bodily rotatable movement of the motor 73, a pair of predeterminately adjustable positive stops 443 and 444 secured to an inner wall of the housing 71 are disposed to coact with a radially extending stop lug 445 secured to the bearing ring 441, as shown in Fig. 3

To effect a normal direction of copying movement, the synchronous shutter motor 73 is angularly positioned, as shown in Figs. 3 and 4 with the stop lug 445 engaging the positive stop 443 in a manner that a forward control switch 448 is actuated to effect counterclockwise rotation of the shutter motor. Movement of the reverse lever 439 to its dotted line position shown in Fig. 3 operates to bodily rotate the motor 73 until the stop lug, shown in dotted line position, is moved into abutting engagement with the positive stop 444. With the motor 73 in this angular position, a reverse switch 449 is actuated, the switch 449 being operative to effect clockwise or reverse rotation of the shutter motor and concomitantly therewith to reverse the flow of current to the field 172 of the table feed motor 54. The switches 448 and 449 are operatively connected in well known manner to activate a control circuit (not shown) for selectively controlling the energization of the feed motor field 172 as well as the direction of rotation of the shutter head motor 73.

The switches 448 and 449 are secured to the underside of the bearing ring 441 in spaced relationship by means of brackets 450 and in a manner that the respective actuating plungers 451 and 452 thereof extend vertically upward through spaced holes in the ring. As shown in Fig. 4, a resiliently urged actuating ball 453 carried within a vertically bored hole formed in the upper wall of the housing 71 is disposed to actuate one or another of the switches 448 and 449, depending on the angularly adjusted position of the motor 73.

With the reverse control lever 439 in its solid line position, Fig. 3, to effect normal counterclockwise rotation of the synchronous motor 73, the leading edge of the copy aperture 74 will be skewed ahead of the normal line axis 370 by an angle P (at the instant of peak plate voltage on the east translator tube). The copy aperture 74 is shown overlapping the pattern edge 130 in its median position for passing a copy signal light pulse to effect eastward feeding movement of the pattern 78. As hereinbefore explained, the skew represented by the angle P between the normal line axis 370, which is a radial line perpendicular to the line of trace, and the leading edge of the copy aperture 74, determines the exact timing relationship predeterminately established between the synchronously rotating shutter head 69 and the sequentially operative pliotrons of the translator 144. Whenever the direction of rotation of the feed motor 73 is reversed to retraverse a guiding contour, such as the pattern edge 130, the angle of skew must likewise be reversed.

As shown in Figs. 3 and 3a, movement of the reverse lever 439 to its dotted line position effects a change in the timing relationship between the continuously rotating copy aperture 74 and the translator. With the lever 439 positioned, as indicated by the dotted lines, to effect clockwise rotation of the copy aperture 74, the straight or leading edge thereof will be skewed ahead of the feed axis 370 by an angle Q, Fig. 3a. Movement of the reverse lever 439 to its dotted line position simultaneously effects a reversal in the eccentricity of the copy aperture 74, as well as a 180° change in the synchronous lock-in position of the rotor of the motor 73 relative to the stator thereof. With the copy aperture 74 rotating in a clockwise direction, as indicated in Fig. 3a, the direction of pattern movement is westward due to the reversal in the current to the field of the table feed motor 54 which is also accomplished by the movement of the reverse lever 439 to its dotted line position by means of an electrical circuit (not shown). Reversal of current to the field of the table feed motor 54 effects a change in the sequence of table feed movements relative to the shutter head 69 as the machine is operated to accomplish a full 360° copying operation. The table 46 is then moved in a north, east, south and west direction respectively, instead of a north, west, south and east direction, which is the order of table feed movements whenever the shutter head 69 is rotated in a counterclockwise direction.

In a modified form of the invention, as shown in Figs. 24 and 25, there is provided a blanker 456 of simplified form that is disposed to cooperate with the continuously rotating shutter head 69 in a manner to anticipate directional changes in a path of travel, and thereby prevent overtravel as the path of workpiece movement is suddenly changed in accordance with the directional change dictated by the guiding contour. The blanker 456 is carried at the upper end of a pivot pin 457, that is removably journalled in a bushing 458 mounted at the upper end of a stationary vertical stud 460. At its lower end, the pivot pin 457 is seated in a bearing carried by a vertically movable plunger 459 that is slidably carried within a vertically bored hole formed in the stud. The stationary stud 460 is secured to a transparent disc 461 carried at the upper end of a thin walled tube 462 extending upwardly through the hollow motor shaft 72. A spring 463 within the stud 460 is disposed in the plunger 459 and the pivot pin 457 with the blanker 456 upwardly in a manner that a friction button 464 on the blanker is moved into frictional engagement with the underside of the transparent pattern support 65. At its extreme lower end, the tube 462 is secured to a bracket 465 affixed to the underside of the shutter motor 73, and at its upper end the tube is restrained against lateral movement by means of a bearing ring 468 secured to the rotatable shaft extension 406. By means of this arrangement, the vertical stud 460 is disposed to support the blanker 456 for coaxial pivotal movement relative to the continuously rotating shutter head 69. The focusing lens 141 is carried within the upper end of the tube 462 for directing the light beam signals passed by the shutter head 69 downwardly through the tube toward the light sensitive cathode 140 of the photoelectric cell 137.

As schematically shown in Fig. 25, the blanker 456 is provided with a pair of conjoined arcuately shaped openings 469 and 470 having a radius larger than that of the copy aperture 74, and smaller than the radial spacing of the anticipating hole 75 measured from the axis of the shutter 389. A radial slot or notch 471 is so formed in the blanker 456 as to extend outwardly from the merged arcuately shaped openings 469 and 470 to intercept the orbital path of movement followed by the anticipating hole 75. To retain the blanker 456 properly oriented with respect to a line of trace, for example, the pattern edge 130 of the pattern 78, the friction button 464 is continuously maintained in frictional engagement with the underside of the transparent pattern support 65 by means of the spring 463. With the pattern support 65 being moved in an eastward direction as shown in Fig. 25, the radial slot 470 will be pointed westwardly or opposite to the direction of pattern movement. As the pattern edge 131 delineating a change in direction approaches the axis of the shutter head 69, therefore, the anticipating hole 75 will simultaneously overlap the blanker notch 470 and the edge 131 for effecting a controlled deceleration in the forward feeding movement of the pattern 78 to prevent overtravel as the corner is traversed.

In a modified form of a sensing device 472 adapted to scan a line of trace having a differential effect on light, as schematically shown in Fig. 26, the rotating shutter 389 is removably carried at the lower end of a hollow motor shaft 473 rotatably supported above the relatively movable transparent pattern support 65. The motor shaft 473 and the shutter 389 are driven at synchronous speed by a motor 474 that is fixedly mounted above the pattern support 65. A source of radiant energy 475 at the upper end of the motor shaft is disposed to project light downwardly therethrough through the condensing lens 123 within the hollow shaft and toward the shutter 389. Light from the source of radiant energy passes through the copy aperture 74 and the anticipating hole 75 of the continuously rotating shutter 389 to form two downwardly projecting, axially parallel beams of light. The two light beams respectively passed by the shutter 389 are continuously moved along paths of orbital movement due to the continuous rotation of the synchronously driven motor shaft 473. To effect continuous feeding movement of a pattern such as the pattern 78 along the major westward direction of trace, the D-shaped light beam passed by the copy aperture 74 is disposed to overlap the pattern edge 79 at recurring intervals to pass a continuous succession of copy light pulses. Since the light beam passed by the anticipating hole 75 will simultaneously overlap the edge 79 of the pattern delineating the major line of trace, the coaxially rotatable blanker 83 is placed below the pattern support to prevent passage of an anticipating signal light pulse during this portion of the cycle. In order to provide an anticipating light pulse therefore, the anticipating light beam must overlap the edge 80 of the pattern 78 forming an abrupt angular change in the direction of trace, and simultaneously, the notched-out opening 86 in the blanker 83. Thus, the rotating shutter 389 is utilized to provide continuously movable light beams that are respectively disposed to be selectively intercepted by the opaque portion of the pattern to provide exact directional control of a workpiece. Although a rotating shutter is represented as the means for providing the continuously moving light beams, other suitable means may be utilized with equally good results.

An inspection of Fig. 26 and Fig. 7 shows by comparison that the principal difference therebetween resides in the order of arrangement for the light beam forming or modifying elements. In Fig. 26, for example, progressing from light source to photocell we observe these elements in order; the synchronously driven shutter 389 with copy signal aperture and anticipator hole, the supported pattern 78, and the anticipator blanking aperture 86 of the blanker 83. Contrasting thereto we observe in Fig. 7 the elements in order; the supported pattern 78, the anticipator blanking aperture 86, and the synchronously driven shutter 69 with copy signal aperture and anticipator hole. It is understood that the light condensing lens 123 will be considered an integral part of the light source and that the light collecting lens 141 will be considered as part of the photocell unit.

Fig. 26 and Fig. 7 illustrate the fact that the order of arrangement of the light beam forming or modifying elements is irrelevant, since any arrangement between the light source and photocell will serve to provide the required signal. A noteworthy observation, then, is that structurally the physical locations of the light source and the photocell may be interchanged in either Fig. 26 or Fig. 7 without functional impairment.

In a further modified form of the invention, there is provided a line tracker control system that is adapted to follow a contour of irregular configuration as well as to anticipate directional changes in the path of travel without the cooperation of the electrically oriented mechanical blanking device 82 hereinbefore described. This is accomplished by inverting the function of the photocell 137 in the amplifier 143, Fig. 8, in such a manner that the respective control grids of the translator tubes 218, 219, 220 and 221 swing toward the positive only during that instant in which the photocell is not being energized by a light beam signal from the shutter head 69. Conversely, the control grids of the translator tubes will be less positive whenever the photocell 137 is energized, thereby preventing conduction during the instant the shutter head 69 is passing light. With this arrangement, therefore, the function of the shutter head 69 in producing directionally controlled movement of the work table 46 and pattern support 65, Fig. 2, is likewise inverted in a manner that the copy signal for movement occurs during the no-light portion of each revolution.

To achieve this result, as shown in Fig. 29, the shutter head 69 is provided with a shutter 480 having an enlarged copy aperture 481 of a generally spiral form that is eccentrically positioned with respect to the rotational axis thereof. The copy aperture 481 is provided with a circular or leading edge 482 and a radially extending trailing edge 483, the outer extremity of which is spaced farther from the axis of the shutter head 69 than the circular leading edge. With the shutter head 69 continuously rotating in a counterclockwise direction, a no-light signal for effecting westward movement of the pattern 78 is initiated at the instant the leading or circular edge 482 of the copy aperture, shown in solid line position, crosses the edge 79 of the pattern 78 into the opaque zone therebelow. The no-light copy signal is terminated at the instant the trailing edge 483 of the copy aperture 481 again crosses the pattern edge 79, as indicated by the dotted line position. The duration of the no-light copy signal is approximately 90° during each revolution or cycle of operation, as shown by the angle W and the shaded portion 484 of the concentrically formed circular graph. Because of the inverted function of the photoelectric cell 137, the no-light copy signal is operative to selectively activate the translator 144 for effecting the required westward feeding movement of the pattern 78. As the shutter head 69 is rotated through the remainder of one revolution in a counterclockwise direction, the copy aperture 481 will be moved from its dotted line position into overlapping relationship with the pattern edge 79 in a manner to pass light to the inverted photoelectric cell. The spiral shaped copy aperture 481 will continue to pass light as it sweeps through an angle of approximately 270°, as indicated by the dotted portion 485 of the circular graph, until it again crosses the pattern edge 79 to its solid line position, which delineates the initiation of another no-light copy signal.

To anticipate directional changes in the path of travel, the shutter 480 is provided with an anticipating hole 486 spaced radially outward from the spiral copy aperture 481. As shown in Fig. 29, the anticipating hole 486 is shown in two positions, indicated by the solid and dotted lines respectively, and which correspond to the respective positions of the copy aperture 480 for initiating and terminating a no-light copy signal. These two positions of the anticipating hole 486 are used as a reference for the angle W which indicates the approximate arc of movement through which the shutter 480 rotates as a no-light copy signal for west movement is formed due to the copy aperture 481 being moved under the opaque portion of the pattern 78. At the same time, the anticipating hole 486 itself is beneath the opaque portion of the pattern 79 throughout the full extent of the angle W during a straight line copying operation, as shown in Fig. 29. As the pattern 79 is advanced in a westward direction under the directional control of a continuous succession of recurring no-light copy signals, however, the pattern edge 80 delineating a directional change in the path of travel will more closely approach the axis of the shutter head 69.

At some point in the westward path of pattern movement, the orbitally moving anticipating hole 486 will being to overlap the pattern edge 80 to pass light. The passage of light through the anticipating hole 486 as it sweeps through a portion of the arc of movement represented by the angle W, operates to diminish the normal duration of a no-light copy signal for westward movement. Any diminution in the normal duration of the no-light copy signal will effect a deceleration in the westward feeding movement of the pattern 79 to prevent overtravel as a corner is traversed. By means of this arrangement, therefore, the anticipating hole 486 functions to anticipate directional changes in the path of travel by selectively passing a light beam that modifies the duration of the no-light copy signal to provide the necessary correction in the rate of westward feeding movement. As indicated in Fig. 29, the shutter 480 is also rotatable in a clockwise direction to control and likewise anticipate changes in the direction of movement. In such a case, however, it will be apparent that the sequence of operation changes slightly and the edge 483 of the shutter aperture crosses the pattern edge to initiate a no-light signal. The no-light signal for effecting westward movement is then terminated the instant the circular edge 482 of the shutter aperture again crosses the pattern edge to pass light. This changed sequence in the formation of a no-light signal for effecting westward movement modifies the electrical phenomena in the associated photoelectronic control circuit. It is to be noted, therefore, that the shutter 480 is rotatable in either a clockwise or a counterclockwise direction of rotation to provide a direction anticipating, no-light copy signal for effecting movement, which for illustrative purposes, is shown in Fig. 29 as being in a westward direction.

As shown in Fig. 30, there is provided another modified form of shutter 488 having a single anticipating copy aperture 489 that is operative to provide a no-light copy signal as well as an anticipating light beam signal disposed to diminish the normal copy signal depending on the proximity of the shutter head to any directional change in the path of travel. The single anticipating copy aperture 489 shown in Fig. 30 is so configured as to duplicate the individual functions respectively performed by the separate copy aperture 481 and anticipating hole 486, shown in Fig. 29, and operates in a substantially similar manner to provide a continuous succession of no-light copy signals of selectively controlled duration. The single aperture 489 shown in Fig. 30 is provided with a semi-circular leading edge 490 adapted to initiate a no-light copy signal at the instant it crosses the pattern edge 79, and a trailing edge 491 that is disposed to terminate the signal at the instant it crosses the pattern edge 79 to pass light. To anticipate directional changes in the path of travel, the aperture 489 is further provided with a radially extending anticipating notch 492, having one edge extending radially outward from the axis, and the other edge tangential to the larger circular portion of the generally spiral shaped aperture. The aperture 489 is shown in two positions indicated by the solid lines and the dotted lines respectively, illustrating the approximate positions for initiating and terminating a no-light copy signal for effecting directionally controlled westward movement of the pattern 79. The normal duration of a no-light copy signal is indicated by the angle W and the shaped portion 493, of the circular graph, the dotted portion 494 of which indicates that portion of each revolution during which the aperture overlaps the pattern edge 79 to pass light.

The effective utilization of the inverted type, no-light copy signals provided by one or the other of the shutters 480 or 488 shown in Figs. 29 and 30, is directly dependent upon an inverted form of photocell amplifier 497 shown in Fig. 28 and which is adapted to be substituted for the amplifier 143 in the complete control circuit shown in Fig. 7. One or the other of the shutters 480 or 488 is removably carried by the rotatable shutter head 69, as hereinbefore explained, and as shown in Fig. 28. A shield 498 secured to the shutter head 69 is provided with an enlarged circular opening 499 to permit unobstructed passage of light to the shutter 488. A zero mark 501 scribed on the peripheral edge of the shield 498 is arranged to be read against calibrations 423 on the adjusting ring 418 of the shutter head to predeterminately adjust the degree of shutter eccentricity. The shutter head 69 is positioned immediately below the transparent pattern support 65 to receive light projected downwardly therethrough from the inner end of the hollow arm member 68. The shutter head 69 is carried at the upper end of the hollow motor shaft 72 that is normally driven in a counterclockwise direction of rotation by the synchronous motor 73. Beneath the lower end of the hollow motor shaft 72, the photoelectric cell 137 is fixedly mounted in a position to be selectively activated by the regularly recurring light beam signals passed by the continuously rotating shutter head 69.

The photoelectric cell 137 is so interconnected in the inverted form of amplifier circuit 497 shown in Fig. 28, that the vacuum tube 183 is normally conductive while the vacuum tube 184 is normally non-conductive, when the photocell is not being energized by a light beam signal. As shown in Fig. 28, the cathode of the photoelectric cell 137 is connected directly to the common conductor or ground 170, and the anode thereof is connected through a conductor 502 and a resistor 503 to the control grid 210 of the tube 183, thus providing the signal voltage control for the first stage of the amplifier 497. The control grid 210 is likewise connected through the resistor 503 and a resistor 504 to a conductor 505 connecting to an adjustable point of the potentiometer 189. By means of this inverted arrangement, the control grid 210 is normally maintained more positive so that the tube 183 is conductive whenever the photoelectric cell is not being energized by the passage of light through the rotating shutter head 69. At the same time, the control grid 214 of the second tube 184 will be less positive, since it is normally maintained at approximately the voltage level of the cathode 292 of the tube 183. As a result, the second tube 184 is normally non-conductive when the photoelectric cell 137 is not being energized and, consequently, the signal output conductor 216 will be maintained at approximately the voltage level of the common conductor 171. With this condition existing, the control grids of the four translating pliotrons 218, 219, 220 and 221, Fig. 8, will be more positive, and all of the pliotrons will be ready to pass current.

Whenever the photoelectric cell 137 is energized by light passing through the rotating shutter head 69, the control grid 210 of the tube 183 will be lowered toward the voltage level of the common conductor or ground 170 in such a manner that the first amplifier tube 183 will be non-conductive and the second amplifier tube 184 will be conductive. With this condition existing, the signal output conductor 216 will be lowered to approximately the level of the cathode 196 to render the control grids of the translating tubes 218, 219, 220 and 221 less positive. As a result, the translator tubes will not be conductive during that interval of the cycle during which the shutter 488 contained in the rotating shutter head 69 is passing light.

Inasmuch as both of the shutters 480 and 488 shown in Figs. 29 and 30 are disposed to operate in a substantially similar manner, only the shutter 488 having the single anticipating copy aperture 489 will be described in detail. In order that the aperture 489 will provide the necessary directional control of the pattern support 65 and work table 46, the modified form of shutter 488 is rotated in exact synchronism with the electrical commutating timing circuit of the translator 144. In addition, since the directional movement effected by the translator 144 depends on the angular orientation of the single aperture 489 at the instant a no-light copy signal is formed, a precisely adjusted timing relationship is predeterminately established between the synchronously rotating shutter 488 and the sequentially positive translating pliotrons 218, 219, 220 and 221.

As shown in Figs. 31 and 32, the aperture 489 of the shutter 488 is represented in four different positions that respectively coincide with the exact instant the plate voltages of the individual pliotrons are at their maximum positive potential. The pliotrons 218, 219, 220 and 221 of the translator are spaced in electrical quadrature in a manner that the respective plates thereof become sequentially positive in overlapping relationship as hereinbefore explained. In Fig. 31, the aperture 489 is represented by the solid lines in a position coinciding with the instant the plate of the north translating pliotron 218 is at its maximum positive potential, the 180° electrical duration of positive plate potential being indicated by the 180° angle N. In like manner, the aperture 489 is shown in a dotted line position coinciding with the instant the south pliotron 220 reaches its maximum positive potential. In Fig. 32, the aperture 489 likewise is shown in two positions spaced 180° apart and respectively coinciding with the instant in which the plates of the west and east pliotrons 219 and 221 are at their maximum positive potential. The aperture 489 is normally rotated in a counterclockwise direction of rotation as the respective plates of the north, west, south and east pliotrons become sequentially positive in the order designated.

The sequence of events occurring during one revolution of the shutter in producing a no-light copy signal is illustrated in Figs. 33, 34, 35 and 36 in which the pattern 78 is again represented as being positioned for westward movement with the forward edge 79 delineating the path of travel. In Fig. 33, the circular edge 490 of the aperture has just crossed the pattern edge 79 to initiate a no-light copy signal for westward movement. The no-light copy signal continues as the aperture sweeps through its median position for westward movement, as shown by the dotted lines in Fig. 34, and is terminated the instant the leading edge 491 of the aperture again begins to cross the pattern edge 79. The duration of the no-light copy signal is approximately 90°, as graphically indicated by the shaded arcuate segment 493 in Fig. 34, during which period the north, west and south translator tubes will be conductive due to the time overlapping of the positive plate voltages thereof and which are represented by the overlapping half-waves in Fig. 34a.

Within the duration of the no-light copy signal, Fig. 34a, the north and south condensers therefore will be charged equally, as shown by the shaded areas in Fig. 34b. With the north and south condensers charged equally, there will be no lateral corrective movement with respect to the westward path of travel. Westward movement of the pattern 78 will be effected by the west condenser voltage produced by the charge on the west condenser, as indicated by the shaded area in Fig. 34c. Each successive no-light copy signal is terminated as soon as the aperture 489 overlaps the pattern edge to pass light. As shown in Figs. 35 and 36, some portion of the aperture 489 will overlap the pattern edge 79 to pass light as the shutter 489 is rotated through positions 180° and 270° beyond the starting point for a single revolution. The aperture 489 will continue to pass light as it is rotated from its position shown in Fig. 36, through the remainder of a single revolution to a position corresponding to that shown in Fig. 33 for the initiation of another no-light copy signal.

Although the various conditions shown in Figs. 33, 34, 35 and 36 are intended to be illustrative of the general operation of the modified form of invention, it will be apparent that a single revolution of the shutter 488 will not produce any perceptible movement of the pattern support 65 and work table 46, except in the feeding or travel direction. It is to be noted that the shutter 488 is continuously rotated at synchronous speed, preferably 3600 R. P. M., and the individual cycles or revolutions thereof are continuously repeated with such rapidity as to provide a continuous succession of no-light copy signals that blend together to provide a substantially uniform rate of advancement of the pattern support and work table. Although the no-light copy signal is represented as having a duration of approximately 90°, the invention is not to be considered as being restricted only to a signal of this duration.

Referring now to Figs. 37, 38 and 39, the pattern 78 is represented as being moved in a westward direction relative to the anticipating copy aperture 489 of the continuously rotating shutter 488. To effect lateral correction of the guiding edge 79 of the westwardly moving pattern 78 relative to the axis of the shutter head 69, the duration and angular orientation of a no-light copy signal provided by the rotating aperture 489 is disposed to vary in accordance with the distance of the pattern edge 79 from the shutter head 69 as well as its angular orientation relative thereto. No-light copy signals varying slightly in duration activate the translator 144, Fig. 8, to effect the necessary lateral correction with respect to the line of trace, as indicated by the sine waves representing the overlapping pliotron plate voltages of the translator and shown in Figs. 37a, 38a and 39a. To more clearly illustrate the lateral correcting effect of the rotating aperture 489, the pattern 78 is represented in Figs. 37 and 39 as being bodily displaced an unduly large amount from the westward path of travel it would normally follow, Fig. 38. The relative activation of the translator pliotrons, Figs. 37a, 38a and 39a are correspondingly exaggerated to emphasize the lateral corrective movement of the pattern 78 with respect to the normal path of westward travel. In operating the machine to traverse a straight line of trace, however, exaggerated conditions such as these would not usually occur.

Referring to Fig. 38, the westwardly moving pattern 78 is so located with respect to the rotating shutter head 69, that the anticipating copy aperture 489 will sweep through an arc of approximately 90° represented by the angle W, as is passes under the opaque portion of the pattern 78 to provide a no-light copy signal. As hereinbefore explained, this is the normal duration of the copy signal whenever a straight line of trace is being traversed.

The no-light copy signal provided as the aperture 489 sweeps through the angle W, will activate the north, south and west pliotrons of the translator, as shown in Fig. 38a. It will be apparent that the leading edge 509 of the signal, Fig. 38a, will coincide in time with the initiation of the no-light signal as the aperture 489 sweeps through its solid line position, shown in Fig. 38, under the opaque portion of the pattern 78. The rearward edge 510 of the signal coincides in time with the termination of the no-light signal as the aperture 489 sweeps through the dotted line position to begin to pass light. Within the duration of the no-light copy signal, the small sections of the sine waves represent the period during which the north and south translating pliotrons are conductive to place equal charges on the north and south condensers, as indicated by the shaded areas in Fig. 38b. The north and south condensers being charged equally, there will be no lateral corrective control voltage to call for north or south movement with respect to the major westward path of travel, since no lateral correction is required. Within the duration of the no-light signal, Fig. 38a, the west translating tube is simultaneously conductive to charge the west condenser, as indicated by the shaded area in Fig. 38c, to provide the condenser voltage for effecting continued feeding movement of the pattern 78 in a westward direction.

As shown in Fig. 37, the pattern edge 79 is represented as being too far away from the axis of the shutter head 69, and the rotating copy aperture 489 sweeps under the opaque portion of the pattern for a larger period of time to pass a no-light signal of larger duration, as shown by the angle X.

With this condition, the pattern 78 will be urged to move northward to effect the necessary lateral correction at the same time it is being displaced along the major westward path of travel. The sections of the overlapping sine waves within the duration of the no-light copy signal, Fig. 37a, represent the relative time that the north, west and south translating tubes are conductive. Due to the configuration of the aperture 489, it will be noted that the leading edge 511 of the signal is advanced a somewhat greater amount than the rearward edge 512 is extended. As indicated by the shaded areas in Fig. 37b, the north condenser will be charged to a greater extent than the south condenser and the pattern 78 will be urged to move northward, as called for by the controlling voltage difference between the two condensers, until its guiding edge 79 coincides with its normal position, indicated by the dotted lines 514 in Fig. 37, during westward movement. As shown by the shaded area, Fig. 37c, the west condenser will be simultaneously charged to effect continued westward pattern movement.

In a similar manner, if the guiding edge 79 of the pattern 78 is too close to the axis of the shutter head 69, as shown in Fig. 39, the copy aperture 489 operates to effect lateral corrective movement in a southward direction. With this condition existing, the rotating copy aperture 489 will be under the opaque portion of the pattern 78 for a shorter period of time to provide a proportionately shorter no-light copy signal as it sweeps through the angle Y. The north, west and south translating tubes will again be conductive within the duration of the no-light copy signal, Fig. 39a, to charge the respective condensers, as indicated by the shaded areas in Figs. 39b and 39c. With the south condenser charged preponderantly to provide a controlling voltage difference between the two condensers, the pattern 78 will be moved in a southward direction until the guiding edge 79 thereof coincides with its normal position indicated by the dotted line 514 in Fig. 39 during a westward path of travel. Due to the configuration of the copy aperture 489, the leading edge 515 of the signal recedes a somewhat greater amount than the rearward edge 516 is advanced. Irrespective of the angular changes in the line of trace relative to the shutter head 69, the instant at which a no-light copy signal is initiated varies a greater amount than the instant at which the signal is terminated. The leading or circular edge 490 of the copy aperture 489 is more sensitive to directional changes in the line of trace and operates to shorten or extend the duration of a particular no-light copy signal in accordance with the requirements of the guiding contour.

The effect of the anticipating notch 492 in producing a controlled deceleration to prevent overtravel is best shown in Figs. 38, 40 and 41, in which the pattern 78 is being moved in a westward direction with the pattern edge 80 gradually approaching the axis of the shutter head 69. Although the conditions there shown are not intended to represent the exact sequence of decelerating cycles that occur prior to traversing a corner, they are representative in a general way of the effect of the anticipating notch 492 in producing a gradually decreasing table feed rate during this period. In actual operation, a much greater number of decelerating cycles would necessarily occur in the brief period existing between the instant a corner was first anticipated and the instant that corner was traversed by movement of the pattern and workpiece along the new path of travel. The actual period of deceleration is determined by the length the radial anticipating notch 492 extends outwardly from the circular leading edge 490 of the aperture 489 that initiates a no-light copy signal.

As shown in Figs. 38, 40 and 41, the pattern 78 is being moved continuously in a westward direction in response to no-light copy signals that are respectively initiated and terminated by the pattern edge 79 once during each revolution of the aperture 489, the duration of the average no-light copy signal for westward movement being indicated by the shaded arcuate segment 493 in Fig. 38. With the pattern 78 being moved in a westward direction, the radially extending anticipating notch 492 will begin to overlap the pattern edge 80 delineating a directional change in the path of travel. As shown in Figs. 40 and 41, this results in a passage of light through the anticipating notch 489 to the photocell 137 during a portion of each revolution, as indicated by the dotted portions 519 and 520 of the arcuate segments, which represent the normal average duration of a westward no-light signal. Since the anticipating notch 492 overlaps the pattern edge 80 by a gradually increasing amount, the aperture 489 will pass light for a correspondingly increasing portion of each revolution. Consequently, the duration of each succeeding no-light copy signal for westward movement will be diminished, indicated by the shaded portions 521 and 522 of the arcuate segments in Figs. 40 and 41, to effect a deceleration in the westward feeding rate as the pattern edge 80 is moved closer to the axis of the shutter head 69.

It will be noted that each anticipating signal light pulse passed by the anticipating notch 492 as it overlaps the pattern edge 80, forms a continuation of the light pulse passed by the aperture as it overlaps the pattern edge 79, delineating the major westward path of travel. The initiation of the no-light copy signal for westward movement therefore is delayed by a gradually increasing amount during each successive revolution of the shutter head 69. The no-light copy signals of reduced duration are initiated the instant the anticipating notch 492 crosses the pattern edge 80, and moves under the opaque portion of the pattern. The resulting no-light copy signals thus formed are disposed to effect a deceleration in the westward feeding movement as well as the start of increasing southward movement (not indicated, but like that of Fig. 37) of the pattern 78 immediately prior to the pattern being moved in a south direction of travel, as dictated by the pattern edge 80 and shown in Fig. 42. This veering off in a south direction prior to traversing the directional change in the path of travel does not result in undercutting a female workpiece, but may produce a corner radius somewhat larger than the cutter radius. It should be noted that a principal advantage of the anticipating system embodied in this invention is the complete elimination of overtravel as a corner is being traversed. Even slight overtravel, at extremely low feeding rates for example, would result in undercutting the workpiece and thereby damage it. In prior types of two dimensional control systems, this condition would become even more aggravated as the feeding rates were increased.

As shown by the overlapping sine waves in Figs. 40a and 41a, which represent the sequentially positive plate voltages of the translator pliotrons, the leading edges 525 and 526 of successive no-light copy signals recede while the rearward edges 527 and 528 respectively thereof remain relatively fixed (except for the slight change occasioned by southward movement, as shown from 510 to 512 in Fig. 37a). The sections of the sine waves within the duration of the westward copy signal, Figs. 40a and 41a, are represented by the shaded areas in Figs. 40b and 40c, as well as 41b and 41c. With the south condenser preponderantly charged to produce a controlling voltage difference between the two condensers, Fig. 40a, the pattern support 65 and work table 46 will begin to veer off slightly in a south direction. At the same time, the west condenser will be charged to a lesser extent, Fig. 40c, so that the reduced condenser controlling voltage will effect westward motion at a reduced feed rate. As represented by the shaded areas in Figs. 41b and 41c, the west condenser charging as well as the condenser voltage, will be further decreased to effect feeding motion in a west direction at a reduced rate. The south condenser will be charged to a greater extent than the north condenser to produce a controlling voltage difference calling for increased motion in a south direction.

With the pattern 78 continuing to advance in a west direction at a decreasing feed rate, a differently timed, no-light copy signal for south movement will be initiated by the circular edge 490 of the aperture 489 crossing the pattern edge 80 delineating the new path of travel and as shown in Fig. 42. The south no-light copy signal will extend through an angle of 90°, as indicated by the shaded arcuate segment 530, and be terminated the instant the trailing edge 491 of the aperture 489 again crosses the pattern edge 80 to pass light. Within the duration of the south copy signal, Fig. 42a, the west and east condensers will be charged equally, Fig. 42b, and the south condenser will be charged, Fig. 42c, to produce condenser voltages having control over the movement of the pattern support 65 and work table 46 in a south direction along the new path of travel.

In a further modification of the invention, there is provided a modified form of motor controller of the metadyne class constituting in part a rotating electrical amplifier, shown in Fig. 27, that may be substituted for the motor controller 145, Fig. 8, to selectively control the rotation of the table feed motor 53. The rotating amplifier 534 may likewise be substituted for the motor controller 146 to control the saddle feed motor 54.

As shown in Fig. 27, the rotating amplifier 534 constitutes essentially a generator 535 and a source of power 536 for the generator. To selectively control the output of the generator 535, the field 538 therefore is connected to be selectively energized by control voltage of reversible polarity supplied through the conductors 280 and 281 leading from the east and west signal controlling condensers 273 and 274 of the translator 144. The conductor 280 is connected directly to one terminal of the generator field 538. The conductor 281 is connected to one terminal of a feedback resistor 541, the opposite terminal of which is connected to the opposite terminal of the generator field 538.

One of the armature terminals of the control generator 535 is connected through a conductor 547, the resistor 540 and a conductor 542 to one of the armature terminals of the feed motor 53. The other one of the generator armature terminals is connected through a conductor 548 to the other armature terminal of the feed motor 53, the field of which is energized by a source of rectified direct current through the conductors 176 and 177, shown in Figs. 8 and 27. Thus, whenever the translator 144 is activated, the resulting signal voltage therefrom is transmitted through the conductors 280 and 281 to energize the generator field 538. The control generator 535 is then operative to produce voltage of the required polarity for energizing the feed motor 53 to rotate in the required direction. Rotation of the feed motor 53, in turn, provides a terminal back E. M. F. to reduce the armature current. The feedback voltage appearing across the resistor 540 will be additive to the polarity of the input signal voltage from the translator 144 to compensate for motor armature IR drop and provide accurate control of the rotational speed of the feed motor 53 as well as being operative to accommodate variations in motor load. Thus, the modified form of motor controller shown in Fig. 27 is operative to selectively control the rate and direction of rotation of the table feed motor 53 in accordance with the dictates of signal control pulses provided by the rotating shutter head 69.

From the foregoing description of the several illustrative embodiments of the invention disclosed herein, it is apparent that there has been provided an improved directional anticipating control system for a copying machine. The control system is especially adapted to control the relative feeding movements of a two dimensional copying machine with an extremely high degree of accuracy for reproducing a contour according to a guiding contour of predetermined configuration. At the approach of either a gradual or an abrupt directional change in the path of travel dictated by the guiding contour, the control system is operative to anticipate both the occurrence and the extent of the directional change to prevent overtravel as the corner is traversed. Even at high feeding rates, the system is operative to detect abrupt directional changes in the path of travel and modify the feed rate as the direction of travel is changed to completely eliminate the possibility of undercutting the work. The entire operation of the control system is automatic throughout a full 360° contouring operation.

Several exemplary embodiments of the invention have been described in considerable detail for the purpose of fully disclosing operative apparatus incorporating the invention. It is to be understood, however, that the particular apparatus shown and described is intended to be illustrative only and that the various novel features of the invention may be incorporated in other structural forms without departing from the spirit and scope of the invention as defined in the subjoined claims.

The principles of the invention having now been fully explained in connection with the foregoing description of embodying structure, I hereby claim as my invention:

1. In a contouring machine adapted to be controlled by a pattern having a guiding contour, a source of radiant energy, a rotatable shutter apertured to pass radiant energy from said source, a movable support disposed to support a guiding contour for movement relative to said shutter, a power source connected to rotate said shutter relative to said contour in manner that radiant energy passing therethrough is recurrently intercepted by said contour to provide a continuous succession of radiant energy pulses escaping said contour, said shutter being so apertured that the periodicity of said radiant energy pulses varies according to thte instantaneous angular orientation of said contour and the duration of each of said pulses varies according to the proximity of the axis of said shutter to the closest guiding portion of said contour, means for varying the radiant energy pulses escaping said contour in anticipation of a directional change in said contour in advance of said guiding portion, said means comprising a movable blanking device disposed to cooperate with said shutter and to be movably reoriented in accordance with the changes in directional movement of said contour, and power operable means connected to move said support member in successive angular directions that vary according to the periodicity and duration of thte said radiant energy pulses provided by the said contour recurrently intercepting the said radiant energy from said shutter, said power operable means being connected to vary the rate of movement of said support member in accordance with the variation in the radiant energy pulses effected by said blanker means.

2. In a copying machine operatively arranged to generate a contour corresponding in configuration to a guiding contour, a pair of relatively movable members, a light beam producing sensing device carried by one of said members in cooperating relationship with a guiding contour carried by the other of said members, a shutter carried by said sensing device and having two spaced apertures for the passage of spaced light beams comprising a copy signal light beam and an anticipating signal light beam respectively, a motor connected to effect continuous movement of said shutter relative to said pattern in such a manner that the said light beams are moved into overlapping and intercepted relationship with said guiding contour to provide continuously pulsating copy signal and anticipating signal light beams respectively, auxiliary control means including a blanking device operatively arranged to intercept the said pulsating anticipating signal light beam excepting during that period in which the said anticipating signal light beam overlaps a directional change in the guiding contour, a photoelectronic regulating system operatively arranged to be actiivated by the pulsating light beam signals and connected to provide an output control signal that varies in accordance with the difference between the pulsating copy signal and anticipating signal light beams respectively, power actuating means comprising a pair of motors operatively connected to effect directionally controlled relative movement between said members in accordance with variations in the said output control signal from said photoelectronic regulating system, and control means connected to be actuated by said motors, said control means being connected to effect directionally controlled movement of said blanker relative to said contour and said shutter.

3. In a pattern controlled machine tool disposed to generate a contour corresponding to a guiding contour, a shutter having a pair of openings disposed to pass a pair of spaced apart energy beams, an opaque pattern having a guiding contour and being carried for movement relative to said shutter, means for rotating said shutter to move said energy beams into overlapping and intercepted relationship with the edge of said pattern, movable blanking means configured to intercept one of the said beams excepting during the period in which the said beam overlaps a directional change in said guiding contour, a photoelectronic controller connected to produce a continuous control signal that varies according to the portion of the said beams escaping said pattern and said blanking means in proportion to the portion of the said beams intercepted thereby, and power operable means connected to effect relative movement between said shutter and the edge of said pattern in response to the control signal from said photoelectronic controller.

4. In a line tracker control system disposed to be continuously activated in accordance with the directional changes in the edge of a guiding pattern, a rotatable shutter head provided with a pair of spaced apart openings comprising a copy aperture and an anticipating hole respectively, a source of radiant energy directed toward said shutter head, a movable support member disposed to carry said pattern in interposed relationship between said shutter head and said source of radiant energy, means for continuously rotating said shutter head in partially overlapping relationship with the edge of said pattern in a manner that the said copy aperture and the said anticipating hole respectively are recurrently moved into overlapping relationship with the said pattern edge to permit intermittent passage of radiant energy in the form of a pulsating copy signal and a pulsating anticipating signal respectively, means including a directionally controlled blanker disposed to intercept the radiant energy signal passed by said anticipating hole excepting during the period in which said anticipating hole overlaps a portion of the edge of said pattern delineating a directional change in the path of travel, a photoelectronic regulating system arranged to be activated by the said recurrent signals passed by said shutter head and disposed to provide a direction controlling output signal varying according to the difference between the said copy signal and the said anticipating signal, and a pair of motors operatively connected to effect directionally controlled movement of said support member in accordance with the said output control signal from said photoelectronic regulating system.

5. In a signal forming apparatus for a copying machine, a rotatable shutter head, a shutter slidably carried by said shutter head for lateral movement in either direction from the rotational axis thereof to one or the other of two extreme laterally adjusted positions, said shutter having a pair of spaced apart light passing openings disposed to pass light in the form of two light beams, means for rotating said shutter head including a selectively reversible motor and means including a magnetic brake operatively arranged to maintain said shutter in one or the other of its extreme laterally adjusted positions depending upon the direction of rotation of said motor whereby said shutter is maintained in one laterally adjusted position when said motor is rotated in a clockwise direction and is maintained in its opposite laterally adjusted position when said motor is rotated in a counterclockwise direction.

6. In a pattern controlled machine tool, a support member disposed to movably support a pattern delineating a guiding contour, a reversibly rotatable shutter head cooperatively disposed with respect to the edge of the said pattern delineating the guiding contour, a source of light carried in spaced apart relationship to said shutter head, a light passing shutter slidably carried by said shutter head for lateral movement to one or the other of two extreme positions relative to the rotational axis thereof, means for automatically maintaining said shutter in one or the other of its extreme positions of lateral movement including a magnetic locking member that is selectively operable in accordance with the direction of rotation of said shutter head, an electric motor connected to effect selectively reversible rotation of said shutter head in a manner that said shutter is moved into overlapping and intercepted relationship with the guiding contour delineated by said pattern to provide continuously recurrent light pulses, a light sensitive regulating system responsive to the said recurrent light pulses passed by said shutter and disposed to provide a continuous control signal, power operable means connected to be actuated by said regulating system and being in turn operatively connected to effect movement of said support member relative to said shutter head along a path of travel corresponding to the said guiding contour delineated by the said pattern carried thereby, circuit means including a source of power connected to energize said motor and said power operable means, and switching means interconnected in said circuit means for effecting selectively reversible energization of said motor and said power operable means whereby the direction of movement of said support member is changed in accordance with the changed direction of rotation of said shutter head.

7. In an apparatus for reproducing a contour corresponding to the configuration of a guiding contour, a directional anticipator comprising a rotatable shutter having a light passing anticipating hole, means for continuously rotating said shutter to move said anticipating hole alternately into intercepted and then overlapping relationship with said contour to pass recurrent light signal pulses, power operable means connected to effect relative movement between said contour and said shutter including a tracer control system responsive to said contour, said tracer control system and said power operable means being normally connected to effect substantially uniform relative movement between said contour and said shutter, a blanker disposed to cooperate with said shutter to intercept the said recurrent light signal pulses passed by said shutter excepting during the period in which the said anticipating hole overlaps a directional change in said contour, and an electronic control circuit responsive to light signal pulses passed by said anticipating hole and connected to selectively modify the operation of said tracer control system in such a manner as to selectively vary the rate of relative movement between said contour and said shutter.

8. In a copying machine having a sensing device and an opaque pattern, in combination with means to cause one to move continuously about the other at a substantially uniform rate along a path of travel dictated by said pattern, an anticipator responsive to a guiding edge of said pattern and being operatively connected to vary a component of the said rate of movement between said sensing device and said pattern in anticipation of a directional change in the path of travel dictated by an opaque portion of said pattern forming an included angle between tangents of less than 180°.

9. In an apparatus for reproducing a contour in work from a representation of said contour, a work table disposed to support said work, a relatively movable tool support adapted to operate on said work, a support for the representation of said contour, feeding means for moving said table relative to said tool support, a source of energy, a sensing device including means responsive to energy receivable from said source for controlling the operation of said feeding means, said sensing device including an eccentric unidirectional rotatable portion cyclically translatable in successive adjoining orbital paths and cooperable with successive small edge zones of the representation of said contour to cyclically transmit radiant energy pulses from said source to said responsive means, said responsive means being operable to cause said feeding means to move said table at a substantially uniform rate in successive instantaneous directions determined by the periodicity of the said respective energy pulses, and anticipating means movably and operatively interposed between said sensing device and said contour in a manner to selectively modify the transmission of energy pulses from said source to said responsive means in accordance with the proximity of a directional change in said guiding contour, said responsive means being operable to cause said feeding means to vary the rate of movement of said table in response to the modified energy pulses from said sensing device.

10. In a copying machine having a pair of relatively movable members, power actuating control means including a sensing device operatively connected to effect predetermined directionally controlled relative movement between said members, and auxiliary control means disposed to cooperate with said sensing device for selectively modifying the rate of relative movement between said members in accordance with the changes in the direction of movement therebetween.

11. In a control system for a copying machine, an opaque pattern having an edge zone forming a guiding contour, a relatively movable sensing device having a shutter provided with spaced apart openings and being operative to produce a pair of orbitally moving light beams, a power source connected to move said sensing device along the contour formed by said opaque pattern in such a manner that the said orbitally moving light beams are recurrently moved into overlapping relationship with the said contour to pass a pair of continuously pulsating light beam signals, means for intercepting one of the said pulsating light beam signals excepting during the period in which the said signal is formed by a directional change dictated by a portion of the said opaque pattern bounded by an included angle of less than 180° between tangents, and a photoelectronic regulating system connected to energize the said power source in accordance with the difference between the said pulsating light beam signals from said sensing device.

12. In an apparatus for reproducing a contour in work from a representation of the said contour, a tool holder and a relatively movable work table for said work, a movable support for said contour, a source of radiant energy, a sensing device provided with a pair of spaced openings, means for continuously rotating said sensing device in a manner that the said openings contained therein are moved into intercepted and overlapping relationship with the said contour to pass two streams of recurrent energy pulses from said source, selectively rotatable blanking means disposed to cooperate with said sensing device for intercepting one of the said streams of energy pulses excepting during the period in which the said stream overlaps a directional change in the said guiding contour, energy responsive control means operatively connected to provide a continuous output control signal that varies according to the difference in duration between the said respective streams of recurrent energy pulses, and a power source operatively connected to effect relative movement between said work table and said sensing device in accordance with the variations in the continuous control signal from said control means.

13. In a signal forming sensing device for a copying machine, a rotatable shutter head, a shutter movably carried by said shutter head for movement to one or the other of two positions of eccentricity relative to the rotational axis of said shutter head, an actuating member rotatably carried by said shutter head for limited movement into lagging relationship therewith, said actuating member being operative to urge said shutter to one or the other of its extreme positions of eccentricity depending upon the direction of rotation of said shutter head, and a stationary magnetic member operatively disposed to retain said actuating member in lagging relationship to said shutter head for retaining said shutter in one or the other of its eccentric positions relative to the rotational axis thereof.

14. In a copying machine having a signal forming sensing device responsive to a pattern providing a light differentiating line of trace, means for supporting said sensing device and said line of trace respectively including a pair of relatively movable support members, means for moving one of said support members including a pair of motors, means for actuating said motors including a photoelectronic regulating system arranged to be activated by signals from said sensing device, and means for modifying the signals produced by said sensing device comprising a cooperatively movable blanker operatively interposed between said sensing device and said line of trace in a manner to selectively intercept a portion of the signals from said sensing device.

15. In a signal forming device for a copying machine, a reversibly rotatable shutter head, a signal forming shutter slidably carried by said shutter head for limited lateral movement to one or the other of two extreme positions with respect to the rotational axis thereof, said shutter being provided with a pair of spaced apart light passing openings, predeterminately adjustable stop means releasably carried by said shutter head for limiting the extent of movement of said shutter, an actuating member movably carried by said shutter head operatively arranged to urge said shutter to one or the other of its lateral positions in accordance with the direction of rotation of said shutter head, magnetic locking means disposed to cooperate with said actuating member for continuously maintaining said shutter in the lateral position required by a particular direction of rotation of said shutter head, means for rotating said shutter head including a reversibly operable power source, and a cooperatively rotatable blanker configured in such a manner as to intercept light passed by one of said shutter openings during a restricted portion of each revolution of said shutter head.

16. In a copying machine control system disposed to be activated by the edge of a pattern delineating a guiding contour, a light beam forming device provided with a shutter having a plurality of spaced apart openings and being disposed to pass a plurality of parallel light beams, power operable means connected to continuously move said device and said light beams alternately into overlapping and intercepted relationship with the edge of said pattern delineating a guiding contour, a blanker operative to intercept one of said light beams excepting during the period in which the said beam overlaps a directional change in the edge of said pattern delineating guiding contour, a photoelectronic amplifier disposed to produce output signal pulses that vary according to the proportion of said light beams that are not intercepted by said pattern edge or said blanker, a motor connected to effect relative movement between said light beam forming device and said pattern edge, and a motor regulating system connected to energize said motor in accordance with the said output signal pulses from said amplifier.

17. In a copying machine operatively arranged to be controlled by a guiding contour, a reversibly rotatable shutter head, a shutter slidably carried by said shutter head for lateral movement in either direction from the rotational axis thereof, said shutter being provided with a light passing aperture, means for predeterminately limiting the extent of lateral movement of said shutter including a stop member releasably secured to said shutter head, cam actuating means operatively connected to urge said shutter laterally in either direction depending upon the direction of rotation of said shutter head, said cam actuating means being carried by said shutter head for limited movement in either direction, and stationary magnetic locking means disposed to maintain said cam actuating means in one or the other of its extreme positions of allowable movement depending upon the direction of rotation of said shutter head.

18. In a control system for a copying machine, means for overlapping a contour with a stream of radiant energy in successive cycles, photoelectronic control means disposed to provide control voltages proportional to the ratio of radiant energy escaping said contour to the radiant energy intercepted thereby, a motor controller operatively connected to be activated by the control voltages, a pair of electric motors connected to be proportionately energized by said motor controller, said motors being connected to effect directionally controlled relative movement between said stream of radiant energy and said contour, and a direction anticipator arranged to detect directional changes in said contour and comprising a movable blanker in combination with means for moving a second stream of radiant energy into overlapping and intercepting relationship with said contour in fixed relationship relative to said first stream of radiant energy, said movable blanker being so movable in interposed relationship between said second stream of radiant energy and said contour as to selectively intercept the said second stream of radiant energy excepting during the period in which the said second stream overlaps a directional change in said contour, the portion of said second stream of radiant energy escaping said blanker and said contour being operative to modify the operation of said photoelectronic control means.

19. In a copying machine for reproducing a contour in work from a pattern having a guiding edge delineating a contour, a tool holder, a relatively movable work support cooperatively disposed with respect to said tool holder, a support for a pattern having a guiding edge delineating a contour, electric motors connected to produce relative motion between said work support and said tool holder in a plurality of different directions and also to effect a corresponding movement of said pattern support, and control means connected to control the current delivered to said motors comprising a source of radiant energy, means responsive to energy receivable from said source, a unidirectionally rotatable shutter having an eccentric opening for intermittently overlapping the guiding edge of said pattern to control the transmission of energy from said source to said responsive means, and blanking means operatively interposed between said shutter and said responsive means adapted to in turn selectively vary the transmission of energy passed by the opening in said shutter to said responsive means in accordance with the proximity of said shutter to a directional change in the said guiding edge of said pattern.

20. In a copying machine having a pair of relatively movable members, a power source operatively connected to effect relative movement between said members, a tracer control system associated with one of said members responsive to a guiding contour carried by the other of said members, said tracer control system being operatively connected to selectively activate said power source in accordance with directional changes in said guiding contour, and auxiliary control apparatus cooperatively associated with said tracer control system for anticipating directional changes in said guiding contour and connected to selectively modify the activation of said power source.

21. In a direction anticipating control adapted to anticipate directional changes in a path of travel dictated by a guiding contour, a pair of relatively movable support members, a power source operatively connected to effect relative movement of said support members, a sensing device carried by one of said support members disposed to cooperate with a guiding contour carried by the other of said support members, said sensing device being responsive to one portion of said guiding contour in a manner to produce recurrent direction controlling signals, said sensing device being simultaneously responsive to another spaced apart portion of said guiding contour in a manner to supply recurrent direction anticipating signals that vary in accordance with the proximity and extent of a directional change in said guiding contour, and signal responsive means including circuit control means operatively connected to selectively activate said power source in accordance with the difference between the said direction controlling signals and the said direction anticipating signals produced by said sensing device whereby the rate of relative movement between said members is selectively modified in accordance with the proximity of said sensing device to a directional change in said guiding contour.

22. In a line tracker control system arranged to be activated by the guiding edge of a pattern, a movable member disposed to support a guiding pattern having an edge zone, a relatively movable sensing device disposed to produce a plurality of moving light beams, said sensing device being so movable that the said light beams are continuously and alternately moved into intercepted and overlapping relationship respectively with successively overlapping edge zones of said pattern to provide a pair of pulsating light beam signals, auxiliary control means disposed to cooperate with said sensing device for incapacitating one of the said pulsating light beam signals excepting during that interval when that particular one of the said light beams overlaps a portion of the said pattern edge delineating a change in direction, a photoelectronic motor regulating system disposed to provide a continuous output control signal that varies according to the difference between the said respectively recurrent pulsating light beam signals initiated by the said sensing device and said auxiliary control means, and a power source operatively connected to effect relative movement between said movable member and said sensing device in accordance with the demands of the said continuous output control signal provided by said photoelectronic regulating system.

23. In a pattern controlled machine tool, a pair of relatively movable members, power operable means including a control system operatively connected to control the directional movement of said members along a selected path of travel, and auxiliary control means operatively connected to predeterminately modify the operation of said control system and said power operable means to thereby vary the rate of relative movement between said members in anticipation of an abrupt directional change in the said path of travel.

24. In an apparatus for reproducing a contour from a guiding contour, a reversibly rotatable sensing device, a shutter movably carried by said sensing device for lateral movement in either direction depending upon the direction of rotation of said sensing device, said shutter being provided with a pair of light passing openings disposed to pass light in the form of two orbitally moving light beams, means for limiting the extent of lateral movement of said shutter including an adjustable limiting element releasably secured to said sensing device, a concentrically rotatable actuating member carried by said rotatable sensing device for moving said shutter to one or the other of its extreme positions of lateral movement, and a stationary magnetic locking device operatively arranged to exert a braking effect on said actuating member to maintain said shutter in one or the other of its lateral positions of movement depending upon the direction of rotation of said sensing device.

25. In a copying machine having a pair of relatively movable members, means for effecting directionally controlled relative movement between said members including a power source, a cyclicly operable sensing device carried by one of said members disposed to cooperate with a guiding pattern carried by the other of said members, said sensing device being simultaneously responsive to two spaced apart portions along said guiding pattern in a manner to supply a directional copy signal pulse and a variable anticipating signal pulse respectively during the same cycle of operation, signal responsive means including an electronic amplifier arranged to be activated by said sensing device for providing a continuous pulsating signal in which the successively alternate pulses correspond in duration to said directional signals and said anticipating signals respectively, an electronic translator connected to be activated by said amplifier and operative to provide an output signal that varies according to the difference between the successive pulses occurring during the same cycle, and circuit means interconnecting said translator and said power source whereby said power source is continuously energized by the output signal from said translator.

26. In a pattern controlled machine tool, a movable support member disposed to support a guiding pattern having an edge zone delineating a guiding contour, a reversibly rotatable shutter head cooperatively disposed below said pattern edge and said support, a light source arranged to direct light downwardly toward said support and said shutter head, a light passing shutter slidably carried by said shutter head for lateral movement to one or the other of two extreme positions relative to the rotational axis thereof, said shutter being movable to one or the other of its extreme positions of lateral movement depending upon the direction of rotation of said shutter head, a reversible motor connected to effect selectively reversible rotation of said shutter head in a manner that said shutter is moved into overlapping and intercepted relationship with said pattern edge to provide continuously recurring light signal pulses, a movable blanker operatively interposed beneath said support adapted to selectively modify the light signal pulses passed by said shutter, said blanker being provided with a central opening and a radially extending opening, said blanker being automatically oriented in a manner that the central opening continuously overlaps said pattern edge and the radial opening is continuously pointed in a direction opposite to the movement of said pattern and within the opaque zone whereby the radial opening overlaps said pattern edge only on the occurrence of a change in direction, a light sensitive regulating system responsive to the recurrent light signal pulses passed by said shutter, said regulating system being connected to provide a continuous control signal that varies in accordance with the proportion of light intercepted by said opaque pattern and said blanker, power operable means connected to be activated by said regulating system and being in turn connected to effect relative movement of said support relative to said shutter head along a directionally controlled path of travel corresponding to the contour delineated by said pattern, an auxiliary control system activated by said power operable means connected to move said blanker in accordance with the directional path of movement between said support and said shutter head, circuit means including a source of power operatively connected to selectively energize said motor, said regulating system and said power operable means, and switching means operatively interconnected in said circuit means for effecting a selectively reversible energization of said motor and said power operable means whereby the direction of movement of said support member is changed in accordance with the changed direction of rotation of said sensing device.

27. In a signal controlling apparatus for a line tracker control system, a sensing mechanism capable of simultaneously producing recurrent direction controlling input signals as well as recurrent direction anticipating input signals, and a translating control system disposed to be activated by said sensing device and that is operative to produce a continuous output control signal that varies according to the difference between the said recurrent direction controlling signals and the said direction anticipating signals from said sensing mechanism.

28. In a pattern controlled machine tool adapted to generate a contour corresponding to a guiding contour, a pattern delineating a guiding edge, a source of energy, a sensing device provided with a pair of spaced openings, means for continuously rotating said sensing device into overlapping and intercepted relationship with the edge of said pattern to pass two streams of recurrent energy from said source, movable blanking means adapted to intercept one of the streams of energy pulses excepting during the period in which the stream overlaps a directional change in the pattern edge, control means operatively connected to provide a continuous output control signal that varies according to the difference in duration between the respective streams of energy pulses escaping the edge of said pattern and said blanker, a power source connected to effect directionally controlled relative movement between said pattern and said sensing device in response to the continuous output signal from said control means and being operable throughout a full 360°, and secondary electrical control means connected to movably reorient said blanker in accordance with the changes in directionally controlled relative movement between said sensing device and said pattern.

29. In a pattern controlled machine tool, a pattern provided with a guiding edge, a source of radiant energy, a shutter having a pair of spaced apart openings being continuously movable into overlapping and intercepted relationship with the pattern edge to pass two streams of recurrent energy pulses escaping the guiding edge of said pattern, a movable blanker disposed to intercept one of the streams of energy pulses excepting during the period in which said stream overlaps a directional change in the edge of said pattern, power driven control means connected to effect directionally controlled relative movement between said shutter and said pattern in accordance with the difference in duration between the streams of recurrent energy pulses respectively escaping said pattern edge and said blanker, and electrically actuatable steering means connected to movably reorient said blanker in accordance with the directional changes in the relative movement between said shutter and said pattern.

30. In a pattern controlled machine tool, a pattern provided with a guiding edge, a source of radiant energy, a shutter having a pair of spaced apart openings being continuously movable into overlapping and intercepted relationship with the pattern edge to pass two streams of recurrent energy pulses escaping the guiding edge of said pattern, a movable blanker disposed to intercept one of the streams of energy pulses excepting during the period in which said stream overlaps a directional change in the edge of said pattern, power driven control means connected to effect directionally controlled relative movement between said shutter and said pattern in accordance with the difference in duration between the streams of recurrent energy pulses respectively escaping said pattern edge and said blanker, and mechanically operative steering means frictionally engaged to movably reorient said blanker in accordance with the changes in directional movement between said shutter and said pattern.

References Cited in the file of this patent

UNITED STATES PATENTS

| | | |
|---|---|---|
| 2,208,420 | Gulliksen | July 16, 1940 |
| 2,423,321 | Hurley | July 1, 1947 |
| 2,423,322 | Hurley | July 1, 1947 |
| 2,438,422 | Stearns et al. | Mar. 23, 1948 |
| 2,499,178 | Berry et al. | Feb. 28, 1950 |
| 2,503,052 | Keinath | Apr. 4, 1950 |
| 2,521,946 | Rathje | Sept. 12, 1950 |
| 2,522,851 | Tyrner | Sept. 19, 1950 |
| 2,532,421 | Rathje | Dec. 5, 1950 |
| 2,588,386 | Hubbard et al. | Mar. 11, 1952 |